(12) United States Patent
Johnson et al.

(10) Patent No.: US 11,440,018 B2
(45) Date of Patent: Sep. 13, 2022

(54) VISCOUS FOOD PRODUCT GRINDING AND DISPENSING SYSTEM

(71) Applicant: Trade Fixtures, LLC, Little Rock, AR (US)

(72) Inventors: Scott Johnson, Little Rock, AR (US); Shaji Kulangara Veettil, Little Rock, AR (US); John Calow, North Little Rock, AR (US); John Clayton Odom, Benton, AR (US); Ronald Brundick, Roland, AR (US); Ashok Dyavarasegowda, Bangalore (IN)

(73) Assignee: Trade Fixtures, LLC, Little Rock, AR (US)

( * ) Notice: Subject to any disclaimer, the term of this patent is extended or adjusted under 35 U.S.C. 154(b) by 139 days.

(21) Appl. No.: 16/816,647

(22) Filed: Mar. 12, 2020

(65) Prior Publication Data
US 2020/0290054 A1 Sep. 17, 2020

Related U.S. Application Data

(60) Provisional application No. 62/818,012, filed on Mar. 13, 2019.

(51) Int. Cl.
*B02C 7/14* (2006.01)
*B02C 7/04* (2006.01)
(Continued)

(52) U.S. Cl.
CPC .................. *B02C 7/14* (2013.01); *B02C 7/04* (2013.01); *B02C 7/06* (2013.01); *B02C 7/175* (2013.01); *A23P 30/00* (2016.08); *A23V 2300/31* (2013.01)

(58) Field of Classification Search
CPC .. B02C 7/14; B02C 7/04; B02C 7/175; B02C 7/11; B02C 23/02; A23P 30/00; A23V 2300/31; A23N 15/00; A47J 42/36
See application file for complete search history.

(56) References Cited

U.S. PATENT DOCUMENTS 3,827,644 A * 8/1974 Johansson ................. B02C 7/14
                                                            241/259.3
4,027,824 A * 6/1977 Fuller ....................... B02C 19/22
                                                            241/247
(Continued)

OTHER PUBLICATIONS

International Search Report and Written Opinion for PCT/US2020/022666, dated May 18, 2020.

*Primary Examiner* — Jessica Cahill
*Assistant Examiner* — Mohammed S. Alawadi
(74) *Attorney, Agent, or Firm* — Andrus Intellectual Property Law, LLP

(57) ABSTRACT

A viscous food dispensing system includes a chute inlet configured to funnel particulate food product into a sleeve and a transport device having an over-center cutout. The transport device is configured to rotate within the sleeve to convey the particulate food product. A processing surface extends downward from the chute inlet towards a curved base of the sleeve along a portion of the transport device. The processing surface is spaced laterally apart from the transport device to define a processing zone between the processing surface and the transport device. The particulate food product is processed as the particulate food product is captured between a leading edge of the over-center cutout and the processing surface while the transport device is rotating.

19 Claims, 49 Drawing Sheets

Auger Lock Bolt- Free Position

Auger Lock Bolt- Locked Position

(51) Int. Cl.
  *B02C 7/06*   (2006.01)
  *B02C 7/175*  (2006.01)
  *A23N 15/00*  (2006.01)
  *A47J 42/36*  (2006.01)
  *B02C 7/11*   (2006.01)
  *B02C 23/02*  (2006.01)
  *A23P 30/00*  (2016.01)

(56) References Cited

U.S. PATENT DOCUMENTS

| | | | | |
|---|---|---|---|---|
| 4,039,153 A * | 8/1977 | Hoffman | | B02C 7/14 |
| | | | | 241/259.3 |
| 4,081,146 A * | 3/1978 | Yagi | | B02C 7/11 |
| | | | | 241/257.1 |
| 4,201,349 A * | 5/1980 | Walsh | | B02C 7/04 |
| | | | | 241/247 |
| 4,253,613 A * | 3/1981 | Reinhall | | D21D 1/30 |
| | | | | 241/43 |
| 5,509,610 A * | 4/1996 | Gibbons | | B02C 7/14 |
| | | | | 241/261.3 |
| 5,553,792 A * | 9/1996 | Romer | | B02C 7/06 |
| | | | | 241/186.3 |
| 5,707,016 A * | 1/1998 | Witsken | | D21D 1/303 |
| | | | | 241/261.3 |
| 5,769,335 A * | 6/1998 | Shutov | | B29B 17/04 |
| | | | | 241/261.1 |
| 5,927,628 A * | 7/1999 | Lima | | B02C 7/14 |
| | | | | 241/285.3 |
| 5,971,307 A * | 10/1999 | Davenport | | B02C 7/06 |
| | | | | 241/261.3 |
| 5,979,809 A * | 11/1999 | Bartels | | B02C 7/11 |
| | | | | 241/261.3 |
| 6,238,267 B1 * | 5/2001 | Rouse | | B24B 5/366 |
| | | | | 451/28 |
| 7,252,033 B1 * | 8/2007 | Lin | | A47J 42/18 |
| | | | | 241/34 |
| 9,532,682 B1 * | 1/2017 | Lassota | | A47J 42/18 |
| 10,843,203 B2 * | 11/2020 | Johnson | | F16K 15/147 |
| 2005/0223819 A1 * | 10/2005 | Backlund | | B02C 7/11 |
| | | | | 241/261.3 |
| 2011/0062190 A1 * | 3/2011 | Johnson | | A47F 1/035 |
| | | | | 222/153.14 |
| 2014/0061344 A1 * | 3/2014 | Conti | | A47J 43/255 |
| | | | | 241/296 |
| 2015/0027096 A1 * | 1/2015 | Black | | A01D 34/82 |
| | | | | 56/10.1 |
| 2015/0201785 A1 * | 7/2015 | Taniwaki | | B02C 7/08 |
| | | | | 241/73 |
| 2017/0106376 A1 * | 4/2017 | Quadrana | | A23L 13/65 |
| 2017/0267441 A1 * | 9/2017 | Johnson | | B02C 7/175 |
| 2020/0197946 A1 * | 6/2020 | Yoon | | B02C 4/08 |

* cited by examiner

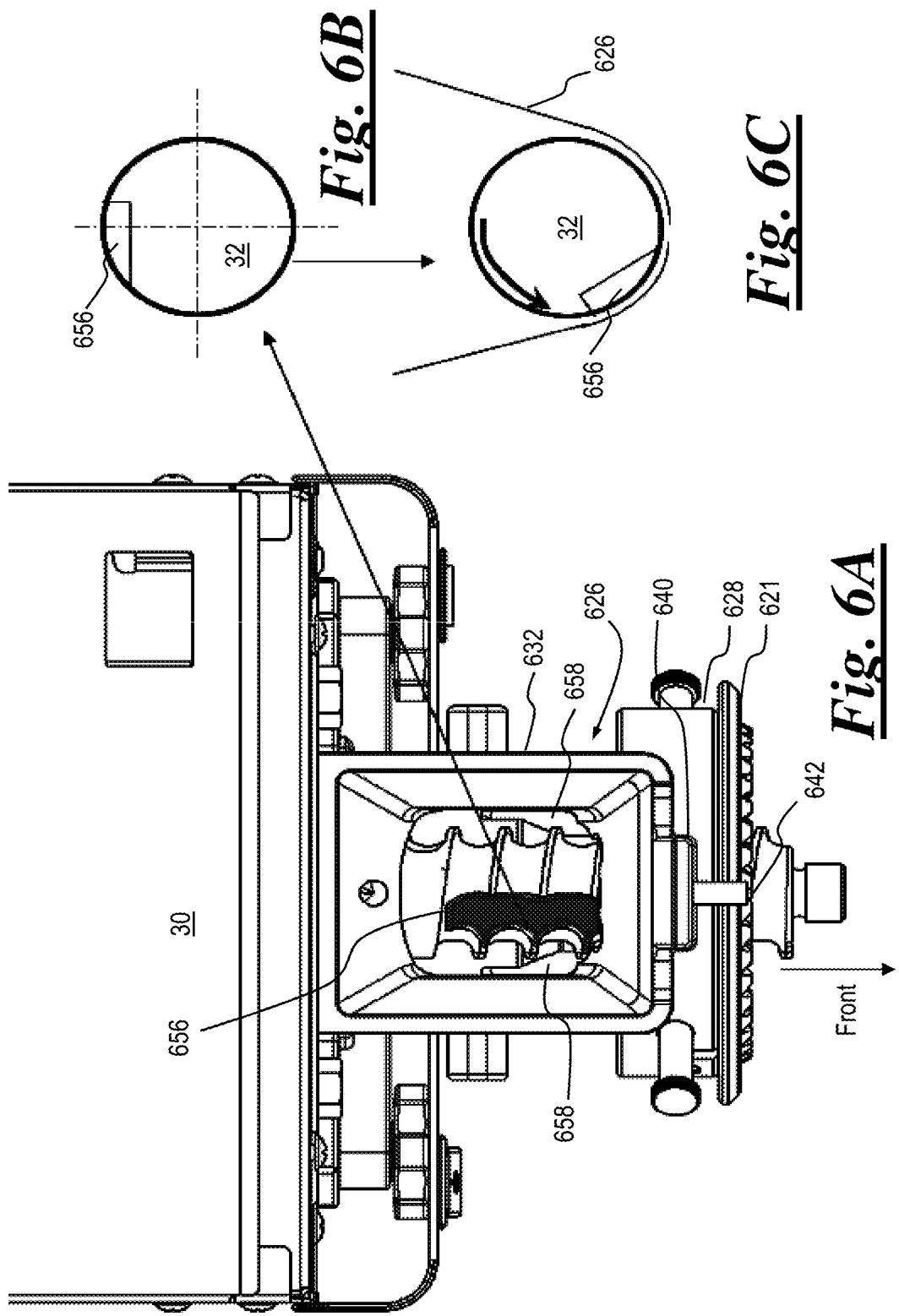

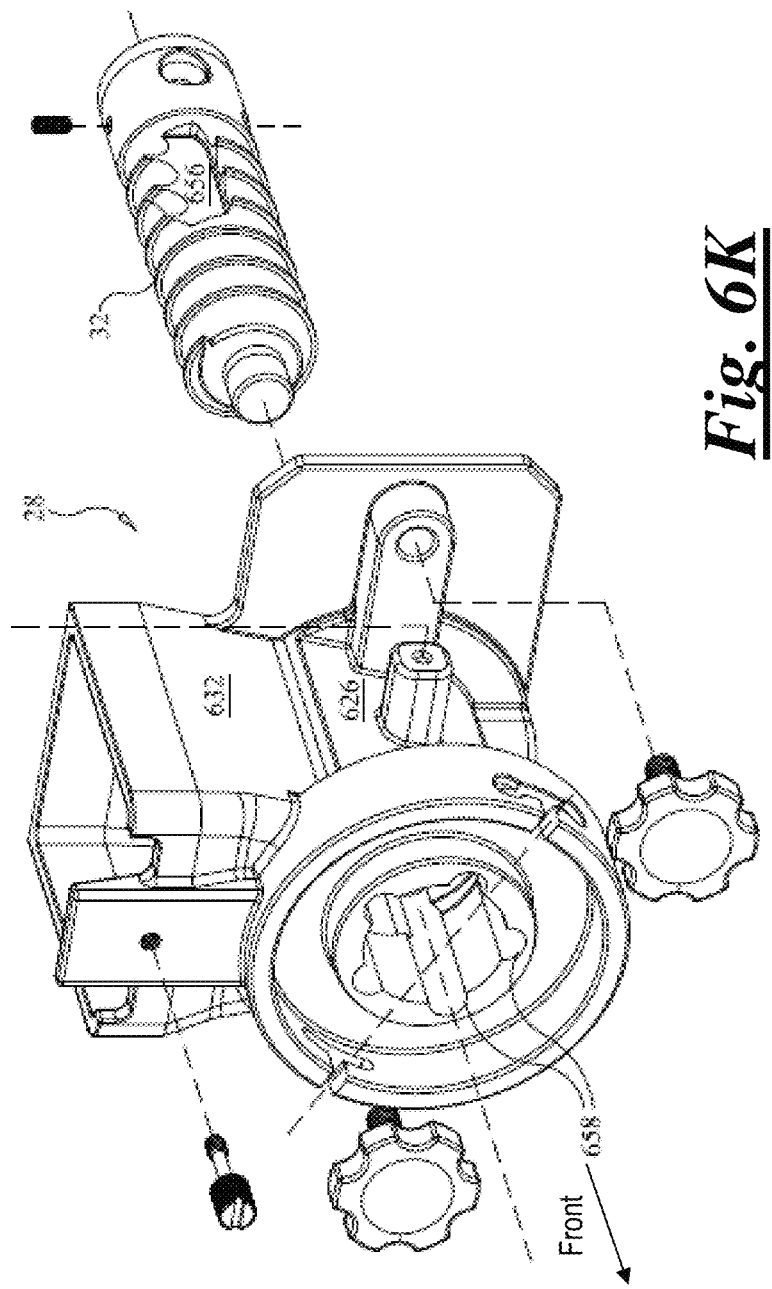

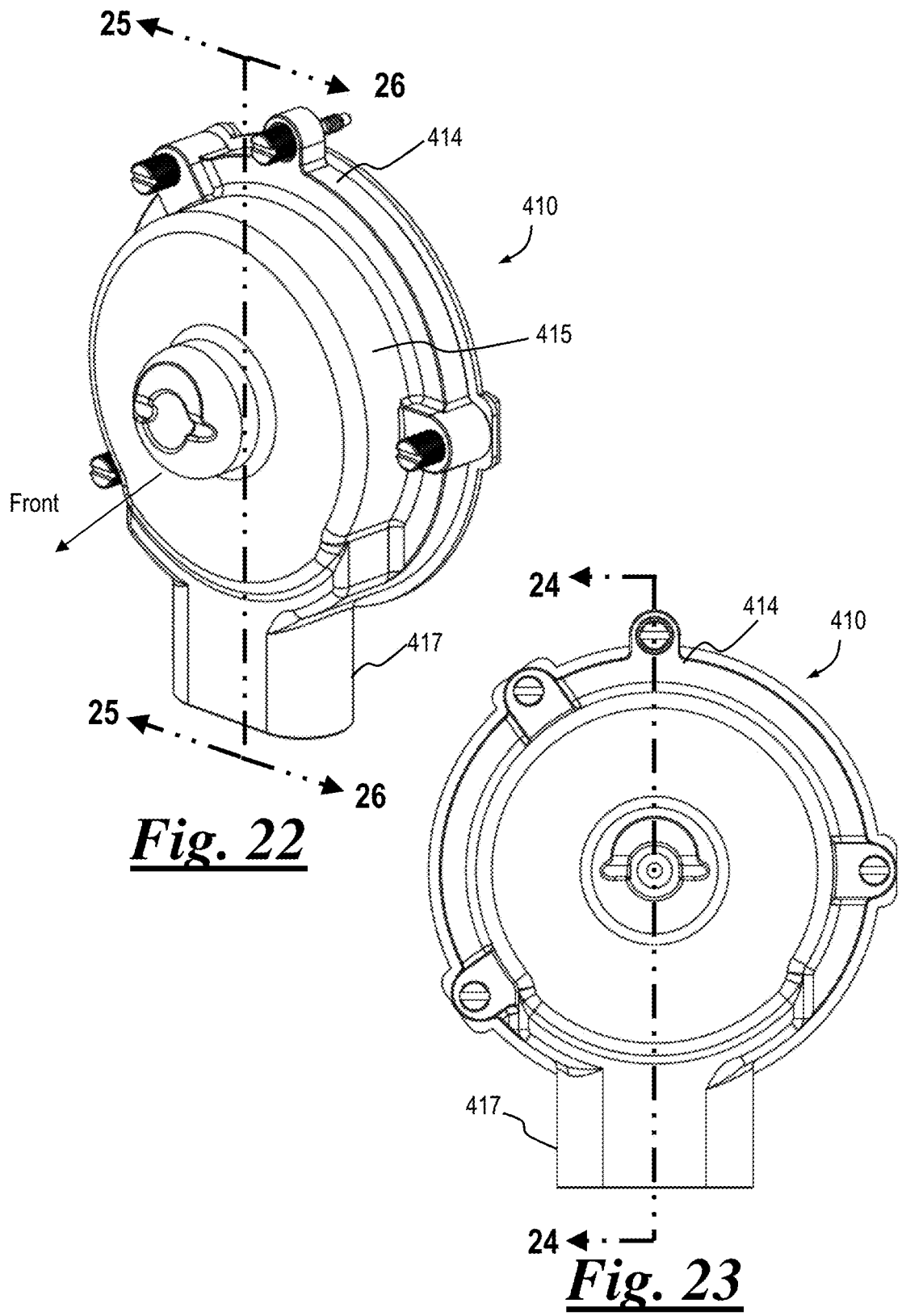

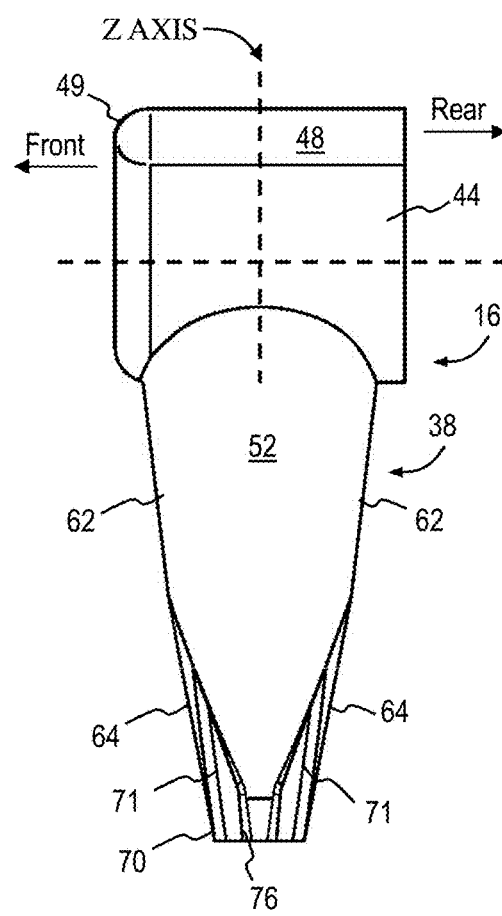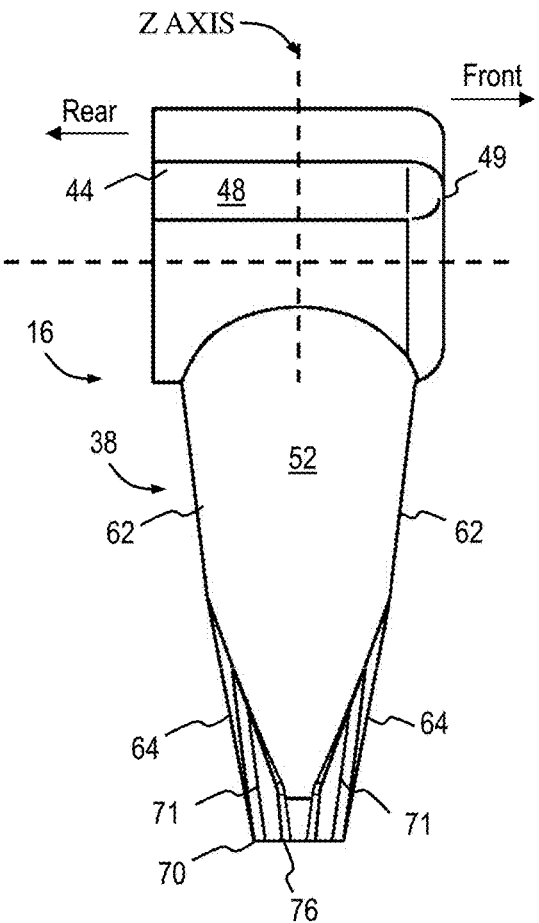
*Fig. 34*     *Fig. 35*

Auger Lock Bolt- Free Position

Auger Lock Bolt- Locked Position

VISCOUS FOOD PRODUCT GRINDING AND DISPENSING SYSTEM

CROSS-REFERENCE TO RELATED APPLICATIONS

The present application claims priority of U.S. Provisional Patent Application No. 62/818,012, filed on Mar. 13, 2019, the contents of which are hereby incorporated by reference in its entirety.

BACKGROUND

The present disclosure relates generally to viscous food product grinding and dispensing systems, and in particular to features for such systems configured to improve performance of the production of viscous food paste.

Grinding dispensers for dispensing bulk food products are used to dispense a wide variety of ground materials, which may include, for example, nuts, coffee, and grain. Generally, such systems include a hollow hopper-type bin having an inlet at an upper end utilized to fill the enclosure with bulk product, a transport section that receives the food product by gravity, a manual or electric motor power source that mechanically drives a transport device and a milling device, and a discharge cover for the milling device. In one aspect the transport device may be a rotatable auger that is coupled to the power source. The discharge cover includes one or more outlet openings utilized to dispense the material into a container for the user.

Existing grinding dispenser systems provide nut butter freshly ground from various types of nuts, such as peanuts and almonds. In operation of such nut grinding dispensers, a pre-processed nut product is further ground to produce nut butter, which is forced as a viscous paste to the bottom of the discharge cover and dispensed from the outlet opening as an exposed viscous paste stream.

Conventional systems produce an exposed paste stream that is problematic for sanitary reasons. The present invention overcomes this disadvantage by covering dispense residual paste (commonly referred to as "dangle") with a spout (aka shroud). After the grinding dispenser has been deactivated, conventional systems further produce an exposed residue drip attached to the exterior of the product outlet.

BRIEF DISCLOSURE

Examples of the dispensers as disclosed herein provide improvements over the above-noted conventional systems and others. The disclosed dispensers may be especially suitable for larger nuts, by increasing the gap, or distance, between the transport device (auger) and housing wall (aka inner wall of transport section). The larger gap allows larger nuts to be captured.

Other examples of the disclosed dispensers provide a nozzle at the product outlet having a generally flexible valve configured to automatically pinch off product residue drips. Thus, the nozzle valve prevents dripping of the product after dispensing has ceased. In some embodiments, the nozzle is covered by a spout to shield the food product outlet from environmental contamination and public tampering.

Examples as disclosed in further detail herein may include a variable frequency driven (VFD), 3 phase motor, that provides higher torque with a volumetrically smaller motor. The high torque allows a more efficient grinding of product. The smaller motor allows a smaller overall footprint. Utilizing a VFD controller allows for motor operation using various world-wide input voltages and frequencies, maintains improved torque and horsepower, and can provide specific torque/speed profiles via computer program profiles.

As disclosed in further detail herein, a safety system may operate to disable the electronic drive system upon detection of removal of either the hopper and/or front cladding (merchandizer). Still further examples may include a pivoting shutter (aka gate) on the hopper dispenser, a manually adjustable texture modification system fed by a unique flute arrangement, or a run time adjustment feature. The pivoting gate automatically closes off the product bin discharge chute as the bin is removed from the unit, reducing product loss. Texture adjustment screws provide easy manual adjustment, without the need for special tools, of a rear fixed grinder position, relative to a front rotating grinder, so as to adjust the coarseness, or product texture. Utilizing manual fasteners for the disassembly and reassembly of the grinding system shortens the clean time and product change-over time for the unit. The run time adjustment feature allows the unit owner to quickly select from a plurality of pre-determined run times for the motor.

A transport section for a viscous food product grinding and dispensing system may include a transport device having an over-center cutout within a housing sleeve, the interior surface of the housing sleeve including radial flutes for regulating product flow from the sleeve to the milling device.

An outlet adapter for a viscous food product dispensing system may include a discharge cover. The discharge cover may be configured to receive a pressurized supply flow of particulate food product and to house a milling device for processing the particulate food product into a pressurized supply flow of viscous food paste for dispensing. A flexible nozzle is coupled at a proximal end to the discharge cover. The flexible nozzle includes a valve configured to flex to an open position under force from the pressurized supply flow of viscous food paste and return to a closed position once the supply flow ceases. The valve includes an outlet being configured to pinch off and sever the viscous food paste as the valve returns to the closed position; whereby the severing of the viscous food paste by the outlet reduces the amount of viscous food paste remaining attached to an external face of the outlet.

An outlet adapter may include a discharge cover and a flexible nozzle. The discharge cover is configured to receive a pressurized supply flow of particulate food product and to house a milling device for processing the particulate food product into a supply flow of viscous food paste for dispensing. The nozzle includes a proximal end, a distal end and a valve with a hollow interior passage. The nozzle is coupled at the proximal end to an aperture in the discharge cover. The hollow interior passage includes an opening at the proximal end configured to receive the viscous food paste. The hollow interior passage tapers downwardly towards a port at the distal end. The valve includes a flexible portion; the flexible portion is biased in a normally closed position and flexes to an open position under sufficient force for discharge of the viscous food paste. The flexible portion is configured such that force from the pressurized supply flow of the viscous food paste urges the port open and, once the supply flow stops, the port to returns to the closed position, thus pinching off or severing the viscous food paste.

An example of a viscous food dispensing system includes a chute inlet configured to funnel whole food product into a sleeve. A transport device is configured to rotate within the sleeve. The transport device includes an over-center cutout. A processing surface extends downwards from the chute inlet towards a curved base of the sleeve along a portion of the transport device. The processing surface is spaced laterally apart from the transport device to define a processing zone between the processing surface and the transport device. Whole food product is broken into particulate food product as the whole food product is captured between a leading edge of the over-center cutout and the processing surface while the transport device is rotating. The transport device is configured to move the particulate food product away from the chute inlet.

A method for tuning a viscous food dispensing system includes determining a desired viscosity of the viscous food product. The viscous food dispensing system may be configured to grind particulate food product into viscous food product between a stationary grinding plate and a movable grinding plate. The movable grinding plate configured to be rotated by a drive device. The method may further include uncoupling the movable grinding plate from the drive device to remove the movable grinding plate from the viscous food dispensing system. A replacement movable grinding plate may be selected based upon the desired viscosity of the viscous food product. The replacement movable grinding plate may be secured to the drive device to tune the viscous food dispensing system based on the desired viscosity.

In an example, the stationary grinding plate, the movable grinding plate, and the replacement movable grinding plate each have a different number of grinding teeth. The grinding teeth may be arranged in one or more rings of grinding teeth on each grinding plate. In an example, the movable grinding plate and the replacement movable grinding plate each have a different number of grinding teeth. In an example, the movable grinding plate and the replacement movable grinding plate each have a different number of rings of grinding teeth.

BRIEF DESCRIPTION OF THE DRAWINGS

Further features of the inventive embodiments will become apparent to those skilled in the art to which the embodiments relate from reading the specification and claims with reference to the accompanying drawings, in which:

FIG. 6A is a partial top plan view of the system of FIG. 3 shown with the bin, front rotating grinder and discharge cover removed;

FIG. 6B is a front end view in section of a cutout in the auger/transport device, and FIG. 6C, is the section of FIG. 6B shown rotated counterclockwise, also showing the interior surface of the adjacent sleeve;

FIG. 6K is an exploded side perspective view showing the transport section with transport device of FIG. 3;

FIG. 22 is a front perspective view of the outlet adapter of FIG. 21;

FIG. 23 is a front view of the outlet adapter of FIG. 21;

FIG. 34 is a left side elevation view of the flexible nozzle of FIG. 28;

FIG. 35 is a right side elevation view of the flexible nozzle of FIG. 28;

DETAILED DISCLOSURE

Figure 1:
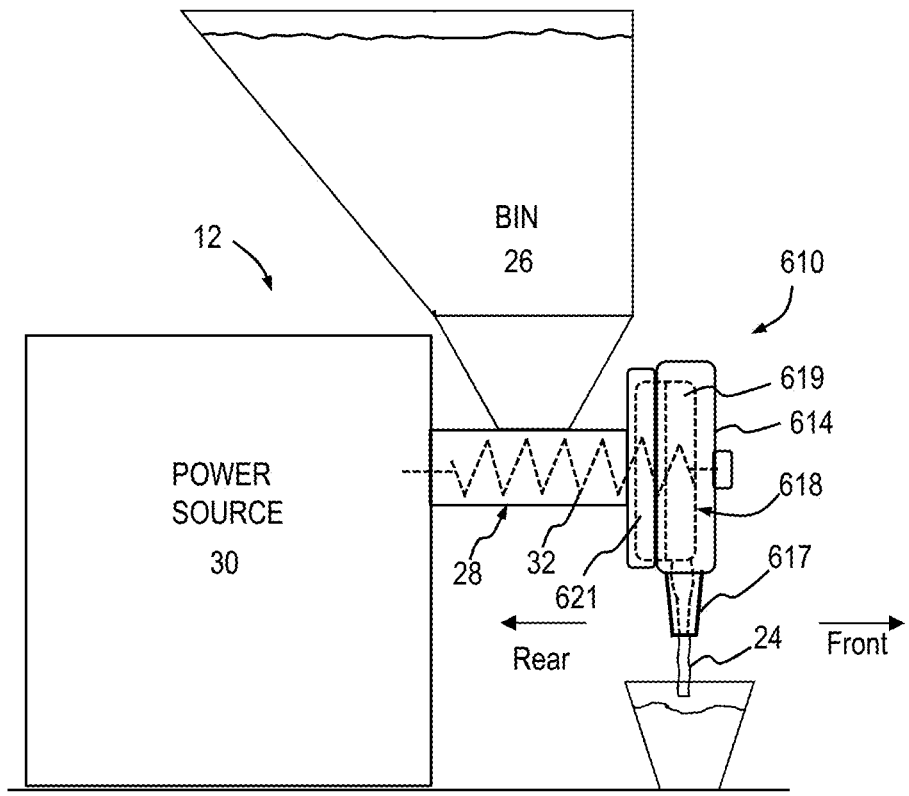
FIG. 1 is a schematic side view of a viscous food product grinding and dispensing system according to an embodiment of the present invention.

In the discussion that follows, like reference numerals are used to refer to like structures and elements in the various figures.

Figure 2:
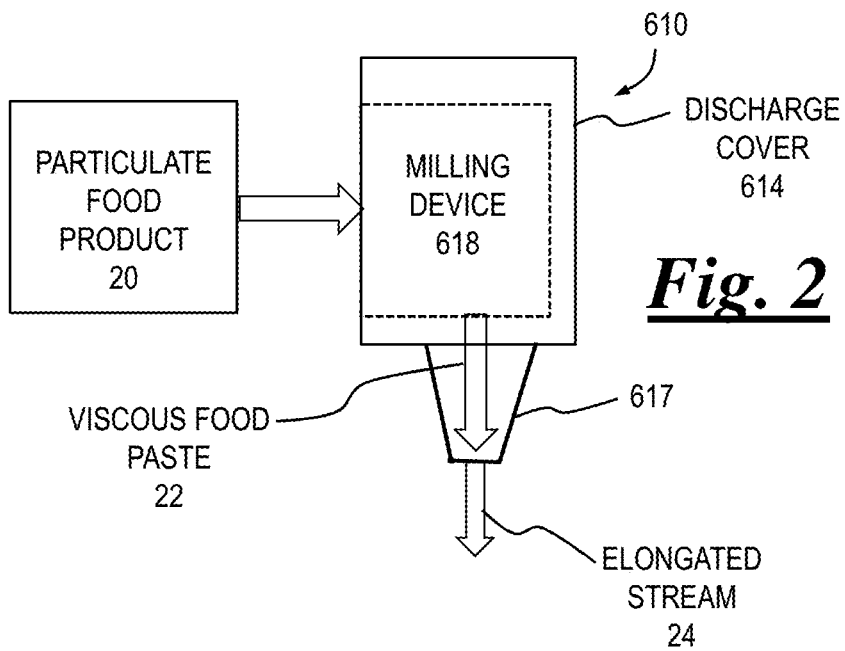
FIG. 2 is a schematic flow diagram of the system of FIG. 1.

The general arrangement of a viscous food product grinding and dispensing system 12 ("system 12") of the present invention is shown in FIGS. 1 & 2. System 12 includes an outlet adapter 610 having a discharge cover 614 with a spout 617. Discharge cover 614 is configured to house a milling device 618 and to be operatively connected to a transport section 28 of system 12. Milling device 618 includes an opposing set of grinding members or plates, such as front rotating grinder 619 and a rear fixed grinder 621. Front rotating grinder 619 is adapted to rotate with respect to rear fixed grinder 621.

In operation, milling device 618 receives a supply flow of particulate food product 20 and processes the particulate food product into a pressurized supply flow of viscous food paste 22 for dispensing through spout 617 as an elongated stream 24. Food product 20 may include a variety of nuts, including peanuts and almonds. Viscous food paste 22 may include a variety of nut butters, such as peanut butter and almond butter.

System 12 includes a bin 26 for storage of particulate food product 20, gravity fed transport section 28 that receives the particulate food product, and a power source 30 that drives a transport device 32 as well as milling device 618. Transport device 32 is located within transport section 28 and operates to move particulate food product 20 downstream to milling device 618.

Transport device 32 is an auger in one embodiment, which is designed to work in conjunction with the internal features of transport section 28 in order to perform an initial processing of the particulate food product 20. The initial processing involves a rough cutting and crushing of the product. The subsequent processing of the rough product involves relatively finer grinding performed by the milling device 618.

In the embodiment shown in FIGS. 1 and 2, elongated stream 24 is not pinched off or severed. Rather, the stream bifurcates upon cessation of flow leaving a residual, or dangle. In some embodiments, as described more fully herein, the outlet adapter further includes a flexible discharge nozzle adapted to pinch off or sever stream 24 upon cessation of flow.

Figure 3:
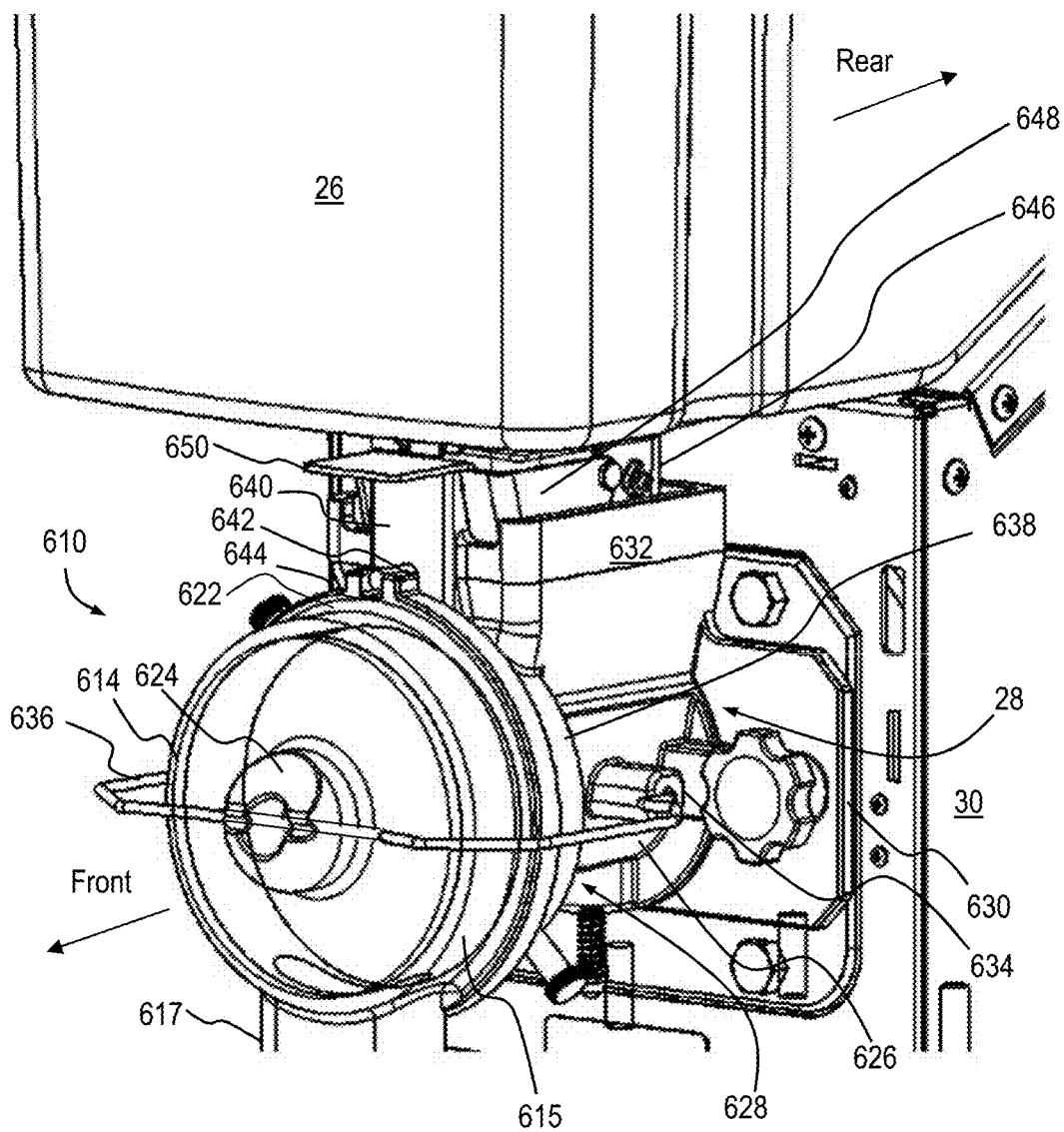
FIG. 3 is a partial front perspective view of a viscous food product grinding and dispensing system according to an embodiment of the present invention, shown without the milling device.

Now referring to FIG. 3, discharge cover 614 (viewed as if transparent) has a generally cylindrical shape and includes an annular sidewall 615, annular flange 622 at the rear, and a nose 624 at the front. Transport section 28 includes a sleeve 626, a front housing 628, a rear plate 630, and a chute inlet 632 extending from the top of the sleeve. Sleeve 626 further includes a pair of opposing nodes 634 configured to receive and secure opposing ends of a clamp bar 636. Nose 624 is configured to receive and secure a front portion of clamp bar 636. Front housing 628 includes an annular perimeter 638 and an arm 640 extending from the top of the annular perimeter and connected to the front of chute inlet

632. A post 642 is fastened to the front of arm 640. In assembling discharge cover 614 to front housing 628, a receptor 644 on top of annular flange 622 is first aligned with and inserted onto post 642. Next, clamp bar 636 is secured to nose 624 and the ends of the clamp bar secured to nodes 634. Alternatively, discharge cover 614 is aligned against front housing 628, secured by clamp bar 636, and then post 642 is fastened to arm 640 through receptor 644.

Bin 26 includes a chute 646 at the bottom for discharge of particulate food product 20. Bin 26 further includes a rotatable gate 648 configured to pivot from a normally closed position to an open position. In the closed position (FIGS. 4, 5), gate 648 covers the bottom opening of chute 646, preventing discharge of particulate food product 20. In the open position (FIG. 3), gate 648 is pivoted away from the bottom opening of chute 646 towards the front of the chute, thus allowing for product discharge. In assembling bin 26 to transport section 28, chute 646 is inserted into chute inlet 632. During insertion of chute 646 the top of arm 640 engages a flap 650, causing the front rotation of gate 648.

Figure 4:
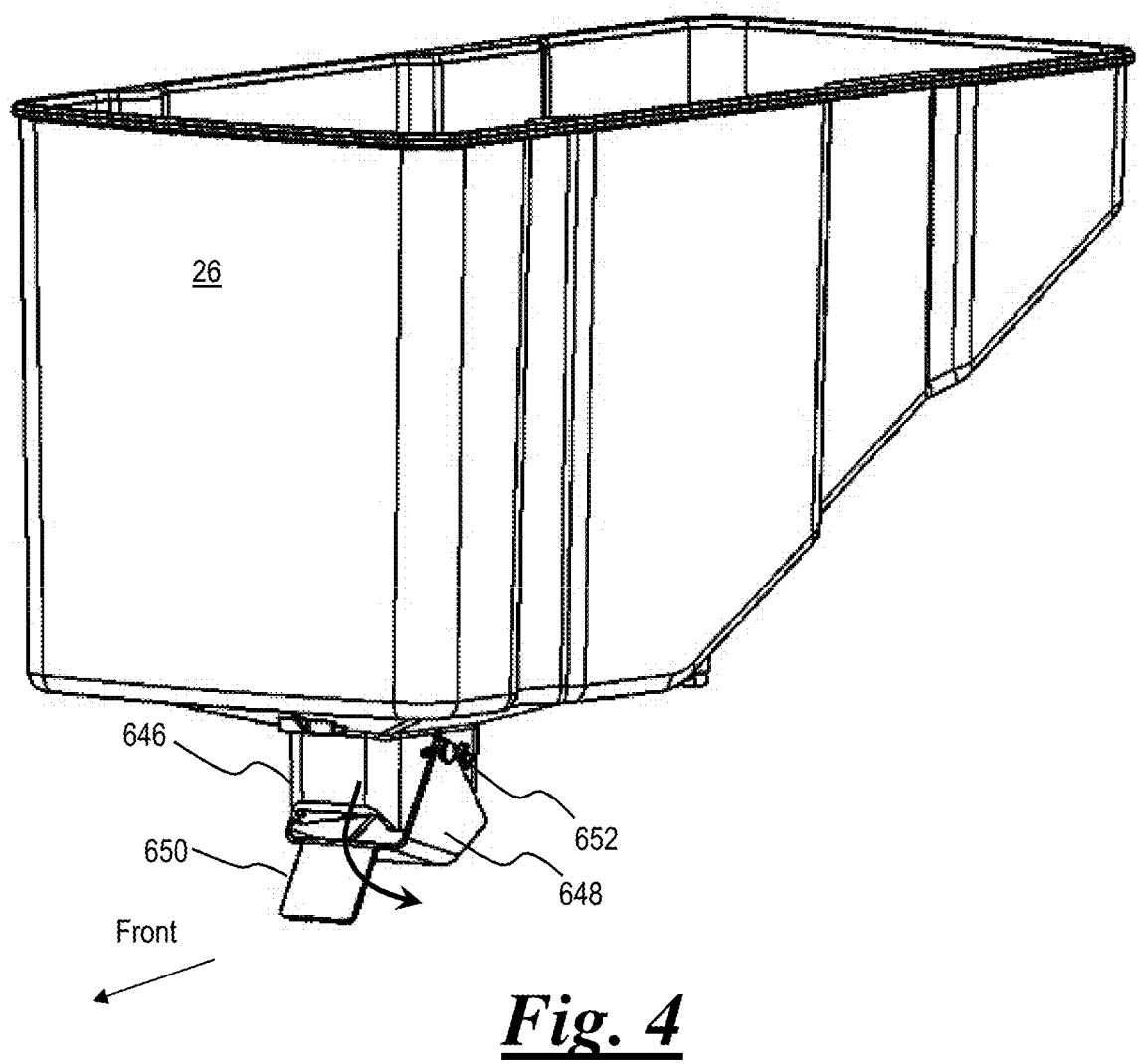
FIG. 4 is a front perspective view of the bin of FIG. 3 shown removed from the system.
Figure 5:
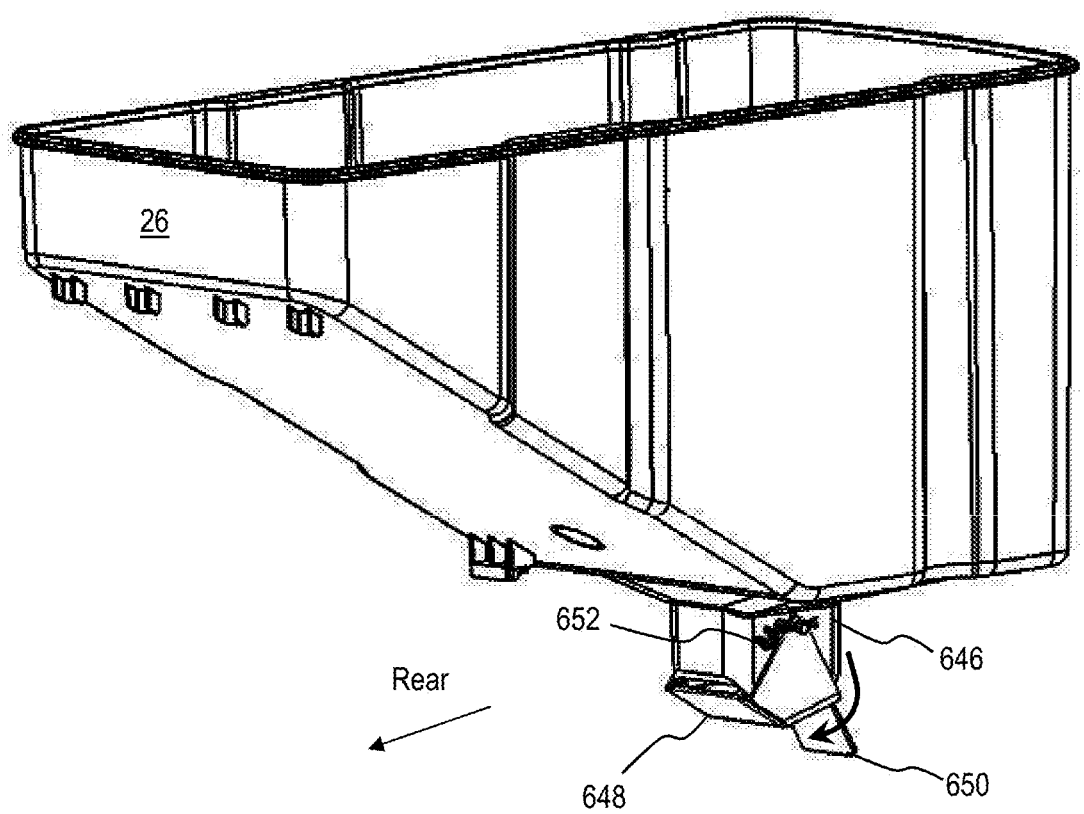
FIG. 5 is a rear perspective view of the bin of FIG. 4.

Referring to FIGS. 4 and 5, bin 26 may be removed from transport section 28 for cleaning and/or change-over of product. Upon removal of chute 646 from chute inlet 632, flap 650 rotates (either by gravity or spring assisted), thus pivoting gate 648 back to the closed position. Chute 646 further includes an opposing pair of stops 652 positioned on the sides of the chute. Stops 652 define a limit of movement of gate 648 in the closed position. Thus, gate 648 acts to minimize or substantially eliminate leakage of product from the bottom opening of chute 646 during removal of bin 26.

Referring to FIGS. 6A-6K, cutout portion 656 (aka over-center cutout) is disposed in the flights of transport device 32. As exemplified in FIG. 6B, cutout portion 656 is disposed in transport device 32 in an over-center position. Cutout portion 656 is formed as a notch having two perpendicular sides of unequal length. Cutout portion 656 is aligned below the opening of chute inlet 632. Those of skill in the art will appreciate that the dimensions of cutout portion 656 are sized commensurate with a target product (e.g. almond, or peanut). In merely exemplary non-limiting examples, dimensions of 7.637 mm and 16.665 mm are used.

Figure 6D:
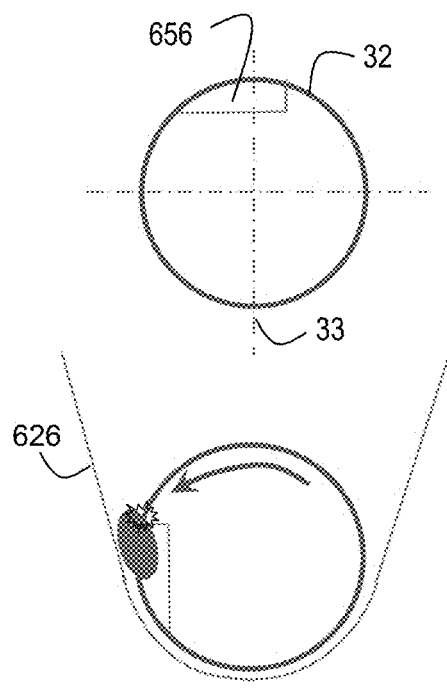
FIG. 6D is a front end view in section of a cutout in the auger/transport device (identical to FIG. 6B)
Figure 6E:
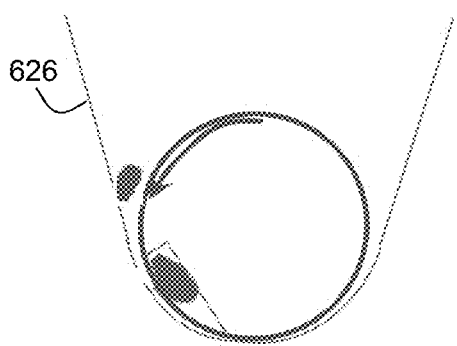
FIG. 6E is the section of FIG. 6D shown rotated counterclockwise showing a captured nut.
Figure 6F:
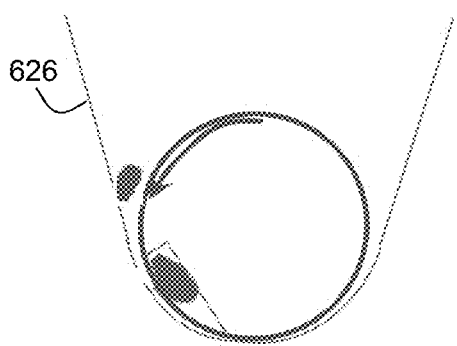
FIG. 6F is the section of FIG. 6E shown rotated further counterclockwise showing a partially crushed nut (it should be noted that the same effect can be achieved with a clockwise configuration)
Figure 6G:
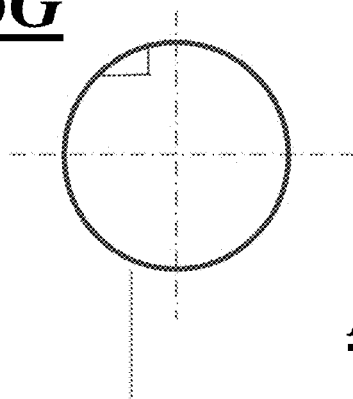
FIG. 6G is a front end view in section of a cutout in a prior art device.
Figure 6H:
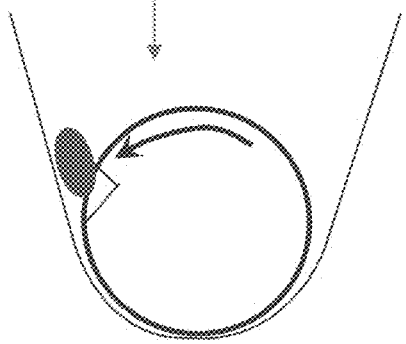
FIG. 6H is the section of FIG. 6G shown rotated counterclockwise showing an un-captured nut.
Figure 6I:
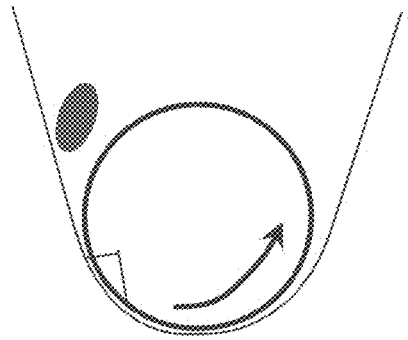
FIG. 6I is the section of FIG. 6H shown rotated further counterclockwise, and showing an escaped nut.
Figure 6J:
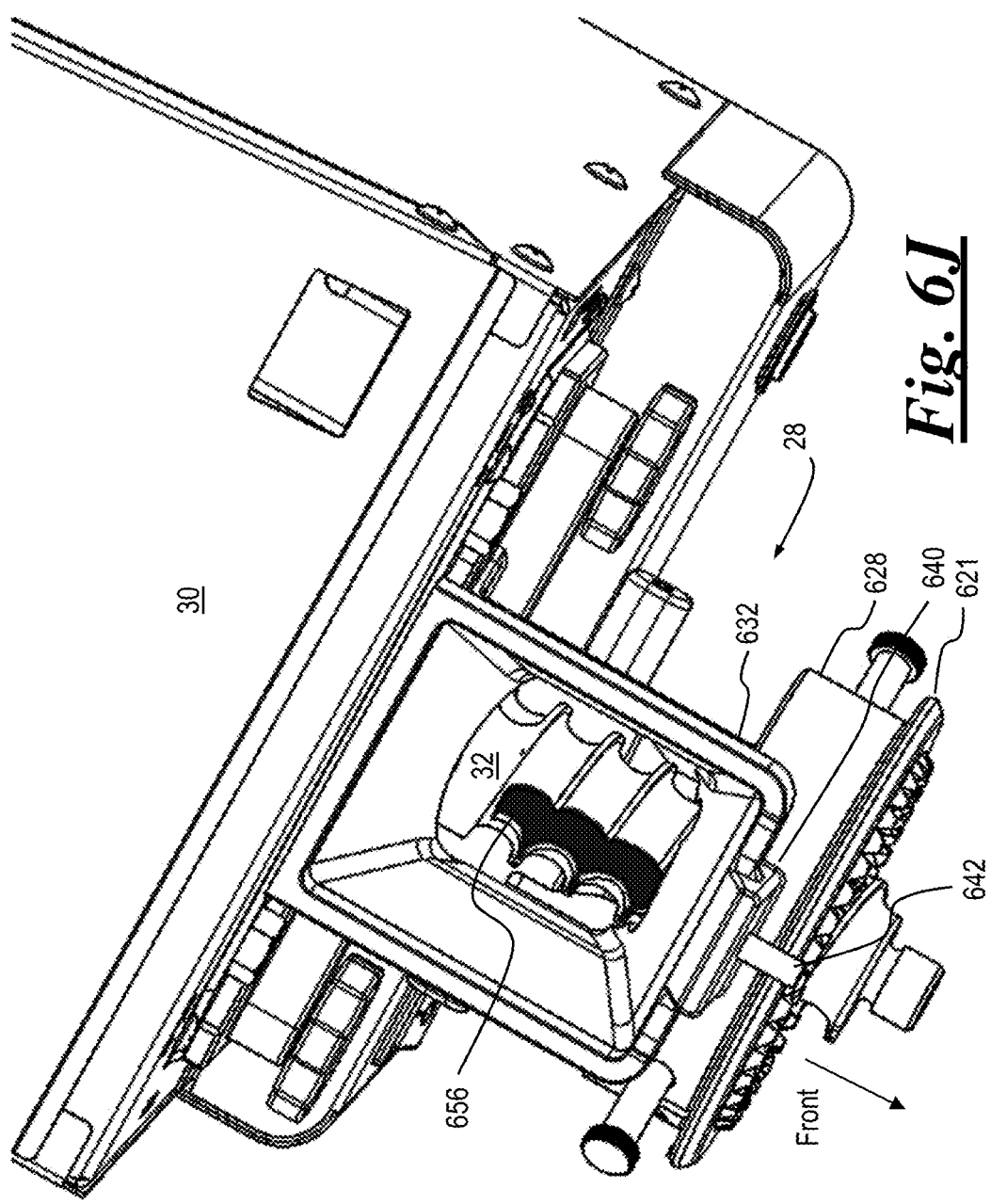
FIG. 6J is a top perspective view of the viscous food product grinding and dispensing system.

Prior systems required pre-processed, partially broken product for adequate grinding. As shown in FIGS. 6G through 6I, the cutout of conventional systems cannot capture and break a whole nut because it pops out and escapes. While the over-center cutout portion shown in FIGS. 6E & 6F, engages and breaks a whole nut against chamber wall (sleeve 626) has been found to be suitable for the processing of whole peanuts, it has been discovered that this arrangement is still limited when processing larger whole nuts, for example pistachios or almonds.

Figure 7:
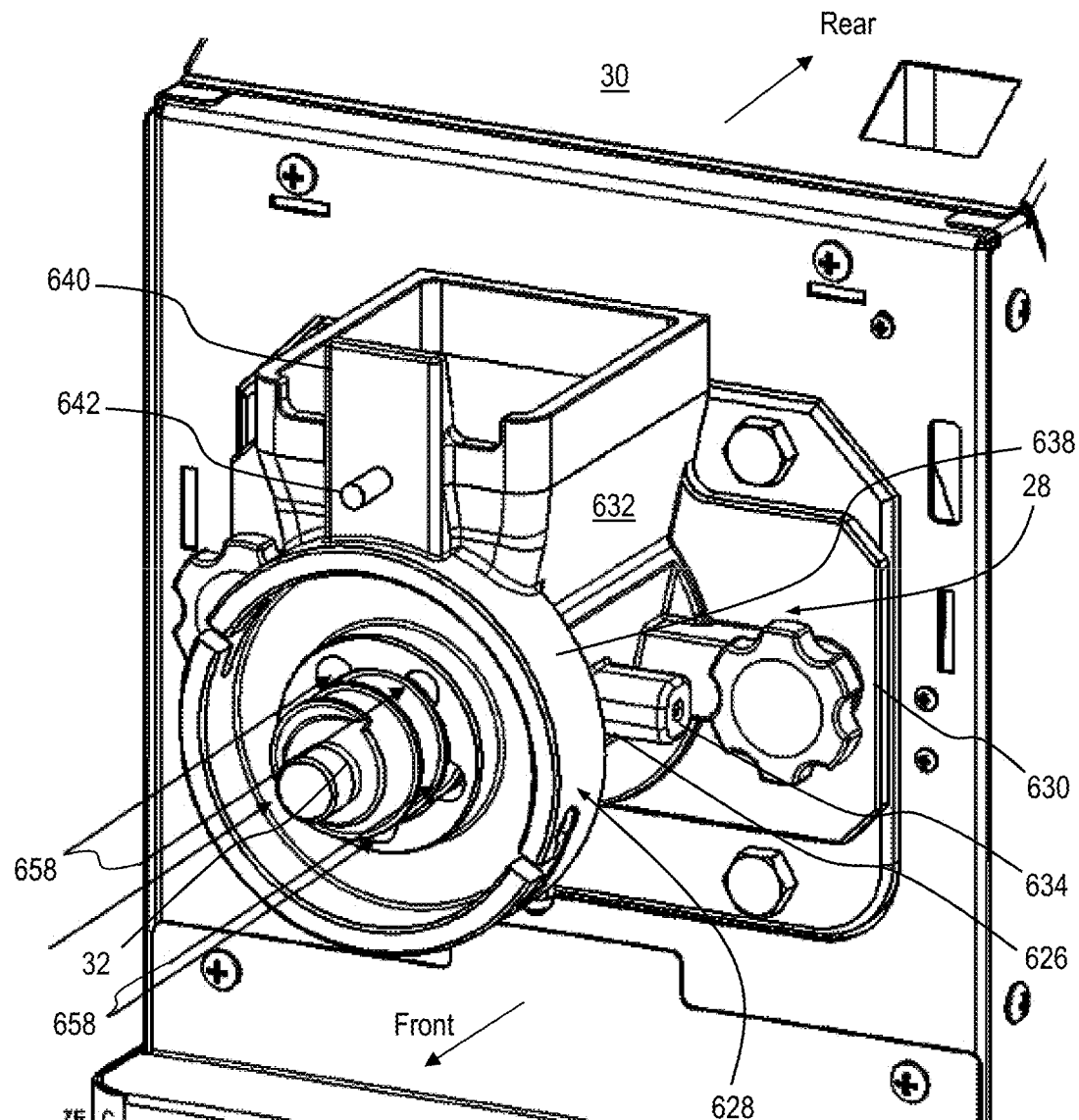
FIG. 7 is a front perspective view of the viscous food product grinding and dispensing system shown with the rear fixed grinder removed.

Referring to FIGS. 6K and 7, the rear portion of front housing 628 includes a plurality of radially equally spaced-apart flutes 658 disposed around transport device 32. Flutes 658 are longitudinal recesses along a portion of the interior surface of sleeve 626, configured in number and size to maximize product flow from sleeve 626 forward toward milling device 618. In the embodiment shown in FIG. 6K, the bottom three flutes 658 extend rearwardly along the interior surface of sleeve 626 below chute inlet 632 (see also FIG. 6A).

The number and size of flutes can be varied to adjust flow. In one example (FIG. 7), five flutes, each being approximately 8 mm in diameter, half depth, are utilized. In another example, 4 flutes are used which results in a lower flow rate and lower current draw on the motor.

Figure 8:
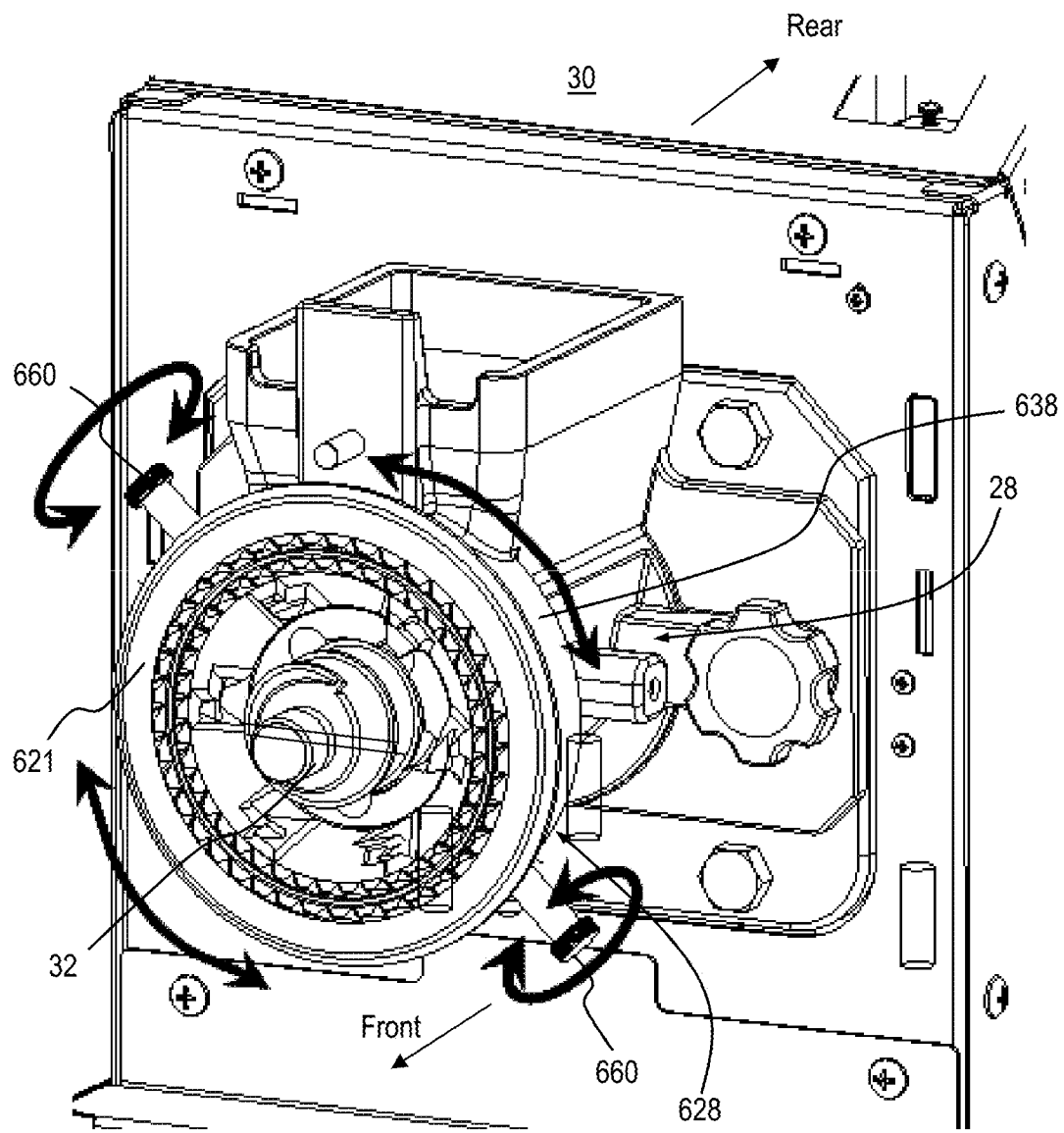
FIG. 8 is a front perspective view of the viscous food product grinding and dispensing system.
Figure 9:
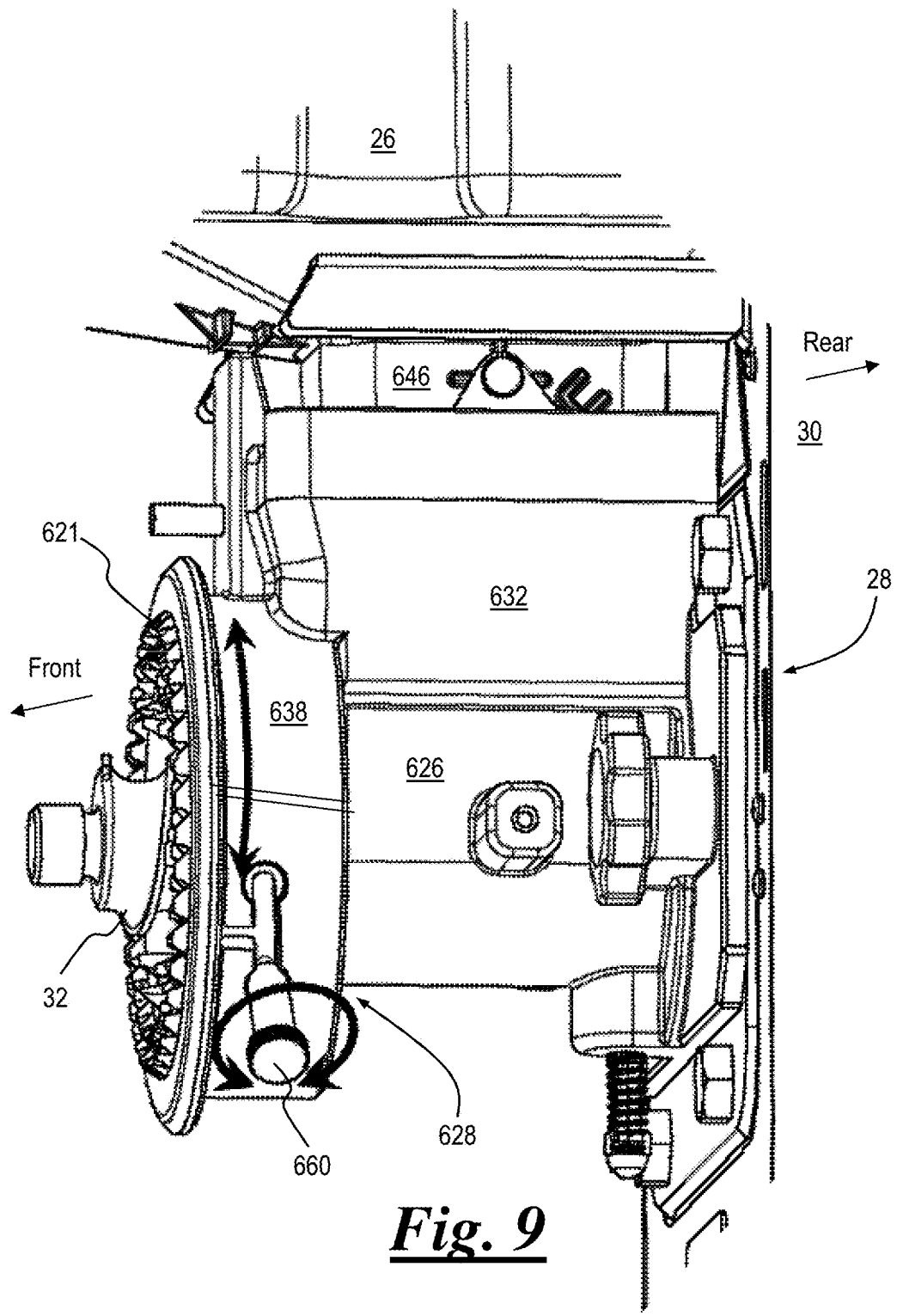
FIG. 9 is a side perspective view of the system of FIG. 3 shown with the front rotating grinder and discharge cover removed.

Referring to FIGS. 8 and 9, a pair of opposing texture adjustment screws 660 accessible through annular perimeter 638 allow adjustment of viscous food paste texture from coarse to fine. For nut products, the adjustments result in crunchy or creamy nut butter. Texture adjustment screws 660 are inserted through openings in annular perimeter 638 and are secured in corresponding helical slots within rear fixed grinder 621. Adjustment is made by loosening texture adjustment screws 660 and rotating the rear fixed grinder 621, relative to the longitudinal axis of transport device 32, into the desired position closer or further away from front rotating grinder 619, then re-tightening the texture adjustment screws. Preferably, the adjustment does not require the use of special tools, and the screws can be manually rotated. The top end of texture adjustment screws 660 may be any suitable type of thumb screw, such as including a knurled surface to allow ease of manual operation.

Figure 10:
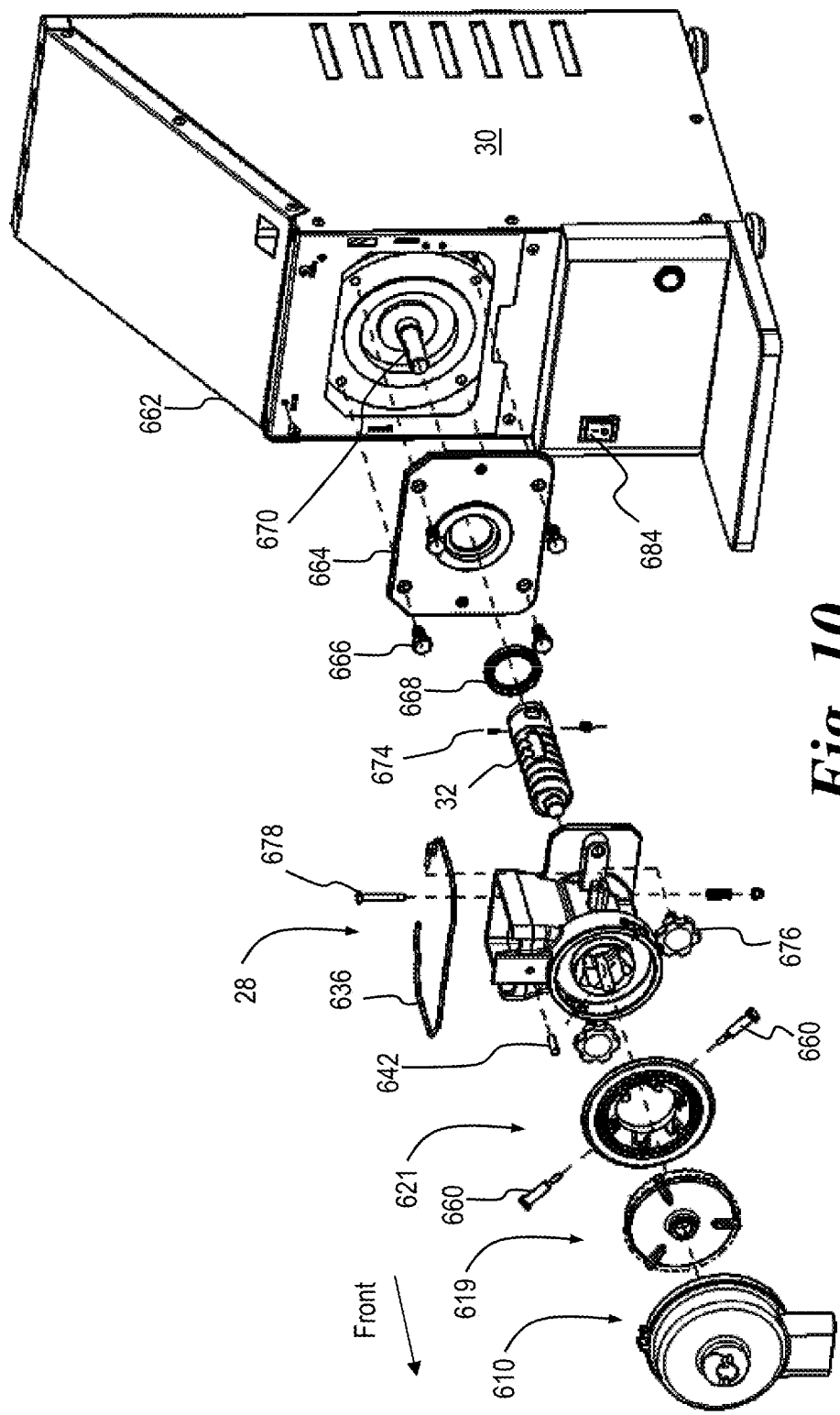
FIG. 10 is an exploded view of the viscous food product grinding and dispensing system, shown with the bin removed.
Figure 11:
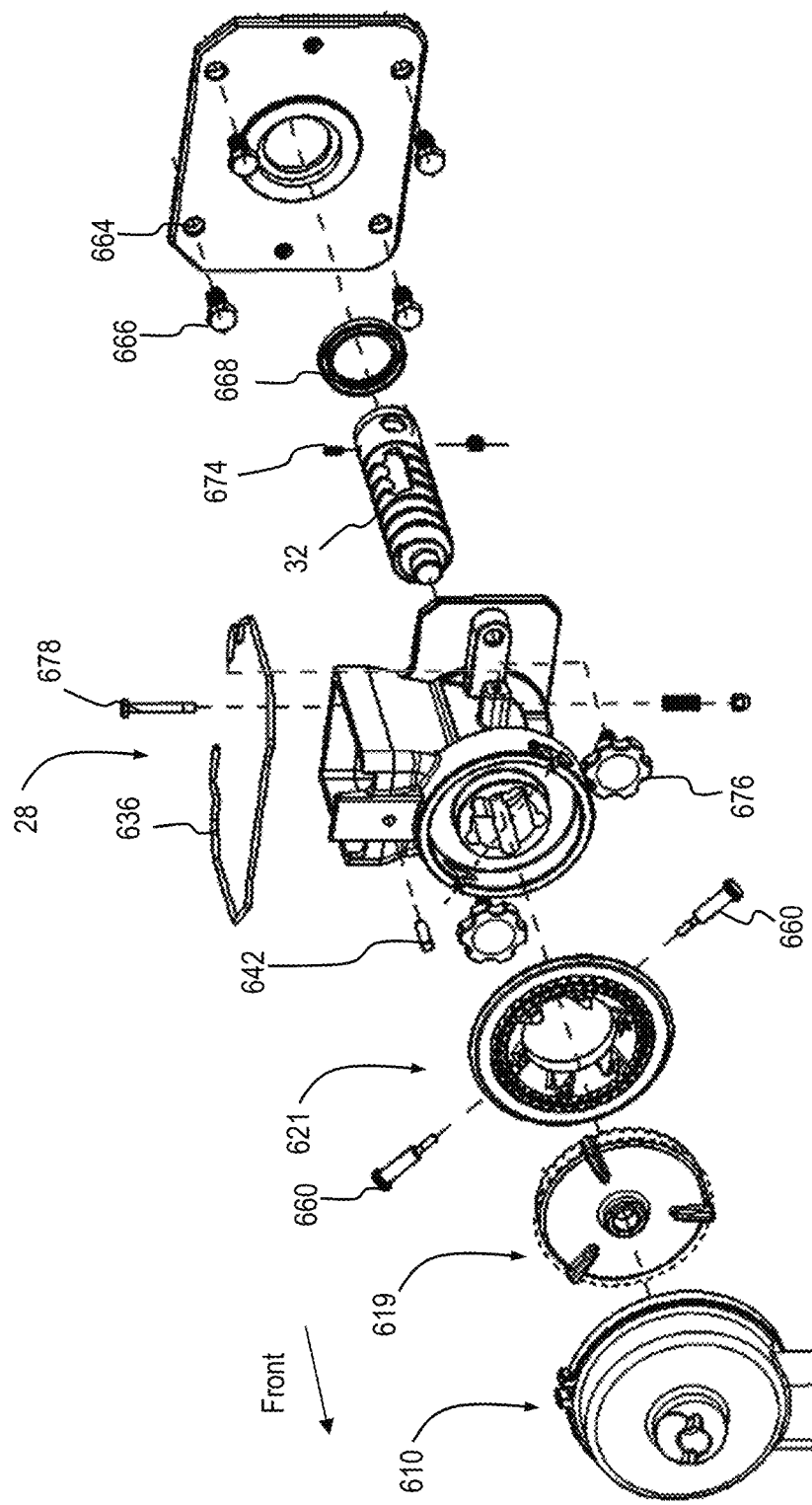
FIG. 11 is the exploded view of FIG. 10 shown without the power source and enclosure.

Referring to FIGS. 10 and 11, manual fasteners may be used for assembly and disassembly of transport section 28, transport device 32, and outlet adapter 610 from power source 30. Assembly and disassembly without special tools acts to reduce device-cleaning time and product change-over time, and reduces the potential for loss of special tools. Referring to FIG. 10, power source 30 is protected by an enclosure 662. A backer plate 664 is secured to enclosure 662 via thumb screws 666. A ring 668 is placed in an opening in backer plate 664, and a shaft 670 of a motor 672 (see motor in FIG. 12) extends forward through the opening.

The rear end of transport device 32 is secured to shaft 670 via screw set 674. Next, transport section 28 is inserted onto transport device 32 and rear plate 630 is secured to backer plate 664 via knobs 676. Then the transport device is secured to the transport section via fastener set 678. The rear fixed grinder is secured to front housing 628 via texture adjustment screws 660, as described above. Front rotating grinder 619 is inserted onto the front of transport device 32, and outlet adapter 610 is secured to front housing 628 via post 642 and clamp bar 636 as described above. Thus, as the front end of transport device 32 is coupled to front rotating grinder 619, the front rotating grinder is operably coupled to power source 30.

Figure 12:
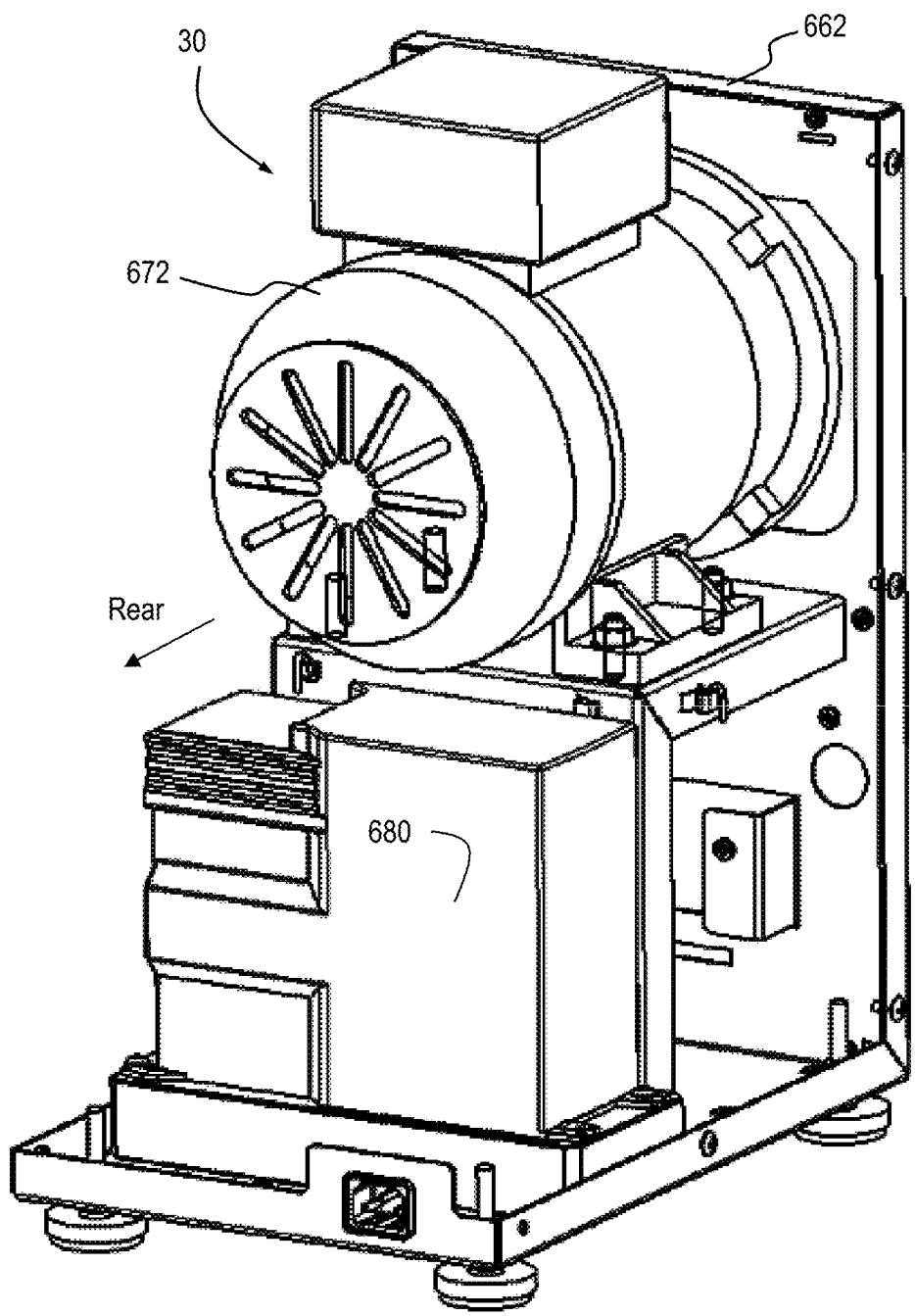
FIG. 12 is a rear perspective view of the power source and enclosure of FIG. 10 shown with a rear portion of the enclosure removed.
Figure 13:
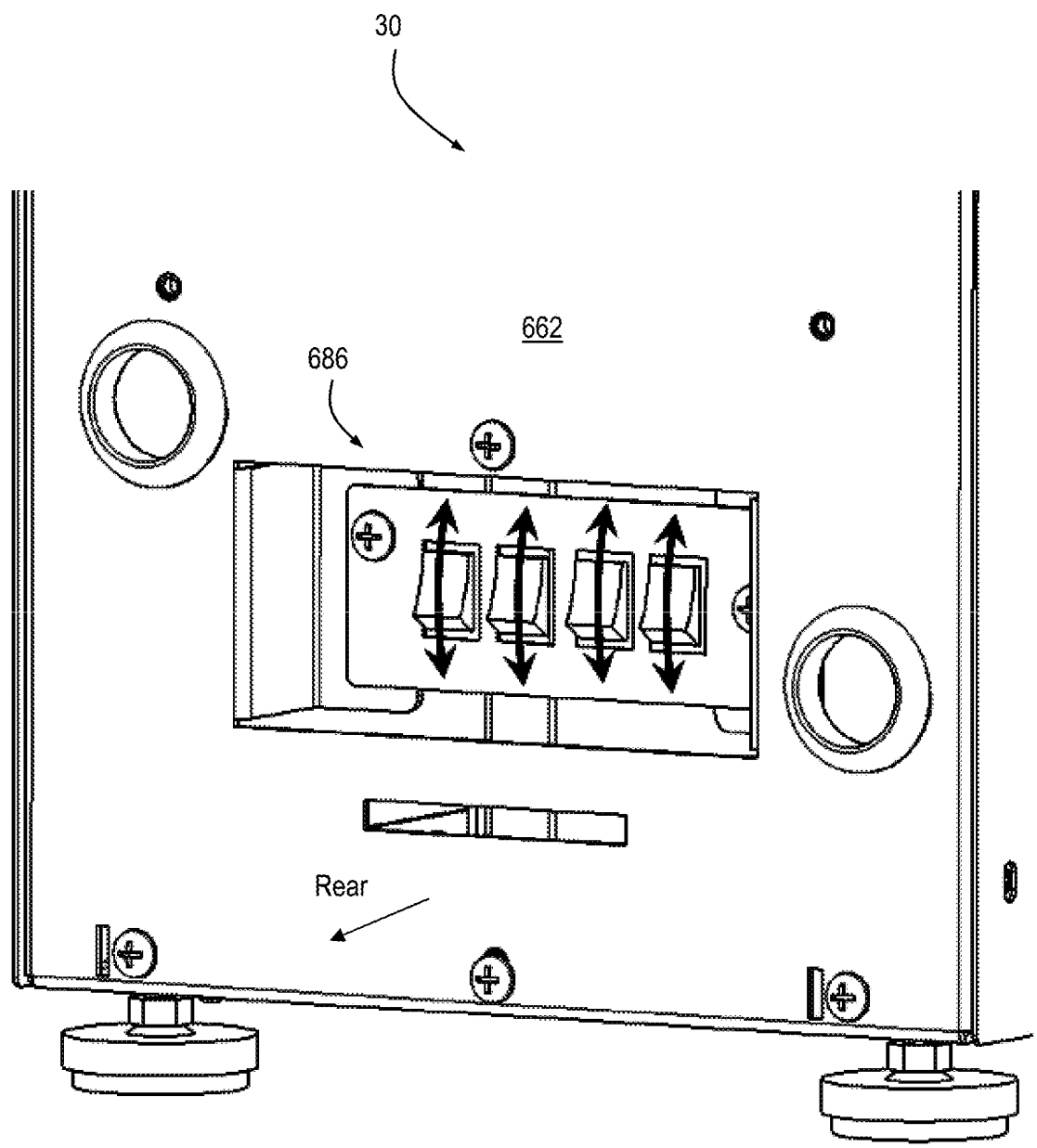
FIG. 13 is a partial rear perspective view of the power source enclosure of FIG. 10.
Figure 14:
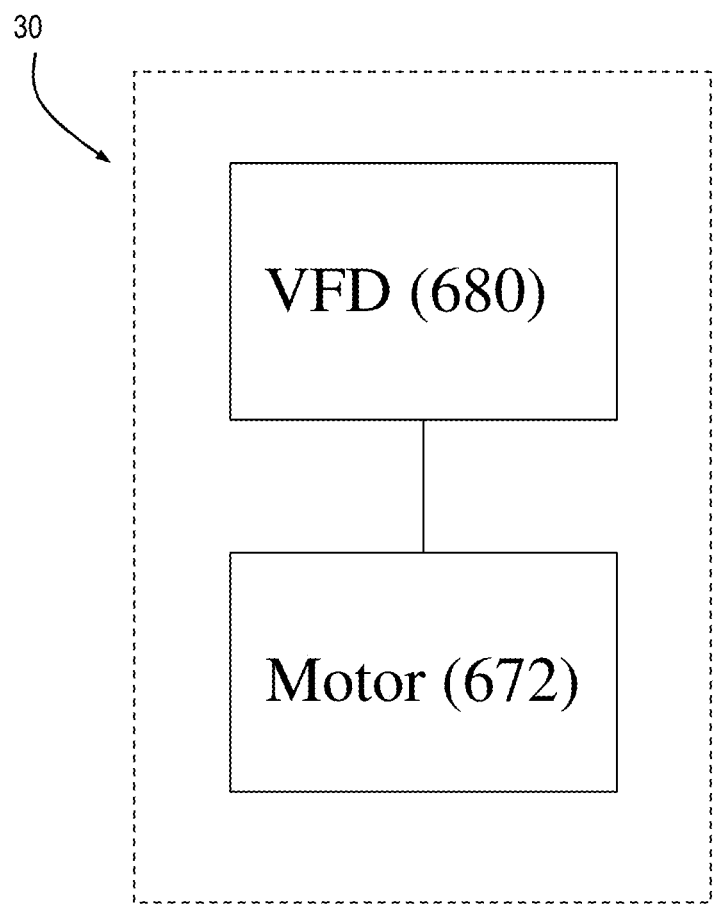
FIG. 14 is a block diagram of the power source of FIG. 10.

Referring to FIGS. 12 through 14, power source 30 further includes a variable frequency drive (VFD) controller 680 operatively connected to motor 672. VFD controller 680 is in electrical communication with motor 672 and operator interfaces, which include an on/off switch 684 (shown in FIG. 10) and a time adjustment feature 686 (shown in FIG. 13).

VFD controller 680 enables motor 672 to operate using various world-wide input voltages and frequencies, and maintains improved torque and horsepower. Further, VFD controller 680 includes overload protection with single push button recovery and PLC controllability to provide specific user-selectable and customizable torque/speed profiles via computer program profiles.

In one embodiment, a 60 Hz, 110 Volt, 3 phase, VFD controlled, 1.5 hp motor is used. This arrangement allows high torque from a relatively smaller motor. Conventional systems utilize single phase motors that are necessarily larger. In another embodiment, a 230V, 50 Hz system is provided. The following input power options are preferred: 110V/60 Hz, 220V/60 Hz, and 230V/50 Hz.

Referring to FIG. 13, a group of toggle switches in the rear side of enclosure 662 facilitates a time adjustment feature 686. The switches are operatively connected to VFD controller 680. Time adjustment feature 686 allows selection from a plurality of pre-determined run times for motor 672.

For example, the pre-determined run times may be selected from a range of 15 seconds to 180 seconds. Time adjustment feature 686 is a "user-friendly" feature that takes the guess work out of adjusting unit run time. For example, it may include a series of four toggle switches, the first switch corresponding to 15 seconds, the second corresponding to 70 seconds, the third corresponding to 125 seconds and the fourth corresponding to 180 seconds run time. User positioning of on/off switch 684 to the "on" position causes activation of system 12 through VFD controller 680. Activation of system 12 causes motor 672 to operate for the maximum pre-determined run time, unless overridden by the user positioning the on/off switch 684 to the "off" position.

Figure 15:
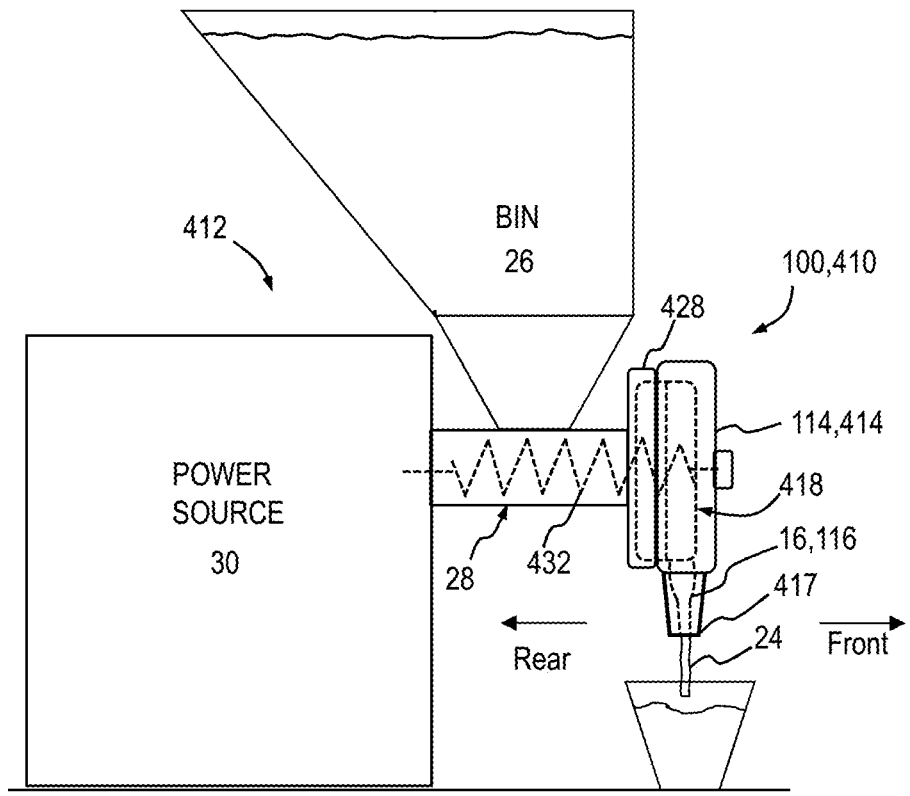
FIG. 15 is a schematic side view of an example of the viscous food product grinding and dispensing system.
Figure 16:
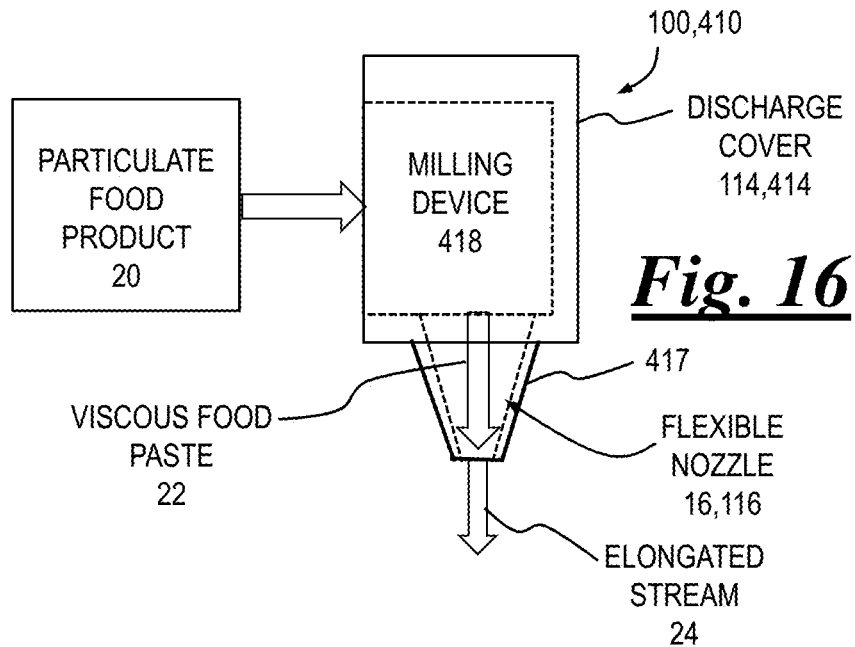
FIG. 16 is a schematic flow diagram of the system of FIG. 15.

The general arrangement of alternative outlet adapters 100/410 for a viscous food product grinding and dispensing system 412 are shown in FIGS. 15 and 16 according to various embodiments of the present invention. Outlet adapters 100/410 include a discharge cover 114/414 and a flexible nozzle 16/116. Discharge covers 114/414 are configured to house a milling device 418 (similar to milling device 618) and to receive flexible nozzle 16/116. System 412 includes a bin 26 for storage of particulate food product 20, gravity fed transport section 28 that receives the particulate food product and a power source 30 that drives a transport device 432 as well as milling device 418. Transport device 432 is located within transport section 28 and operates to move particulate food product 20 downstream to milling device 418. In operation, milling device 418 receives a supply flow of particulate food product 20 and processes the particulate food product into a pressurized supply flow of viscous food paste 22 for dispensing through nozzle 16/116 as an elongated stream 24.

Figure 17:
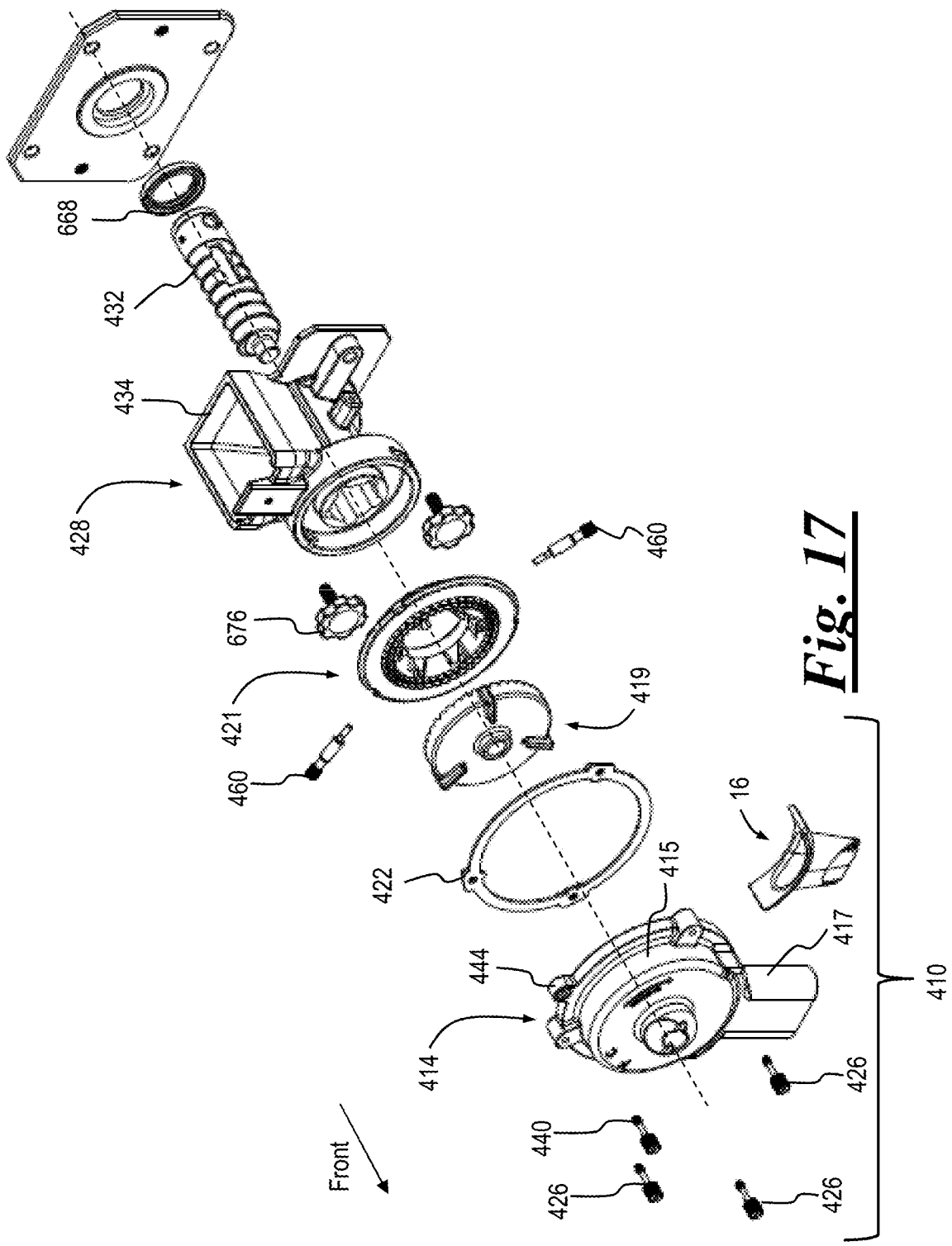
FIG. 17 is an exploded view of the transport section, outlet adapter, and milling device of FIG. 15.

Now referring to FIG. 17, discharge cover 414, being similar to discharge cover 614, has a generally cylindrical shape and includes an annular sidewall 415. Discharge cover 414 also includes a spout 417 configured to act as an environmental guard and tamper deterrent for surrounded flexible nozzle 16.

The interior of discharge cover 414 may be curved to align adjacent the outer curved surface of milling device 418. Milling device 418 includes a front rotating grinder 419 and a rear fixed grinder 421.

Outlet adapter 410 also includes a gasket 422 fastened to the rear of discharge cover 414 via fasteners 426. Gasket 422 provides improved sealing of discharge cover 414 against rear fixed grinder 421. In assembly, discharge cover 414 with gasket 422 is aligned against a front housing 428, (may be secured by clamp bar 636, similar to discharge cover 614), and then post 440 is fastened to front housing 428 through receptor 444. Post 440 and fasteners 426 are configured to allow for installation both manually and by use of tools.

Figure 18:
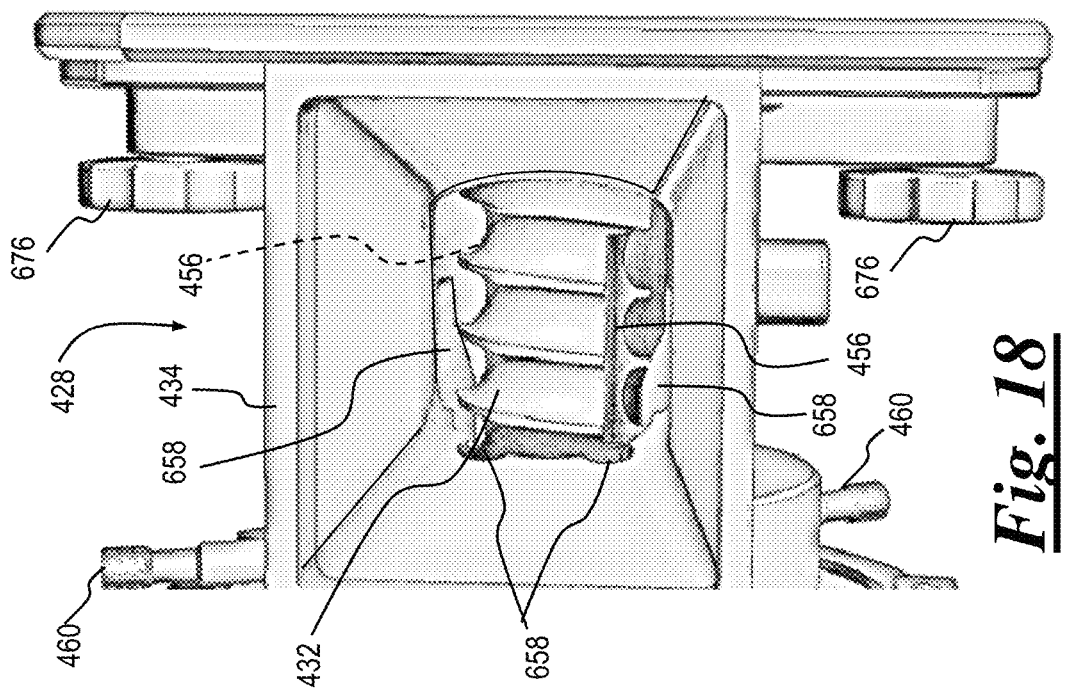
FIG. 18 is a partial top plan view of the assembled transport device inside the front housing of FIG. 17.
Figure 19:
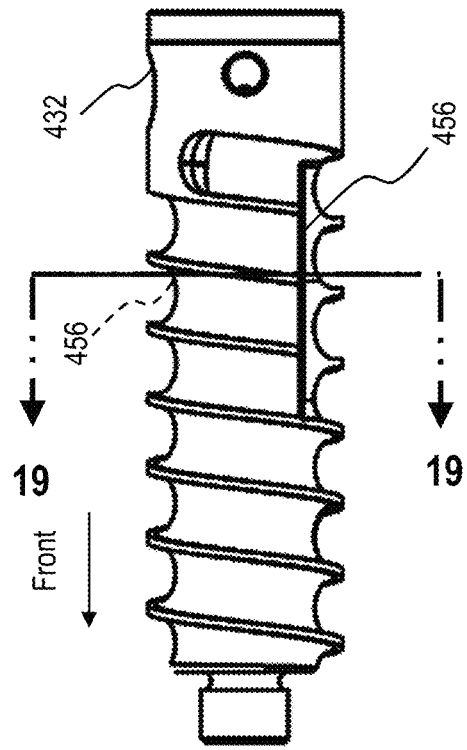
FIG. 19 is a top plan view of the auger/transport device of FIG. 17.

Now referring to FIGS. 18A, 18B and 19, transport device 432 is similar to transport device 32, except for including a hollow bore portion 454, and having two opposing cutouts 456 disposed at approximately 180 degrees out of phase, relative to each other. Cutouts 456 are aligned below the opening of a chute inlet 434.

Figure 20:
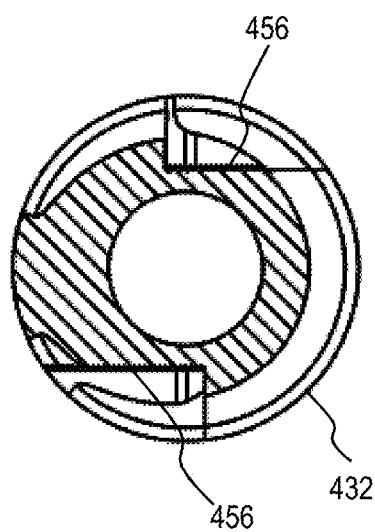
FIG. 20 is a rear view in section of the transport device of FIGS. 18 and 19.

Referring to FIG. 20, in some embodiments, transport device 432 is solid, and does not include hollow bore portion 454. In one embodiment, transport device 432 is formed with an outer diameter of about 35.5 mm, and cutouts 456 are formed with a depth of about 7.637 mm and a width of about 16.665 mm.

Figure 21:
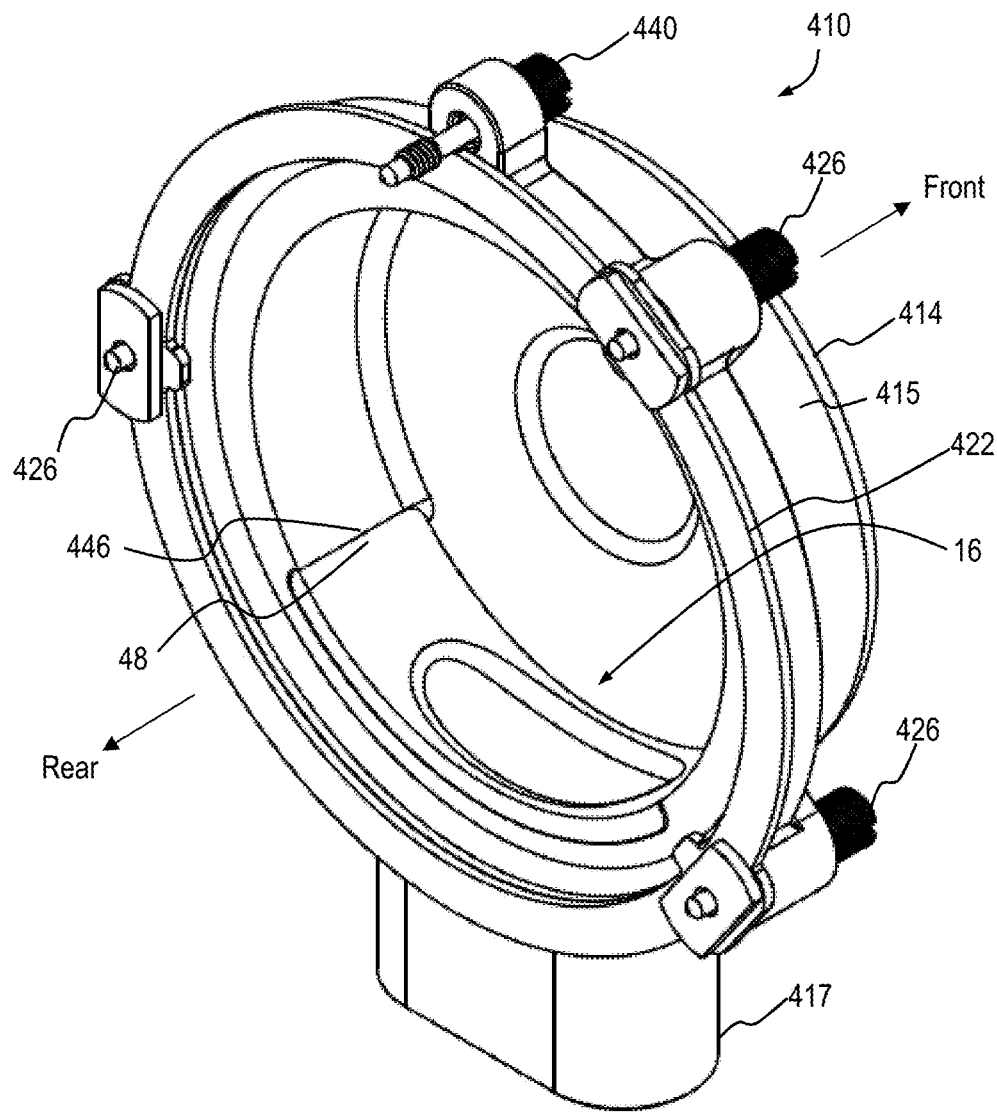
FIG. 21 is a rear perspective view of the outlet adapter of FIG. 17 with the nozzle assembled inside the discharge cover.
Figure 24:
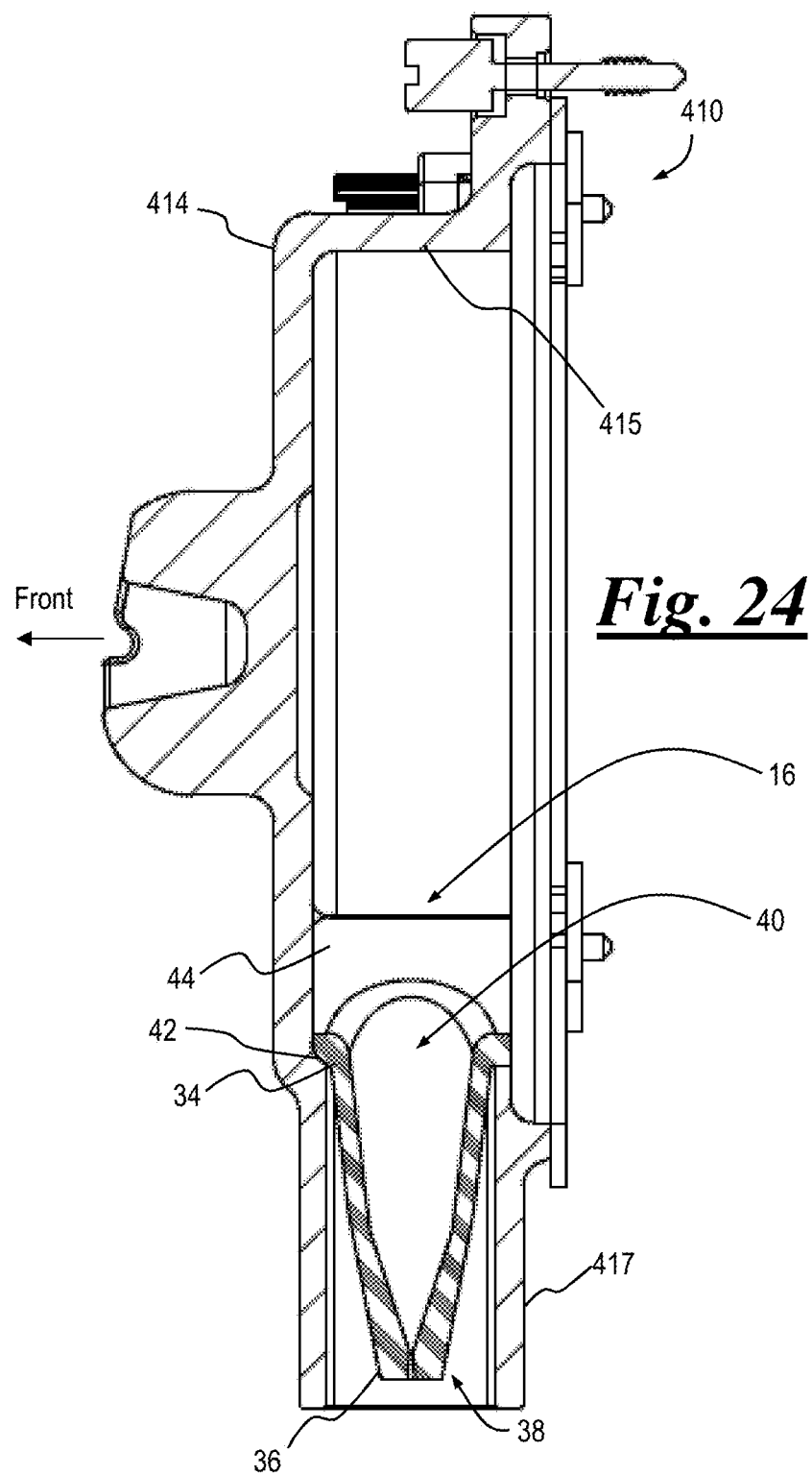
FIG. 24 is a short side view in section of the outlet adapter of FIG. 21.
Figure 25:
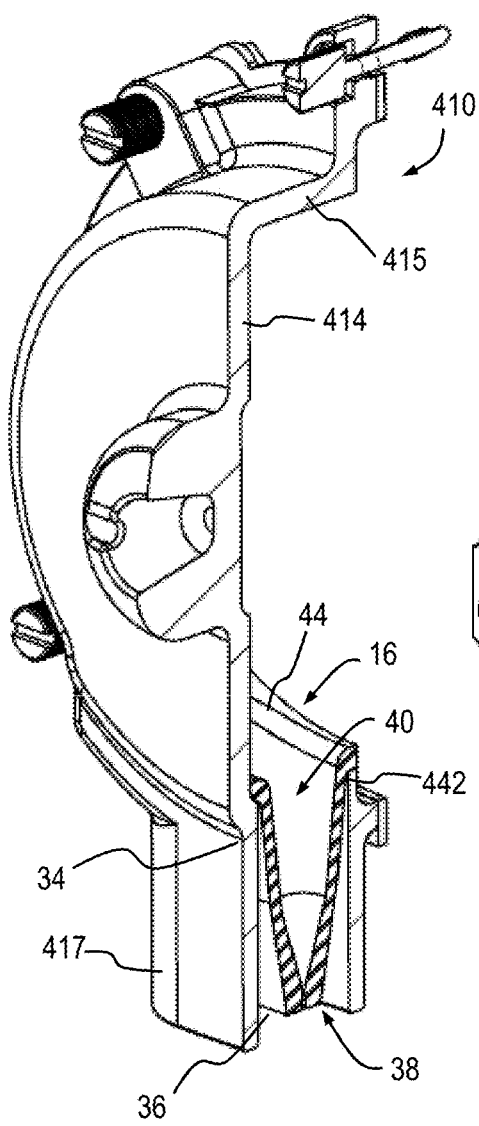
FIG. 25 is a right side perspective view in section of the outlet adapter of FIG. 21.
Figure 26:
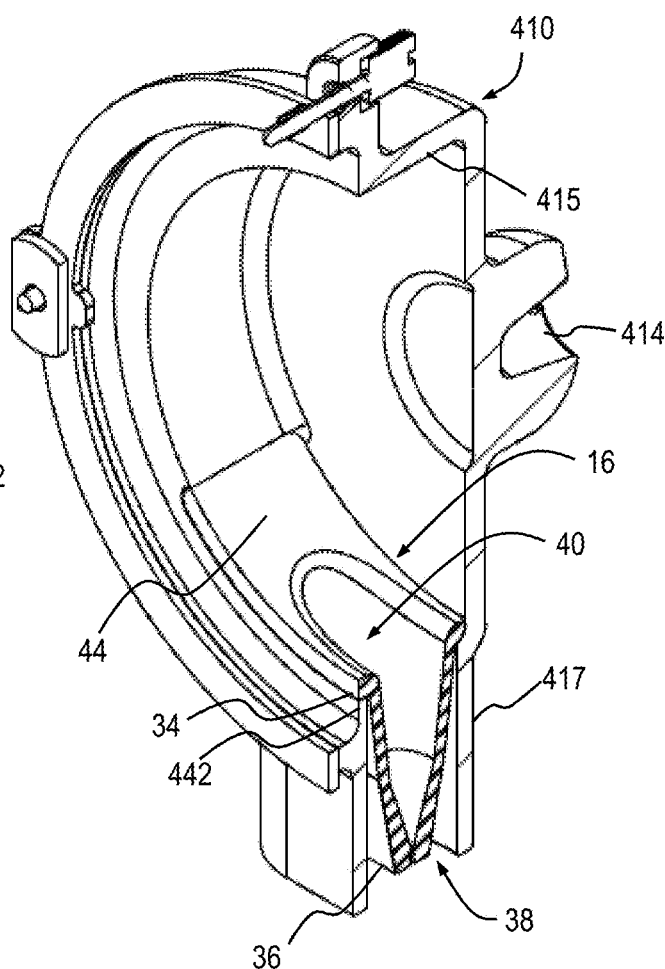
FIG. 26 is a left side perspective view in section of the outlet adapter of FIG. 21.
Figure 27:
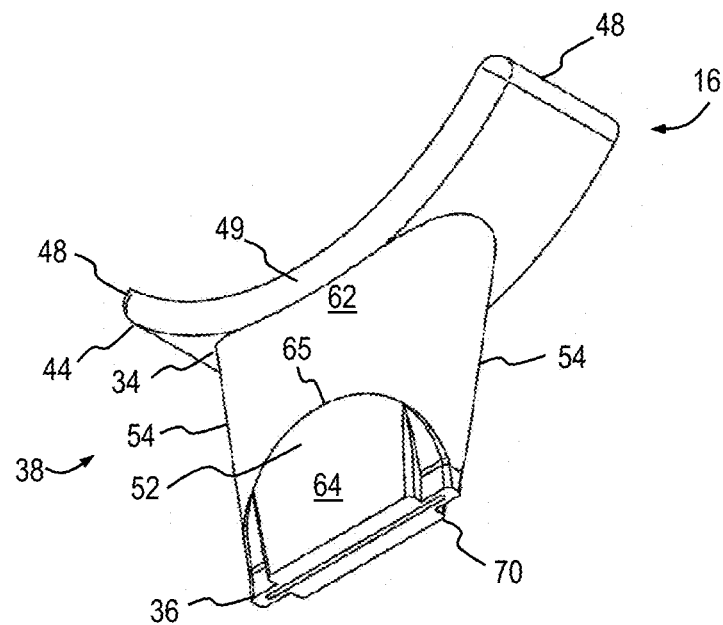
FIG. 27 is a bottom front perspective view of the flexible nozzle of FIG. 17.
Figure 28:
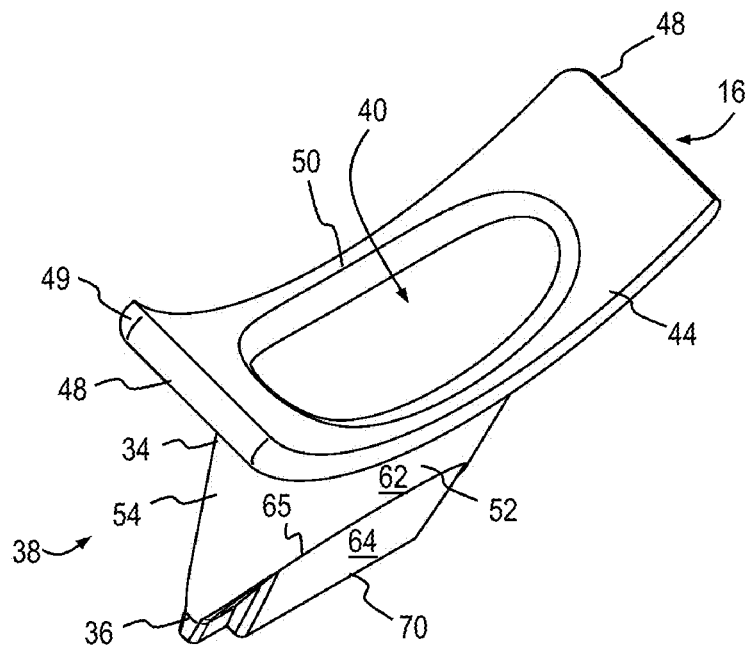
FIG. 28 is a top rear perspective view of the flexible nozzle of FIG. 27.
Figure 29:
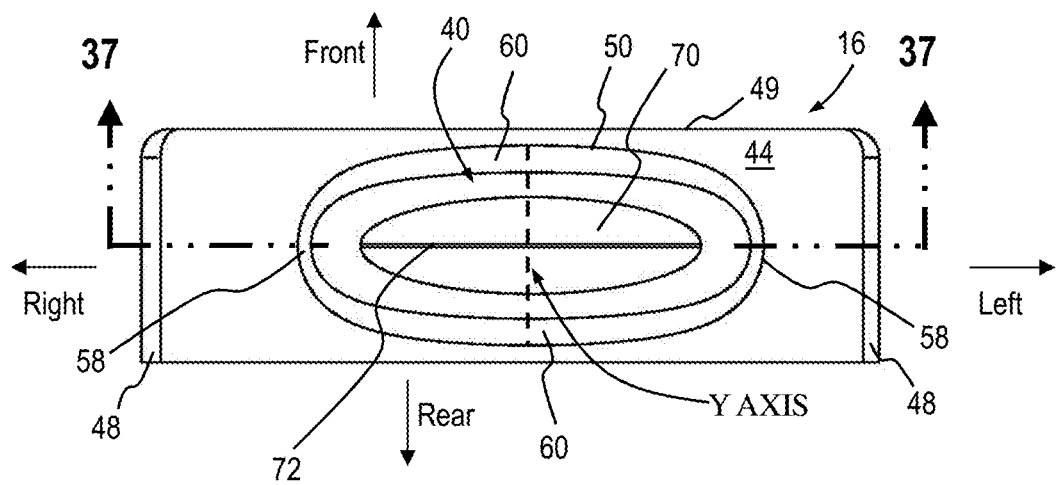
FIG. 29 is a top plan view of the flexible nozzle of FIG. 28.

Now referring to FIGS. 21-26, spout 417 extends from the bottom of annular sidewall 415, and encloses all of flexible nozzle 16, except the bottom outlet. Spout 417 may be integral or ancillary to outlet adapter 410. Referring to FIGS. 24-26, nozzle 16 includes a proximal end 34, a distal end 36. A valve 38 with a hollow interior passage 40 is formed in the nozzle. Nozzle 16 is coupled at the proximal end 34 to an aperture 442 in annular sidewall 415 of discharge cover 414. Nozzle 16 includes a mounting flange 44 at the proximal end 34 configured to fit against the concave curved interior surface of discharge cover 414. As seen in FIG. 21, discharge cover 414 may include a shoulder 446 configured to abut the outer edges 48 of mounting flange 44. As best seen in FIGS. 34 and 35, a perimeter edge 49 of flange 44 may include radius curved portions configured to seal against concave curved interior edge portions of discharge cover 414.

Valve 38 is biased in a normally closed position and flexes to an open position due to a pressure exerted by the discharge of viscous food paste 22 as it is forced downstream through interior passage 40, and returns to the normally closed position upon flow cessation. Valve 38 is configured with interior geometry features that pinch or chop against elongated stream 24 as the valve returns to the closed position, effectively slicing through, pinching, or breaking apart the elongated stream. Pinching elongated stream 24 within valve 38 reduces the amount of paste residue attached to the external face of the bottom of the valve after the valve returns to the closed position.

In some embodiments, the properties of viscous food paste 22 allow for an alternative flexible nozzle to be utilized. Such flexible nozzle has a discharge opening that also enlarges, or deforms, due to product stream pressurization, and returns to the closed position upon flow cessation. The severing of elongated stream 24 leaves substantially no paste residue attached to the external face of the bottom of the valve after the stream flow is de-pressurized.

In some embodiments, the properties of viscous food paste 22 allow for an alternative rigid or semi-rigid nozzle to be utilized. Such properties of viscous food paste 22 inherently result in a clean drop or severing of elongated stream 24 due to forces of gravity once the supply flow is depressurized. Such natural severing of elongated stream 24 leaves substantially no paste residue attached to the external face of the bottom of the valve after the stream flow is de-pressurized. In some embodiments, such clean dropping viscous food paste 22 may be dispensed with just the discharge cover in place, without any nozzle inserted. In some embodiments, the discharge cover does not utilize spout 417, and a separate, plastic sneeze guard (not shown) is supported in front of the discharge of valve 38.

In some embodiments, a suitable biasing device, such as a pinch roller set (not shown) is used to assist flexible nozzle 16 in returning to its original, closed position after the stream flow is de-pressurized. In operation, once the stream flow is de-pressurized, the pinch roller set is activated adjacent to proximal end 34 of valve 38. The rollers of the pinch roller set are urged closer together to slightly compress valve 38 as the rollers are moved downwardly towards the distal end 36. As valve 38 returns to the closed position, elongated stream 24 is severed, and leaves substantially no paste residue attached to the external face of the bottom of the valve. The pinch roller set is thereafter returned to a starting position. The operation of the pinch rollers can be achieved by various methods, including full or partial automation.

Referring to FIGS. 27-40, mounting flange 44 includes an opening 50 at proximal end 34 of interior passage 40. Opening 50 has an ovoid shape and is configured to receive viscous food paste 22. Interior passage 40 tapers asymmetrically in two dimensions (see FIGS. 30, 33-35) slightly from opening 50 downstream toward distal end 36.

Figure 37:
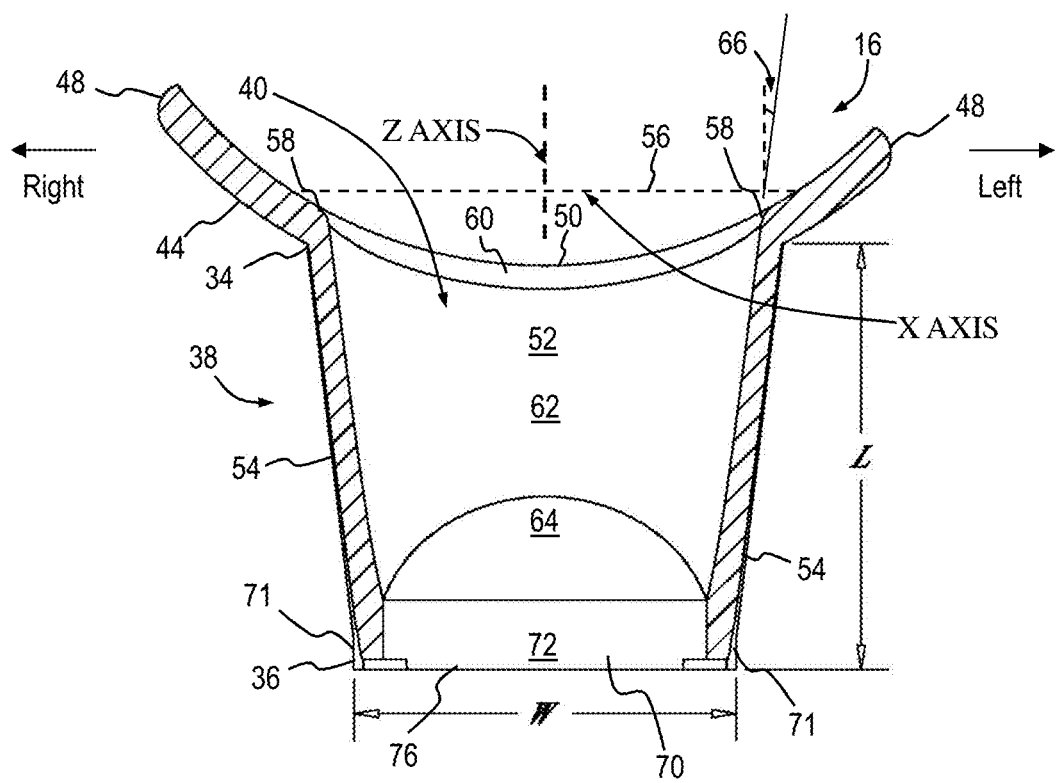
FIG. 37 is a long side view in section of the flexible nozzle of FIG. 28.
Figure 38:
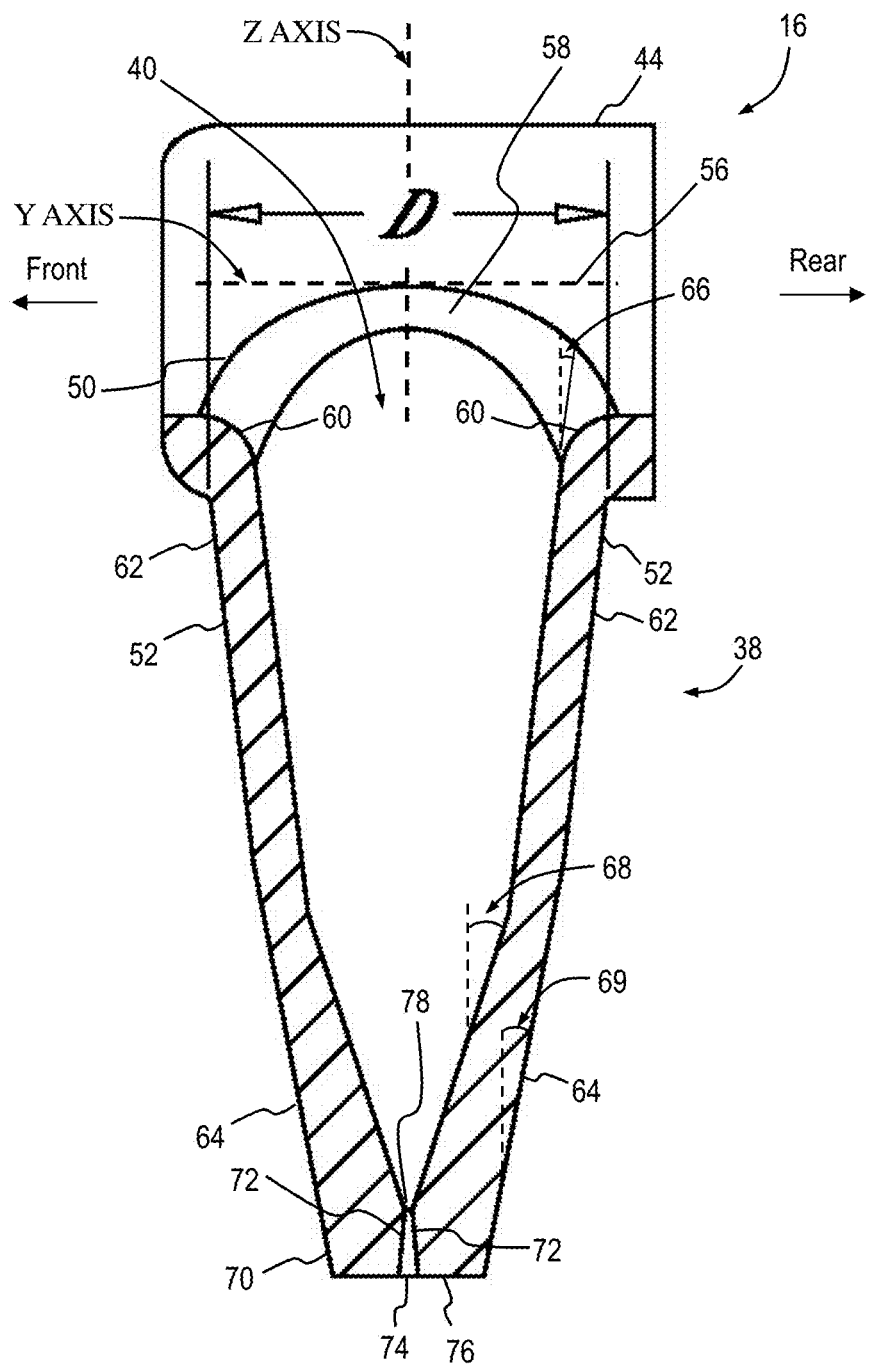
FIG. 38 is a short side view in section of the flexible nozzle of FIG. 28 prior to the flow of viscous food product.
Figures 39, 40:
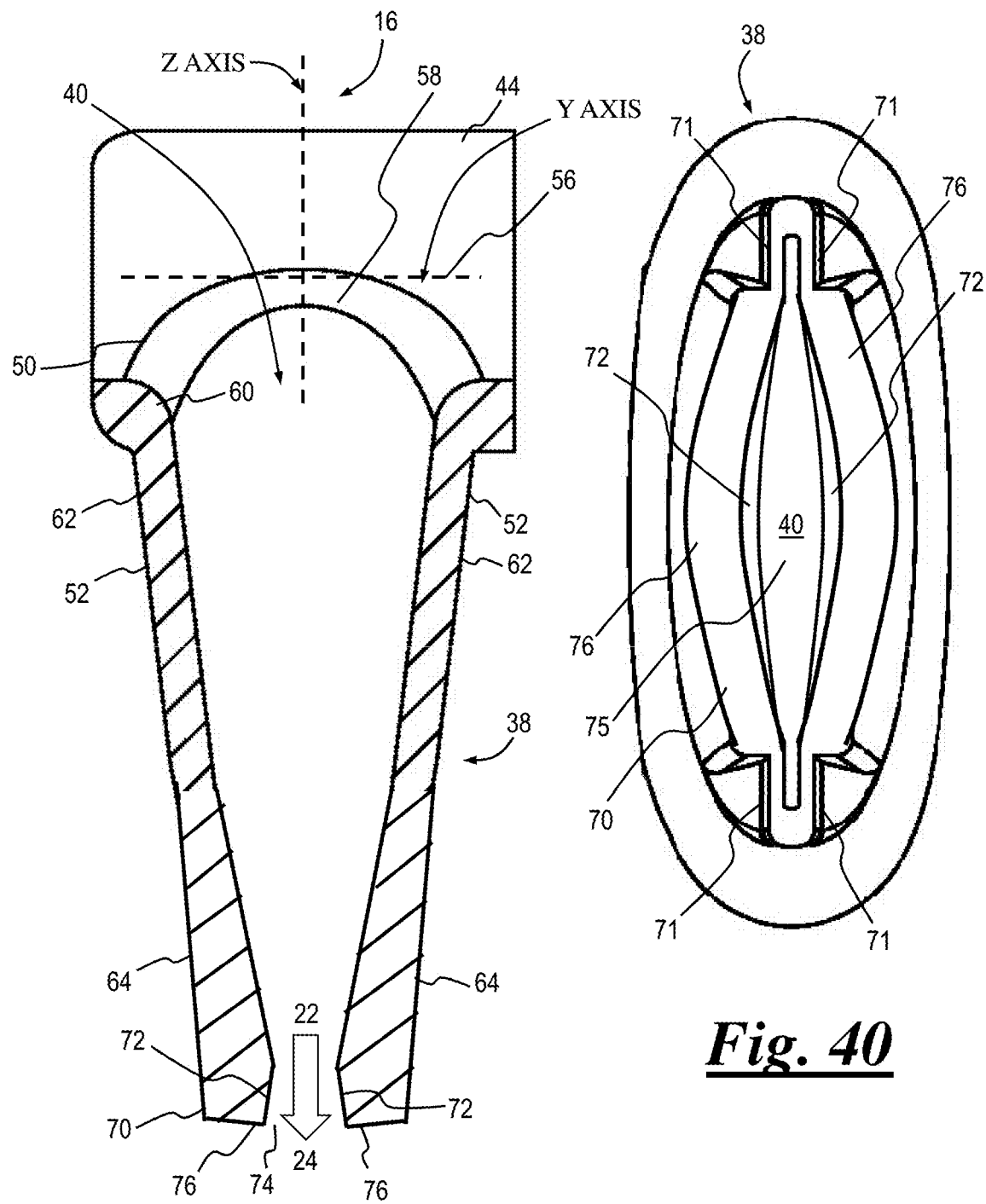
FIG. 39 is the flexible nozzle of FIG. 38 deformed during the flow of viscous food product.
FIG. 40 a bottom view of the deformed valve of the nozzle of FIG. 39.
Figure 41:
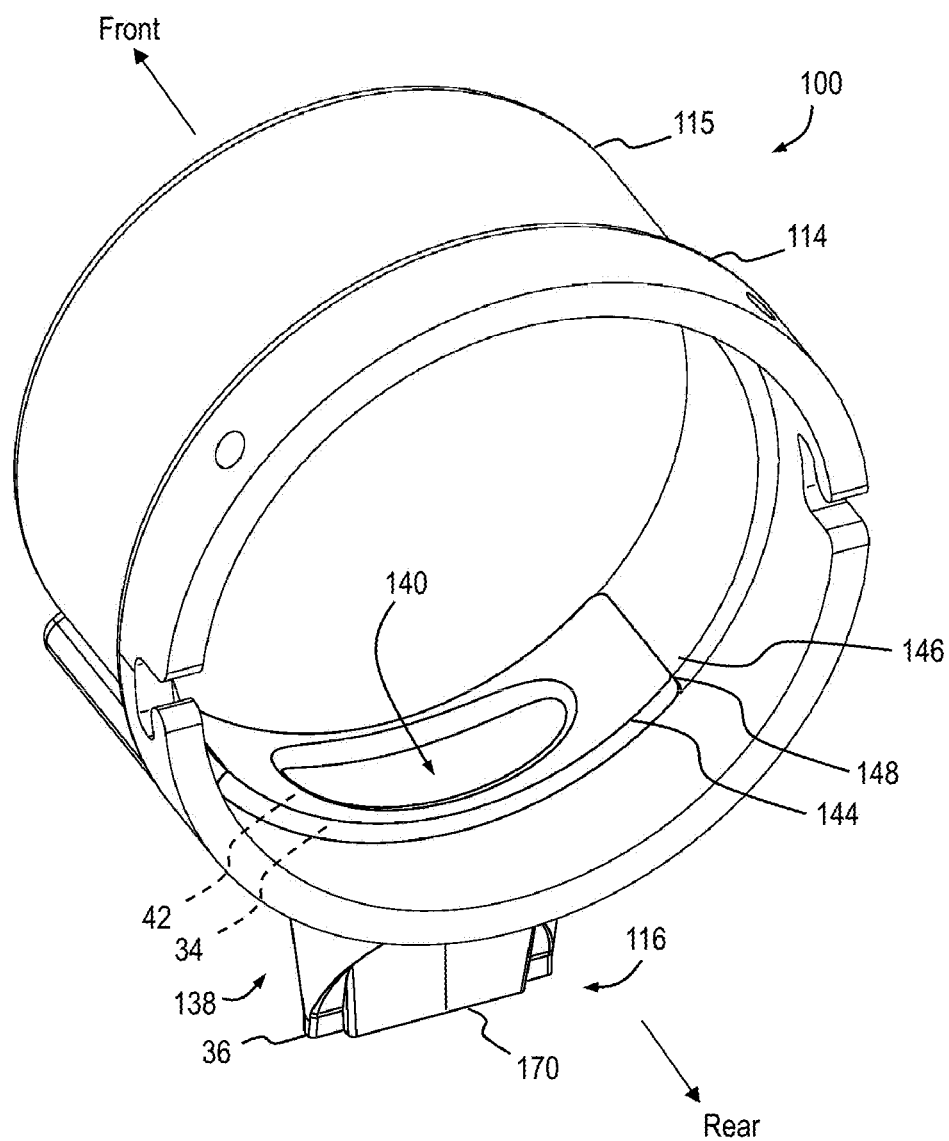
FIG. 41 is a rear perspective view of an outlet adapter according to another embodiment of the present invention.
Figure 42:
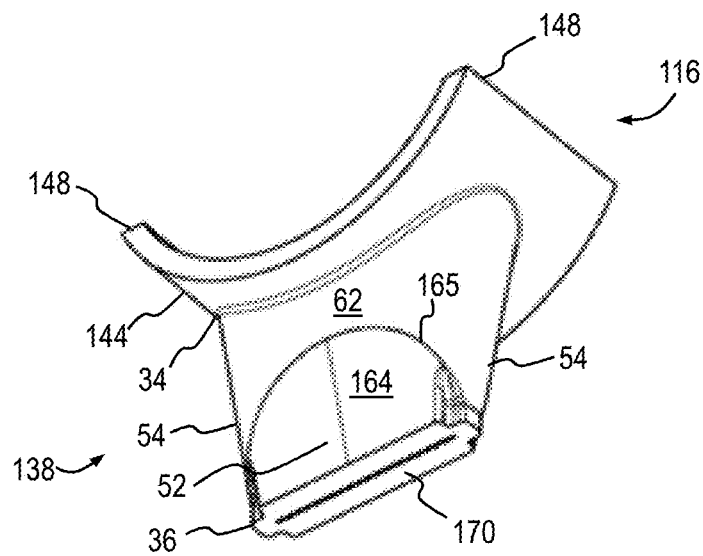
FIG. 42 is a bottom perspective view of the flexible nozzle of FIG. 18.

Valve 38 includes a pair of opposing flap walls 52 joined by a pair of opposing side walls 54, the flap walls and side walls together forming continuous interior passage 40. Referring to FIG. 37, valve 38 has a side exterior linear dimension length "L" and a bottom exterior linear dimension width "W". In one embodiment, "L" and "W" are from about 1.65 inches to about 2.2 inches, and preferably "L" is about 2.0 inches and "W" is about 1.65 inches. Referring to FIG. 38, valve 38 has an exterior linear dimension depth "D" of about 0.75 inches to about 1.25 inches, and preferably about 0.85 inches.

Figure 30:
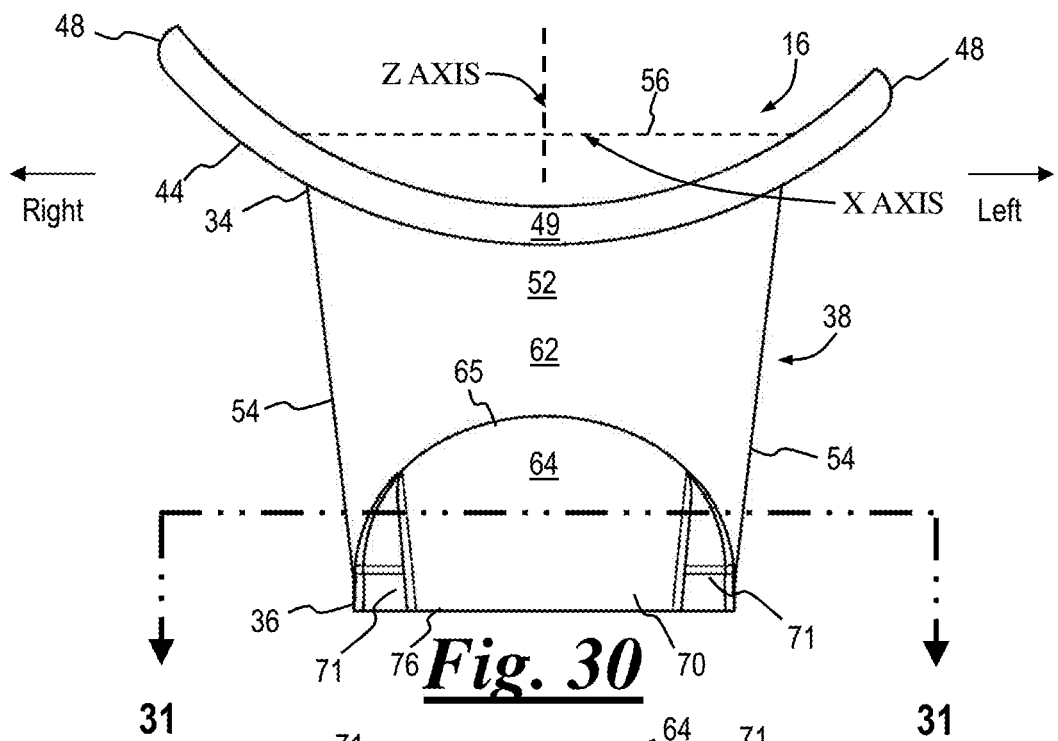
FIG. 30 is a rear elevation view of the flexible nozzle of FIG. 28.
Figure 31:
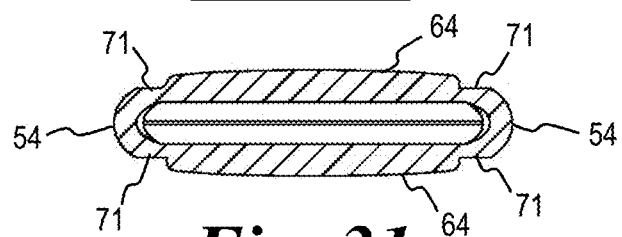
FIG. 31 is a horizontal section view of the flexible nozzle of FIG. 28.
Figure 32:
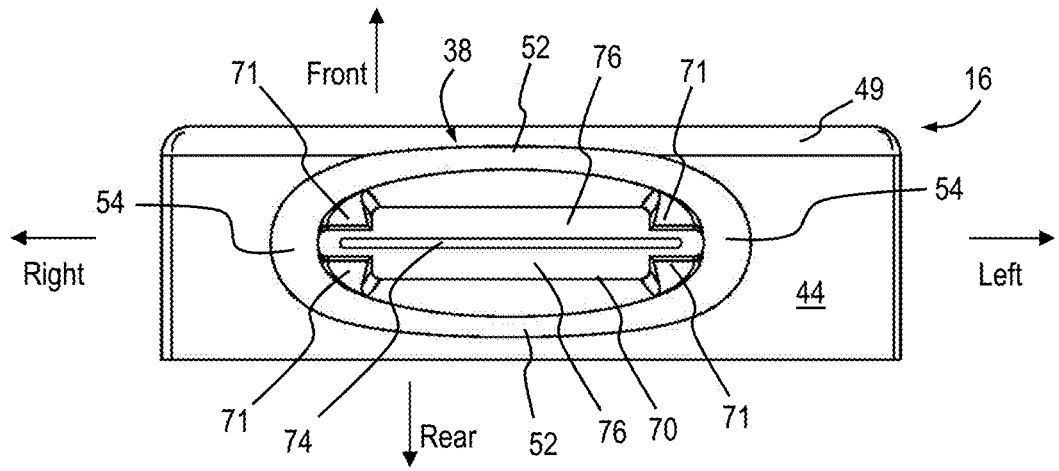
FIG. 32 is a bottom plan view of the flexible nozzle of FIG. 28.
Figure 33:
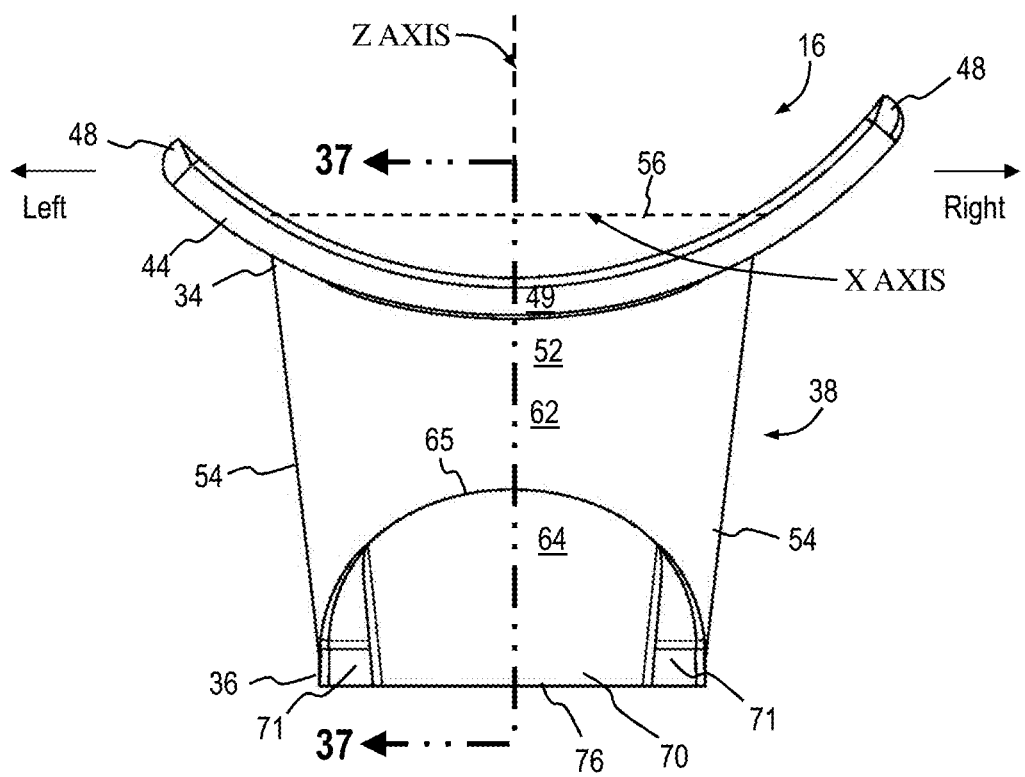
FIG. 33 is a front elevation view of the flexible nozzle of FIG. 28.
Figure 36:
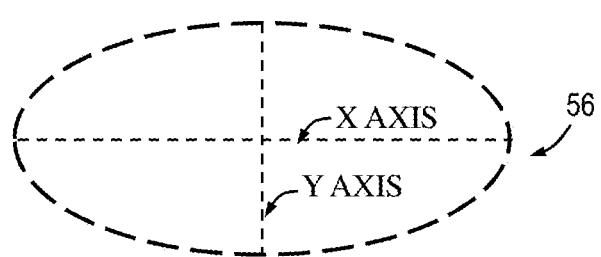
FIG. 36 is a top plan view of a reference planar oval relative to the flexible nozzle of FIG. 28.

Referring to FIGS. 30, 33 and 36, a reference planar oval 56 is visualized as located above opening 50, in the X-Y plane; the reference planar oval having a central X axis, Y axis and perpendicular Z axis. Opening 50 has a generally concave curvature about the Y axis configured to match the curvature of annular sidewall 415 of discharge cover 414. To reduce pressure drop of the pressurized supply flow of viscous food paste 22 through opening 50, the interior transition from flange 44 to side walls 54 and flap walls 52 is formed in a radius curvature. Referring to FIGS. 29-39, the transition from flange 44 to side walls 54 has a generally convex curvature 58 relative to the Z axis and the transition from the flange to flap walls 52 has a generally convex curvature 60 relative to the Z axis.

Valve 38 is biased in a normally closed position (see FIG. 38) and flexes to an open position (see FIG. 39) due to a pressure exerted by the discharge of viscous food paste 22. Valve 38 has a generally duckbill shape, and includes a sheath portion 62 and a flexible portion 64. Sheath portion 62 is located on side walls 54 and on the upper portion of flap walls 52. On flap walls 52, flexible portion 64 forms a curved interface 65 with sheath portion 62. Sheath portion 62 is configured with a lesser interior taper angle 66 from about 7 degrees to about 8 degrees relative to the Z axis. Flexible portion 64 is located on flap walls 52 and is configured with a greater interior taper angle 68. In one embodiment, the wall thickness of flexible portion 64 increases as it tapers towards port 70. At the section center cut of FIG. 38, the greater interior taper angle 68 is about 18 degrees and a greater exterior taper angle 69 is from about 11 degrees to about 14 degrees, relative to the Z axis. Flexible portion 64 is configured to be biased in a normally closed position and flexes outward slightly toward the exterior as the pressurized supply flow of viscous food paste 22 is forced downstream through interior passage 40 (see FIG. 39).

Interior passage 40 is defined by opening 50 and the proximal ends 34 of flap walls 52, having a generally ovoid cross-section about the Z axis, that gradually decreases in cross sectional area downwardly (along the Z axis) towards a normally closed port 70 of flexible nozzle 16 at distal end 36. Port 70 is configured for operation from the biased normally closed position to the open position for discharge of viscous food paste 22 in the elongated stream 24. Elongated stream 24 may be captured by the user within a container below port 70 (see FIG. 15).

Port 70 is configured such that the force from the pressurized supply flow of viscous food paste 22 urges the port open and once the supply flow is depressurized and the force ceases, the removal of the force causes the port to return to the normally closed position (FIG. 38). Port 70 will move to the open position when the product processing pressure of the supply flow of viscous food paste 22 reaches a predetermined valve threshold pressure, and will return to the closed position when the product processing pressure falls below the valve threshold pressure.

Each flexible portion 64 includes opposing pairs of tapered stiffening portions 71 adjacent to side walls 54. At each side wall 54 adjacent stiffening portions 71 taken together are configured to be from about two-thirds to about one-half of the width of port 70 at distal end 36, and are configured to assist in biasing the port into the closed position.

Port 70 includes a pair of opposing gates 72 at the distal end 36 of the interior surfaces of flap walls 52. In the closed position, gates 72 have the appearance of a substantially closed elongated slit. As gates 72 are forced open by the pressurized supply flow of viscous food paste 22 to form an outlet 74. As the slit opens, the middle portion thereof opens relatively more than the end portions to form a bulbous middle portion 75. In other words, gates 72 each deform in a generally bell-like, somewhat concave curvature, to form an ovaloid shaped middle portion 75 of outlet 74 (see FIG. 40).

Valve 38 of nozzle 16 is configured to reduce the amount of paste residue attached to external face 76 by effectively severing the elongated stream 24 without causing excessive pressure drop when the valve is in the open position.

Referring to FIG. 38, gates 72 are configured to be angled slightly relative to each other along the X axis from a pinch point 78 down towards a gap at outlet 74, and thus are biased to abut close together at the pinch point when port 70 is in the normally closed position. As such, gates 72 of port 70 are configured to pinch or chop against elongated stream 24 as the port returns to the closed position, effectively slicing through or breaking apart the elongated stream. The severed elongated stream 24 falls into the user's container below, thereby reducing the amount of residue viscous food paste 22 remaining attached to external face 76 of port 70.

Figure 43:
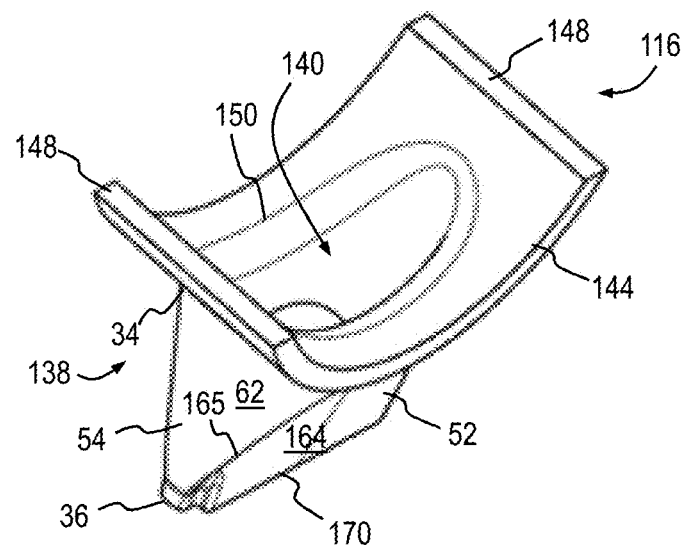
FIG. 43 is a top perspective view of the flexible nozzle of FIG. 18.
Figure 44:
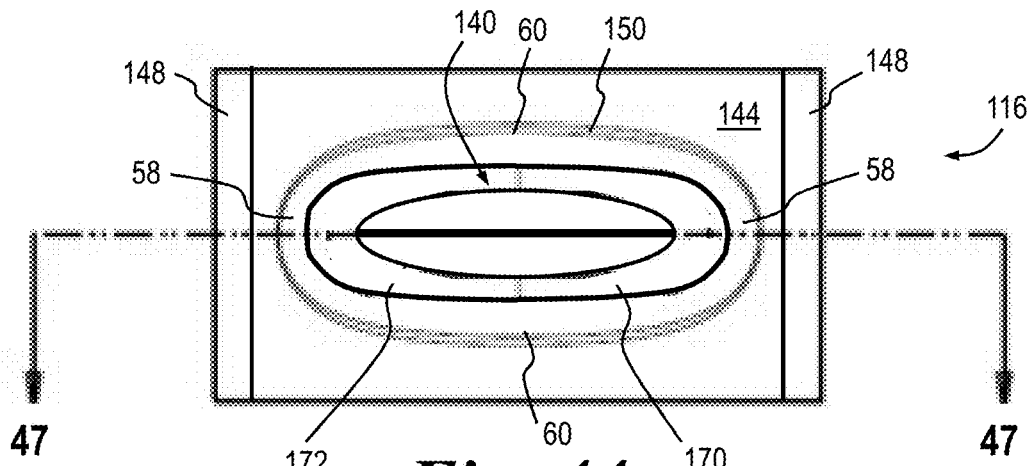
FIG. 44 is a top plan view of the flexible nozzle of FIG. 43.
Figure 45:
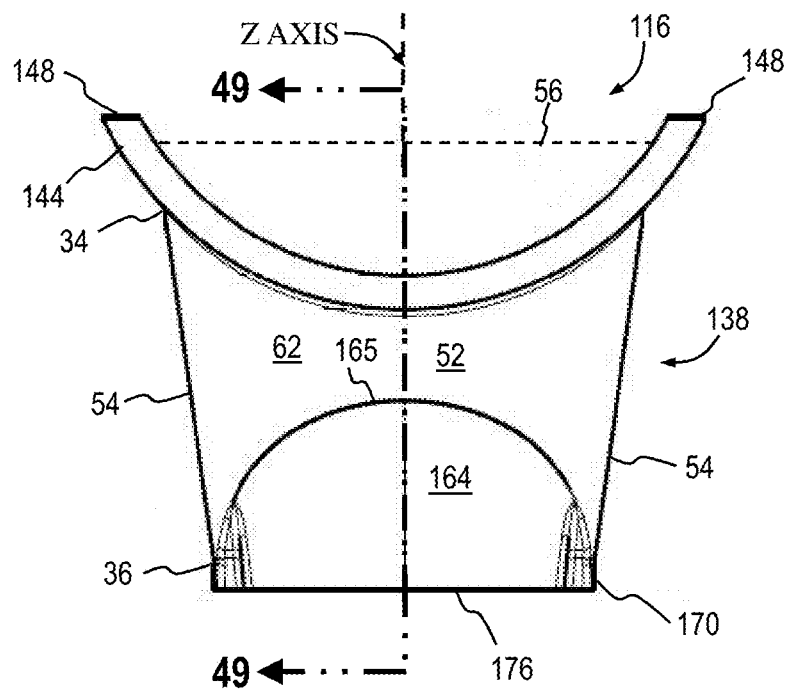
FIG. 45 is a front elevation view of the flexible nozzle of FIG. 43.
Figure 46:
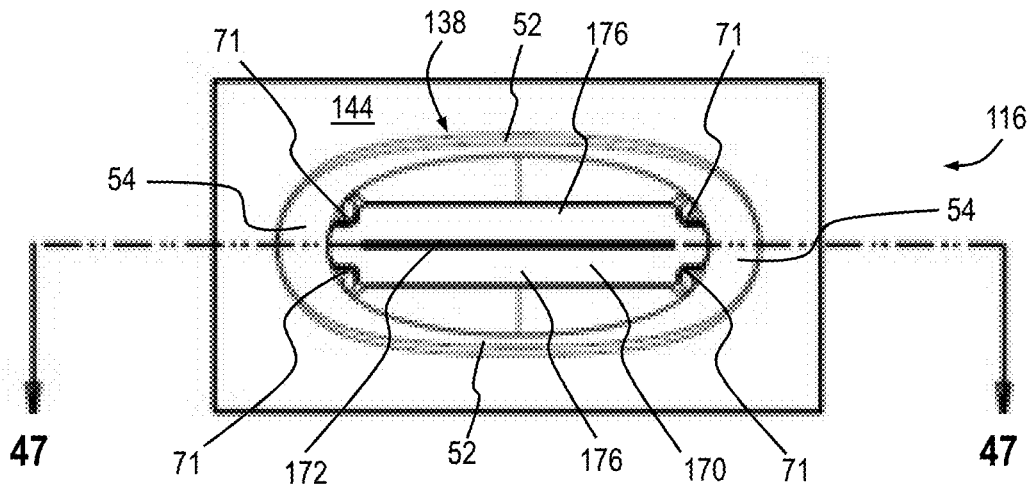
FIG. 46 is a bottom plan view of the flexible nozzle of FIG. 43.
Figure 47:
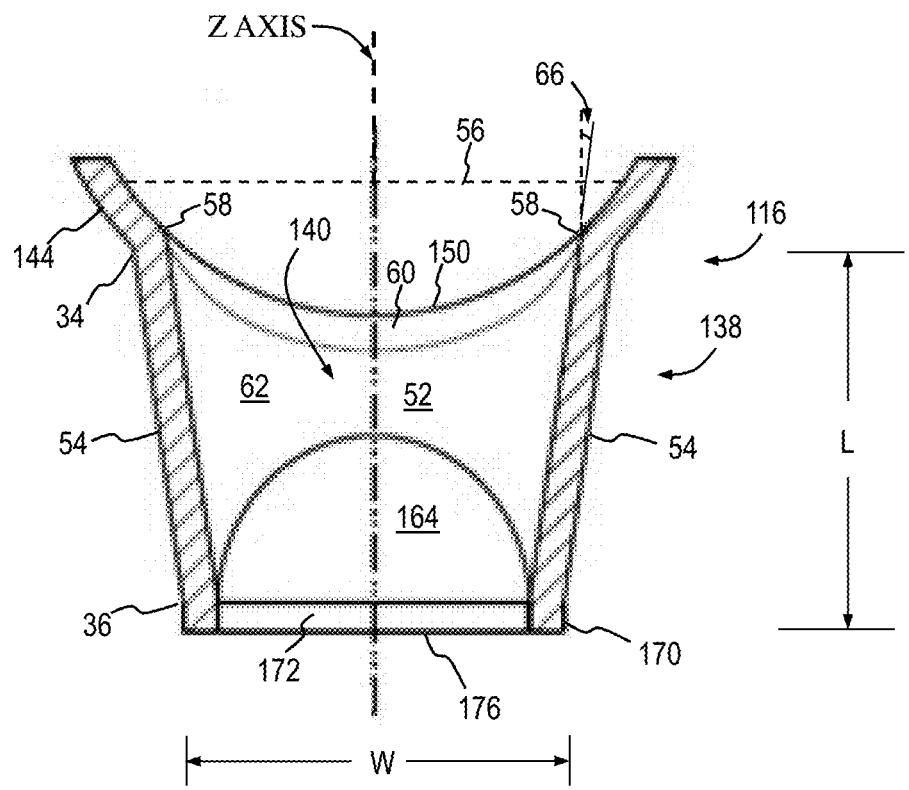
FIG. 47 is a long side view in section of the flexible nozzle of FIG. 43.
Figure 48:
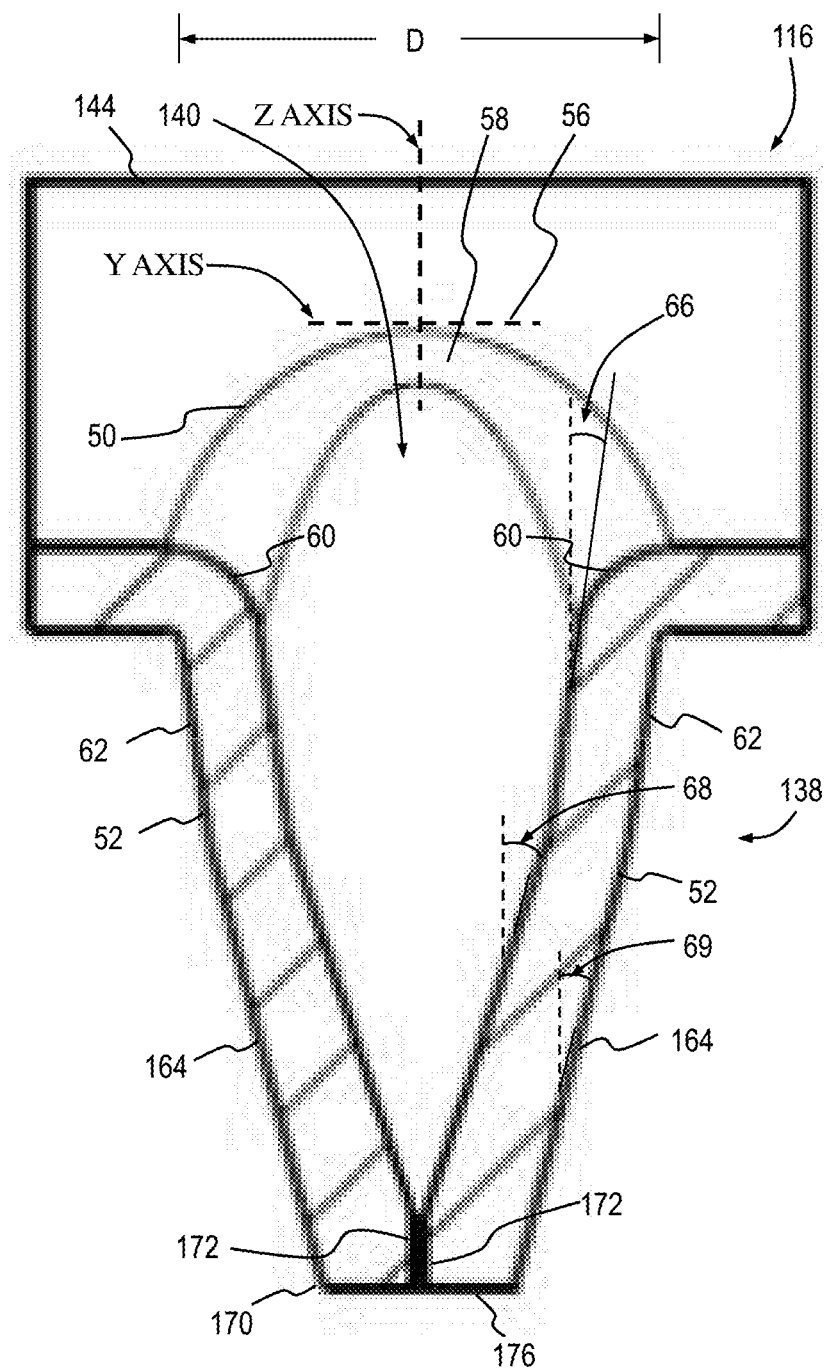
FIG. 48 is a short side view in section of the flexible nozzle of FIG. 43 prior to the flow of viscous food product.
Figures 49, 50:
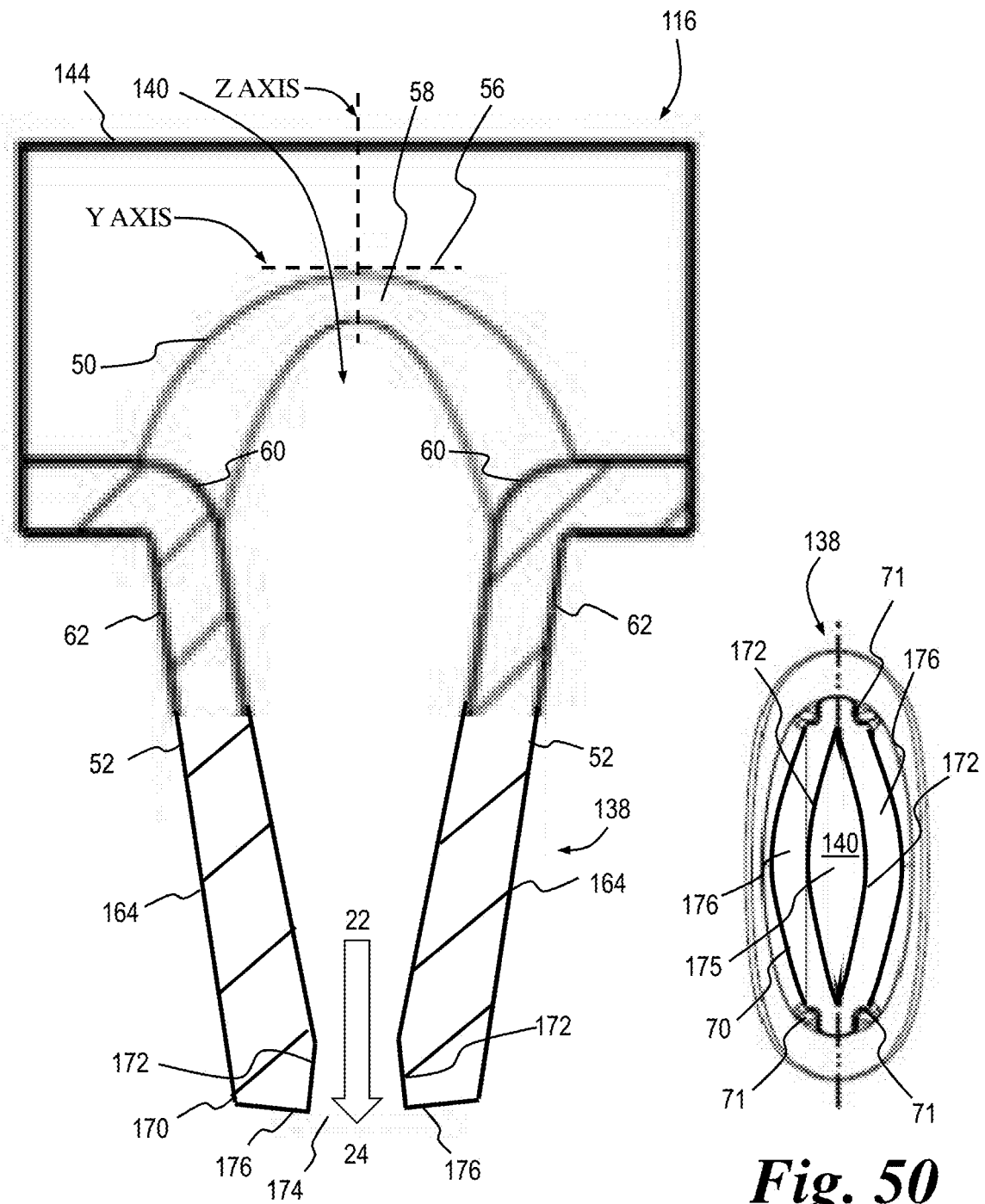
FIG. 49 is the flexible nozzle of FIG. 26 deformed during the flow of viscous food product.
FIG. 50 is a bottom view of the flexible nozzle of FIG. 43 deformed during the flow of viscous food product.

Now referring to FIGS. 41-50, in an alternative embodiment, an outlet adapter 100 includes a discharge cover 114 and a flexible nozzle 116. Nozzle 116 has many similar features to nozzle 16 described above (see FIGS. 27-40). Nozzle 116 is coupled at the proximal end 34 to an aperture 42 in annular sidewall 115 of discharge cover 114. Nozzle 116 includes a valve 138 and a mounting flange 144 at the proximal end 34 configured to fit against the concave curved interior surface of discharge cover 114. Discharge cover 114 may include a shoulder 146 configured to abut the outer edges 148 of mounting flange 144. Referring to FIG. 43, mounting flange 144 includes an opening 150 at proximal end 34 of an interior passage 140 configured to receive viscous food paste 22.

Valve 138 is biased in a normally closed position (see FIG. 48) and flexes to an open position (see FIG. 49) due to a pressure exerted by the discharge of viscous food paste 22. Valve 138 has a generally duckbill shape, and includes sheath portion 62 and a flexible portion 164. On flap walls 52, flexible portion 164 forms a curved interface 165 with sheath portion 62.

Interior passage 140 is defined by opening 150 and the proximal ends 34 of flap walls 52, having a generally ovoid cross-section about the Z axis, that gradually decreases in cross sectional area downwardly (along the Z axis) towards a normally closed port 170 of flexible nozzle 116 at distal end 36. Port 170 is configured for operation from the biased normally closed position to the open position for discharge of viscous food paste 22 in the elongated stream 24.

Port 170 includes a pair of opposing gates 172 at the distal end 36 of the interior surfaces of flap walls 52. In the closed position, gates 172 have the appearance of a closed slit. As gates 172 are forced open by the pressurized supply flow of viscous food paste 22 to form an outlet 174. As the slit opens, the middle portion thereof opens relatively more than the end portions to form a bulbous middle portion 175. In other words, gates 172 each deform in a generally bell-like, somewhat concave curvature, to form an ovaloid shaped middle portion 175 of outlet 174 (see FIG. 50).

Gates 172 are configured to be substantially parallel, and are further configured to be biased to abut together when port 170 is in the normally closed position. As such, gates 172 of port 170 are configured to pinch or chop against elongated stream 24 as the port returns to the closed position, effectively slicing through or breaking apart the elongated stream. The severed elongated stream 24 falls into the user's container below, thereby reducing the amount of residue viscous food paste 22 remaining attached to an external face 176 of port 170.

Nozzles 16, 116 are made of a suitable flexible, elastomeric material, such as rubber, for example. Preferably, the rubber is a food grade suitable for use with various particulate food products 20. The nozzle material may be configured of a durometer hardness to match the type of product used for milling, and the type of viscous food paste 22 produced by the viscous food product grinding and dispensing system 12. The durometer hardness utilized is coordinated to allow the valves 38, 138 to deform and open when interior passages 40, 140 are pressurized above a predetermined level and to seal closed causing a reduced residue drip when depressurized. In one example, for use with peanuts to make nut butter, the durometer of the rubber used for the nozzle may be from about Shore 60A to about Shore 90A. The durometer may vary depending on the size of the nuts used, and the texture of nut butter desired (chunky, coarse or smooth). The desired dispense rate of elongated stream 24 is also taken into account with the selection of rubber durometer. In one embodiment, larger sized peanuts produced a rate of about 1.3 lbs/minute to about 1.4 lbs/minute. In another embodiment, smaller sized peanuts produced a rate of about 3.1 lbs/minute to about 3.6 lbs/minute. In one embodiment, flexible nozzle 116 is preferably made from Shore 80A rubber for use in peanut butter applications to produce a flow rate of about 1.5 to about 3.4 lbs/minute of peanut food paste. The Shore 80A flexible nozzle 116 produces a dispense rate from about 3.2 to 3.4 lbs/minute with smaller sized peanuts and from about 1.5 to 1.7 lbs/minute with larger sized peanuts.

Discharge covers 114, 414, 614 may be made from a suitable food grade metal, such as stainless steel for example. Flexible nozzles 16, 116 are easily inserted and removed for cleaning from aperture 42 in discharge covers 114, 414, 614. Various parts shown are interchangeable in different system embodiments. For example, transport device 432 may be used within front housing 628.

Although shown coupling with the annular sidewall 115, 415 of cylindrical discharge covers 114, 414, and having a generally U-shaped flanges 44, 144, valves 38, 138 may be used in other applications, such as inline in industrial food processing. Valves 38, 138 may be mounted inline in a square, cylindrical or rounded conduit, where the corresponding flange perimeter is square, circular, or rounded and configured to mate with the adjacent conduit structure. The viscous food product dispensed by valves 38, 138 may be any suitable food product, such as dough, jam or mayonnaise. The valves may also be utilized with other suitable viscous products such as caulk, adhesives or petroleum jelly.

In one aspect of the subject technology, a viscous food product dispensing system comprises a transport section 28 having a chute inlet 632 for receiving a particulate food product, and a transport device 32 adapted to process and longitudinally convey the received particulate food product. In this context, "adapted to" means that transport device 32 is designed and constructed to include an auger-like function so as to convey the food product longitudinally. In one aspect, such conveyance is from the transport section 28 into outlet adapter 610. In one aspect, food product is conveyed longitudinally from the transport section into outlet adapter 610 through one or more flutes 658.

In one aspect, the transport device 32 has an over-center cutout 656 operatively aligned with the chute inlet 632. As depicted in FIGS. 60A & 60B, over-center cutout 656 is disposed along a portion of transport device 32. As depicted in FIG. 6D, over-center cutout 656, as viewed in cross section, extends over, or past, the centerline 33 of transport device 32.

Figure 52:
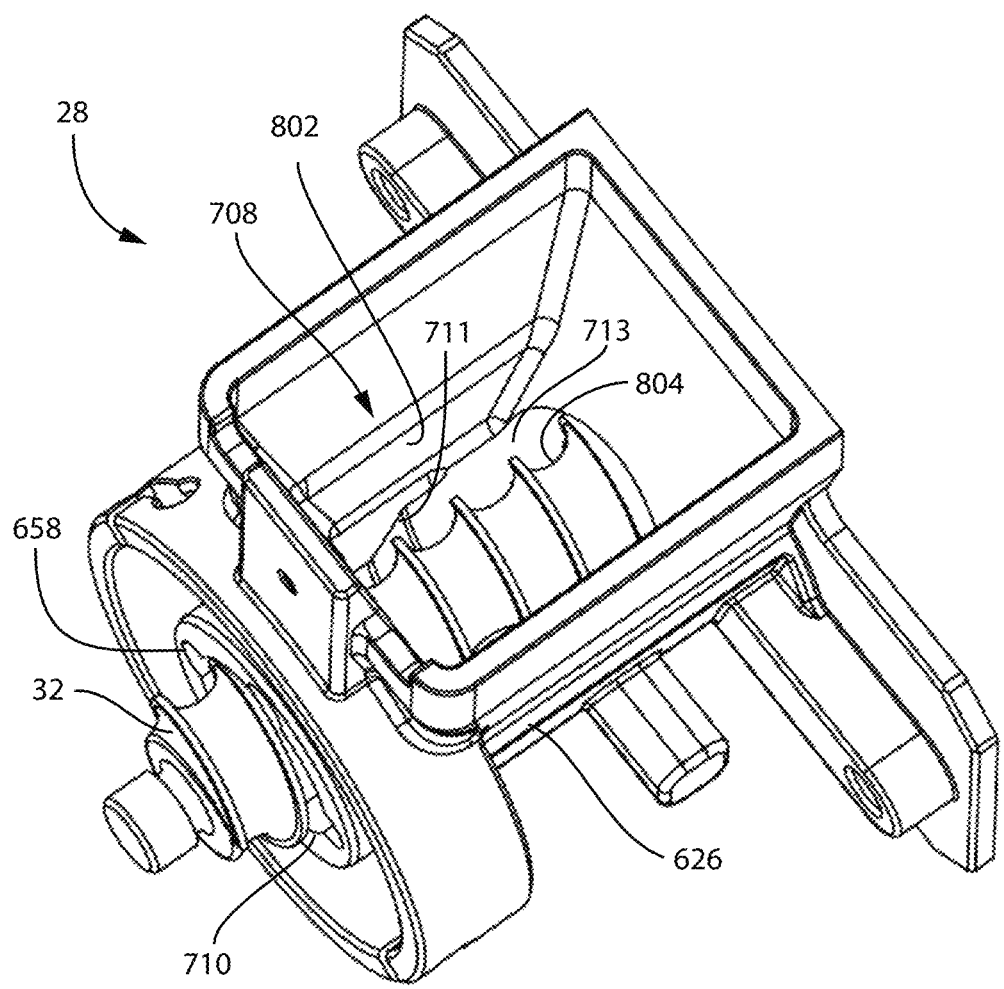
FIG. 52 is a top perspective view of the front housing and transport device of FIG. 51.

As shown in FIG. 52, over-center cutout 656 is operatively aligned with chute inlet 632 so that food product (e.g. nuts) enter chute inlet 632 and are thereafter engaged by cutout 656, and processed (e.g. crushed), as transport device 32 longitudinally conveys the processed food product. Those of skill in the art will appreciate the auger-like function of longitudinal conveyance performed by transport device 32. In one aspect, transport device 32 is operatively engaged with one or more flutes 658.

Figure 51:
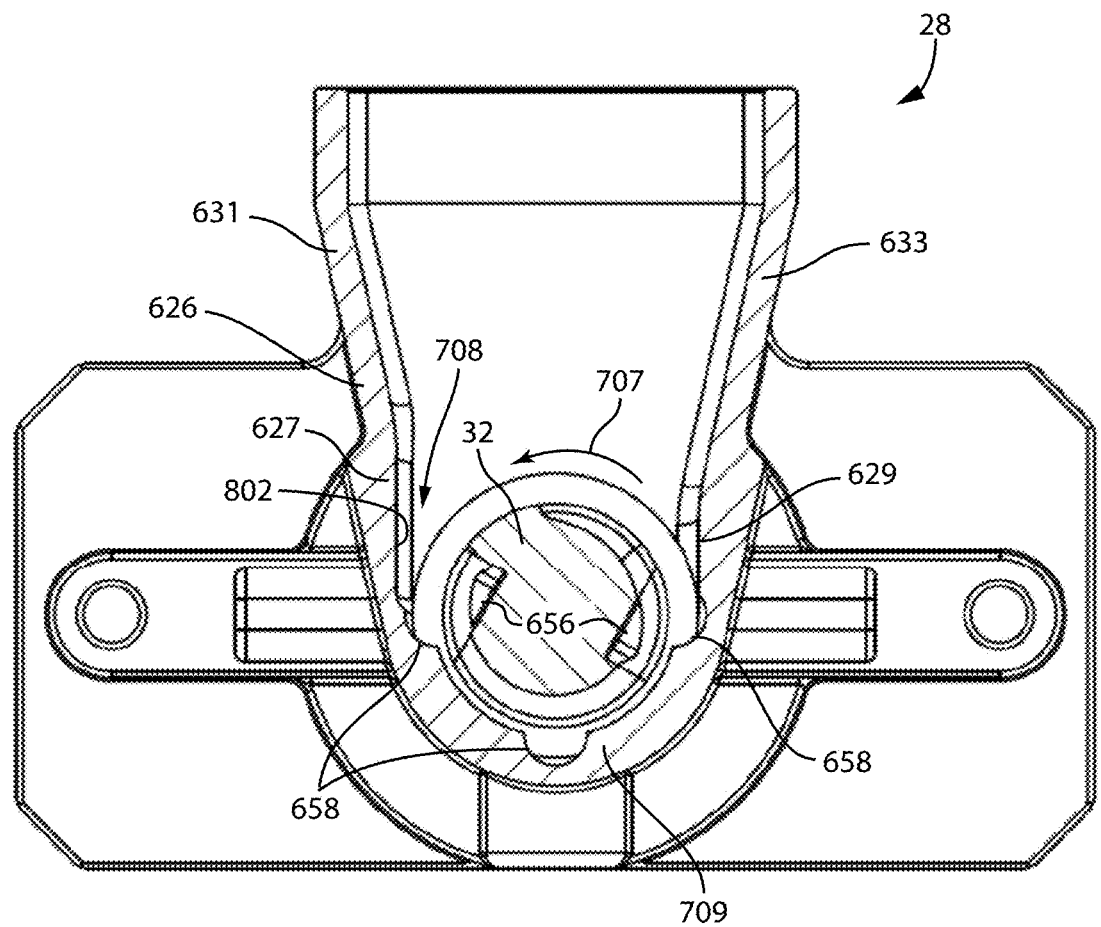
FIG. 51 is a cross sectional view of a front housing taken along line 51-51 of FIG. 53.

FIG. 51 depicts a cross-sectional view showing transport device 32 disposed between sleeve inner wall 627 of sleeve 626 and opposing sleeve inner wall 629 of sleeve 626. As shown, sleeve inner wall 627 of sleeve 626 and opposing sleeve inner wall 629 of sleeve 626 are substantially vertical and each transition to a tapered upper portion 631, 633.

In one aspect, as depicted in FIG. 51, the sleeve 626 is configured with an inner sleeve wall 627. The inner sleeve wall 627 is spaced apart from the transport device 32 in a region about the over-center cutouts 656. The inventors have recognized that while in previous dispensers the tapered upper portions 631, 633 of the sleeve 626 helped to direct food product towards the transport device 32, it has been discovered that despite the previously disclosed advantages of the over-center cutouts 656, that larger whole nuts, including, but not limited to pistachios and almonds require a processing zone 708 adjacent the transport device 32 within which they can be trapped and broken by the transport device 32. In FIG. 51, the transport device 32 exemplarily rotates in the direction of arrow 707, this rotation draws the whole nuts into the processing zone 708 which may include a portion of the associated flute 658. As seen in FIG. 51, the inner sleeve wall 627 is located exterior of the associated flute 658 in a direction from the transport device 32. That is, the inner sleeve wall 627 is further from a center-line of the transport device 32 than the associated flue 658. The whole nuts are broken between a processing surface 802 formed in the inner sleeve wall 627 in the processing zone 708 and the flights 712 of the transport device 32 at the over-center cutouts 656. Further aspects of this are depicted in FIGS. 52-59.

Figure 53:
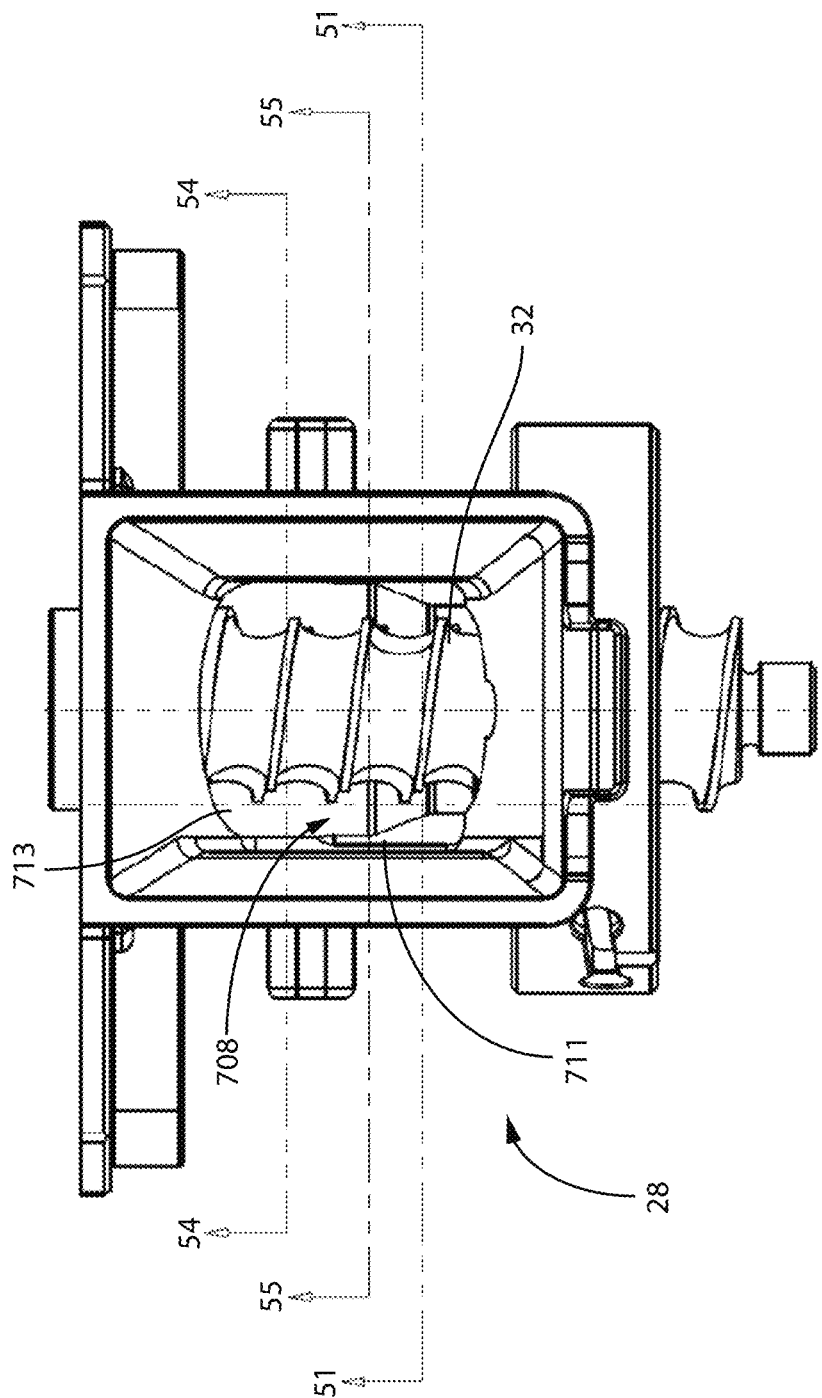
FIG. 53 is a top plan view of the transport device inside the front housing of FIG. 52.
Figure 54:
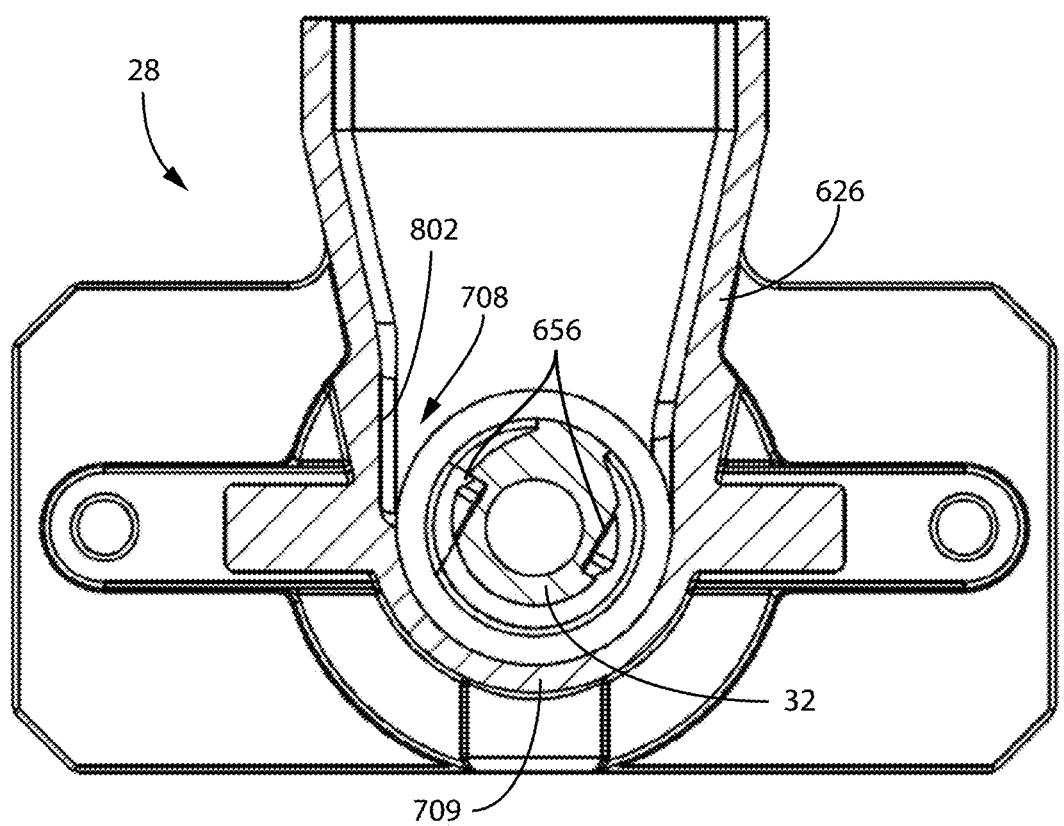
FIG. 54 is a sectional view taken along line 54-54 of FIG. 53.
Figure 55:
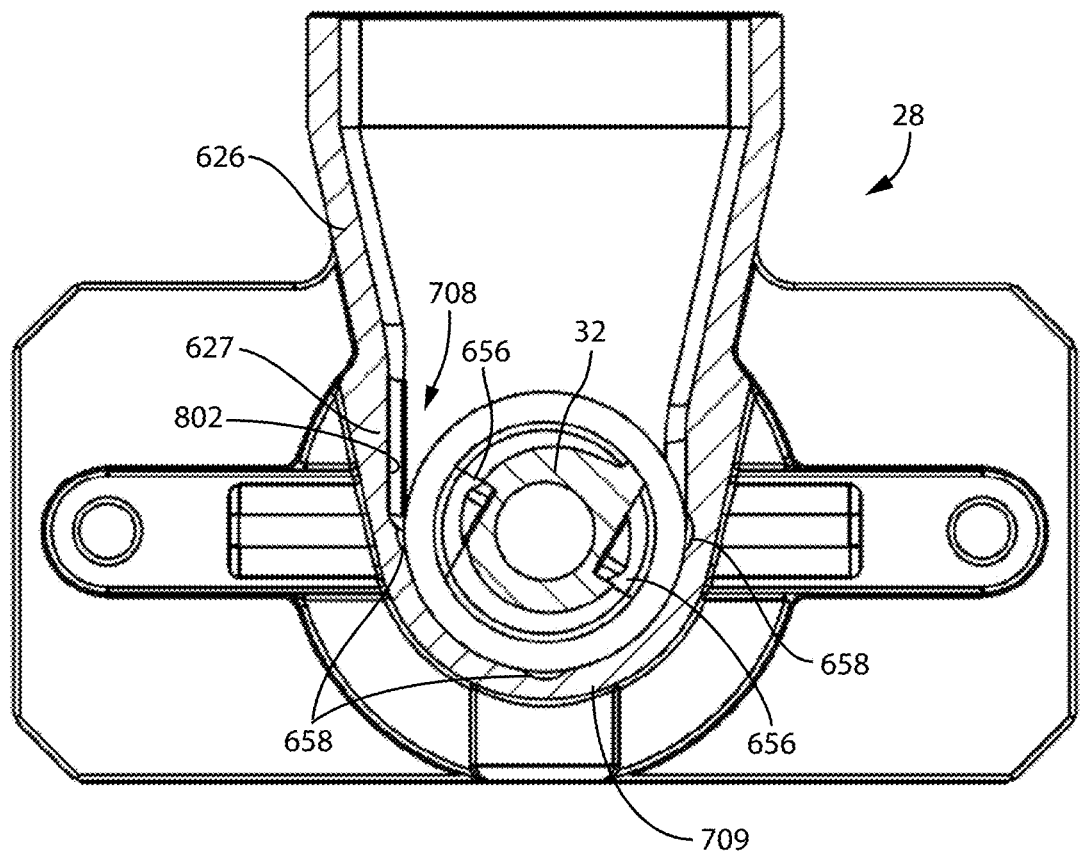
FIG. 55 is a sectional view taken along line 55-55 of FIG. 53.

FIG. 52 is a perspective view of the transport section 28. FIG. 53 is a top view of the transport section 28 of FIG. 52. FIG. 51 is a cross-sectional view taken along line 51-51 of FIG. 53. FIGS. 54 and 55 are other cross-sectional views of the transport section 28 as noted in FIG. 53. Comparing FIGS. 51, 54, and 55. It can be seen that a portion of the flutes are formed into the lower portion 709 of the sleeve 626 adjacent to the transport device 32. As seen from comparison of FIG. 55 to FIG. 51, as well as in FIGS. 52 and 53, the lower portion 709 includes a taper 711 from a back end 713 of the lower portion 709 towards an outlet aperture 710 through which the flutes 658 and the transport device 32 extend.

Figure 57:
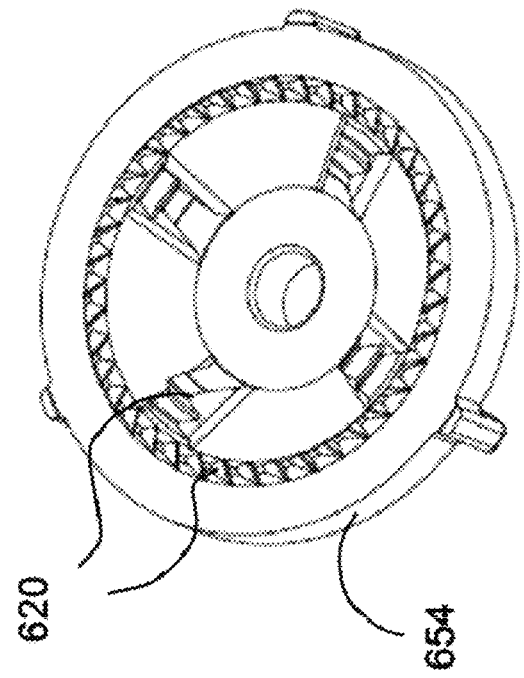
FIG. 57 is a perspective view of a second grinding plate showing one group of circumferentially oriented teeth in one aspect of the subject technology.
Figure 56:
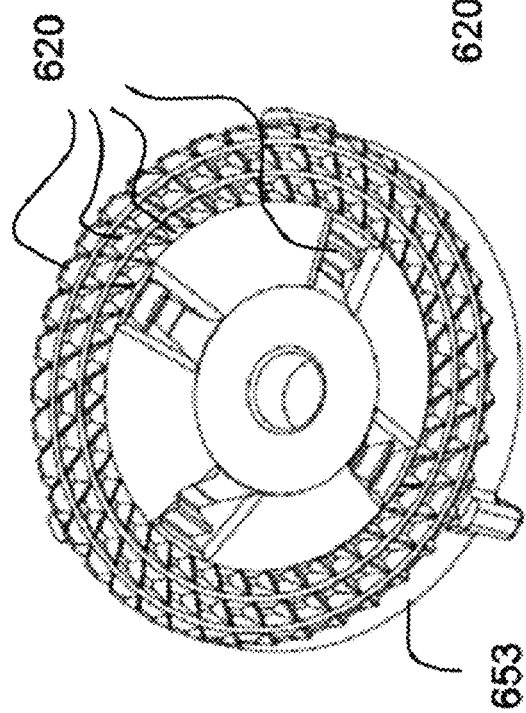
FIG. 56 is a perspective view of a first grinding plate showing three groups of circumferentially oriented teeth in one aspect of the subject technology.

FIG. 56 depicts an example of a first grinding plate 653 and FIG. 57 depicts an example of a second grinding plate 654. In one aspect, transport device 32 is adapted to convey the received particulate food product from the transport section 28 into an outlet adapter 610. The outlet adapter 610 includes a discharge cover 614 that encloses a milling device 618. The milling device 618 includes grinding plates 653, 654 each of the grinding plates 653, 654 include one or more grinding teeth 620. It is to be understood that the term "milling device" is interchangeable with "grinding device" as used herein.

The milling device is adapted to further process the particulate food product into a viscous food paste. In this context, "adapted to" means that milling device 618 converts the received food product into a viscous food paste by grinding the food product between grinding plates. In one aspect, the conversion is achieved by cooperating grinding plates, one being stationary and the other being rotatable so as to grind the food product.

The grinding plates 653, 654 rotate, relative to each other, to process (grind) a food product. As such, it should be noted that such relative rotation can be achieved in various ways. In one aspect, grinding plate 653 is stationary and grinding plate 654 is rotatable relative to the grinding plate 653. In another aspect, this may be reversed. In yet another aspect, both plates rotate, relative to each other, at varying speeds and directions.

The consistency and/or viscosity of the food product (e.g. nut butter) can be adjusted by varying the amount of energy transferred to the food product. One such method of accomplishing this is to vary the number and arrangement of grinding teeth on the various grinding plates.

The size, location, and relative size of grinding teeth 620 are adjusted according to multiple variables (aka commensurate with a food product). As a non-exhaustive example, the grinding plates (as described herein) can be tuned to nuts of various sizes so as to effect the viscosity and/or consistency of nut butter. By removing one or more rows of teeth form the rotating grinding plate or stationary grinding plate, the amount of work done can be tuned to meet the needs of the product for desired end product consistency. This may be useful, for example, in order to adjust the grinding plates 653, 654 to accommodate variations in the quality of the particulate food product.

In one aspect, a method for adjusting the consistency and/or viscosity of a food product comprises the steps of: obtaining a viscous food product dispensing system comprising: a transport section 28 having a chute inlet 632 for receiving a particulate food product, a transport device 32 being adapted to convey the received particulate food product from the transport section 28 into an outlet adapter 610, the outlet adapter 610 comprising a discharge cover 614 enclosing a milling device 618, the milling device 618 comprising front and rear grinding plates 619, 621, each of said front and rear grinding plates having one or more grinding teeth 620; and varying the location and/or number of the one or more grinding teeth according to multiple variables of a food product.

In one aspect, two or more of the grinding teeth are arranged circumferentially around either or both of the front or rear grinding plates. In one aspect, the grinding teeth 620 of either or both of the grinding plates 653, 654 are arranged in three or more groups of circumferentially oriented teeth, the groups being concentrically arranged, and disposed radially outside of four or more linear rows of teeth, each row having two or more teeth aligned radially outwardly from a center of the respective grinding plate, the four or more rows being circumferentially spaced apart.

In one aspect, the grinding teeth of either or both of the grinding plates 635, 654 are arranged in one or more groups of circumferentially oriented teeth 620 being disposed radially outside of one or more linear rows of teeth, each row having two or more teeth aligned radially outwardly from a center of the respective grinding plate, and if more than one row, the rows being circumferentially spaced apart.

Figure 61:
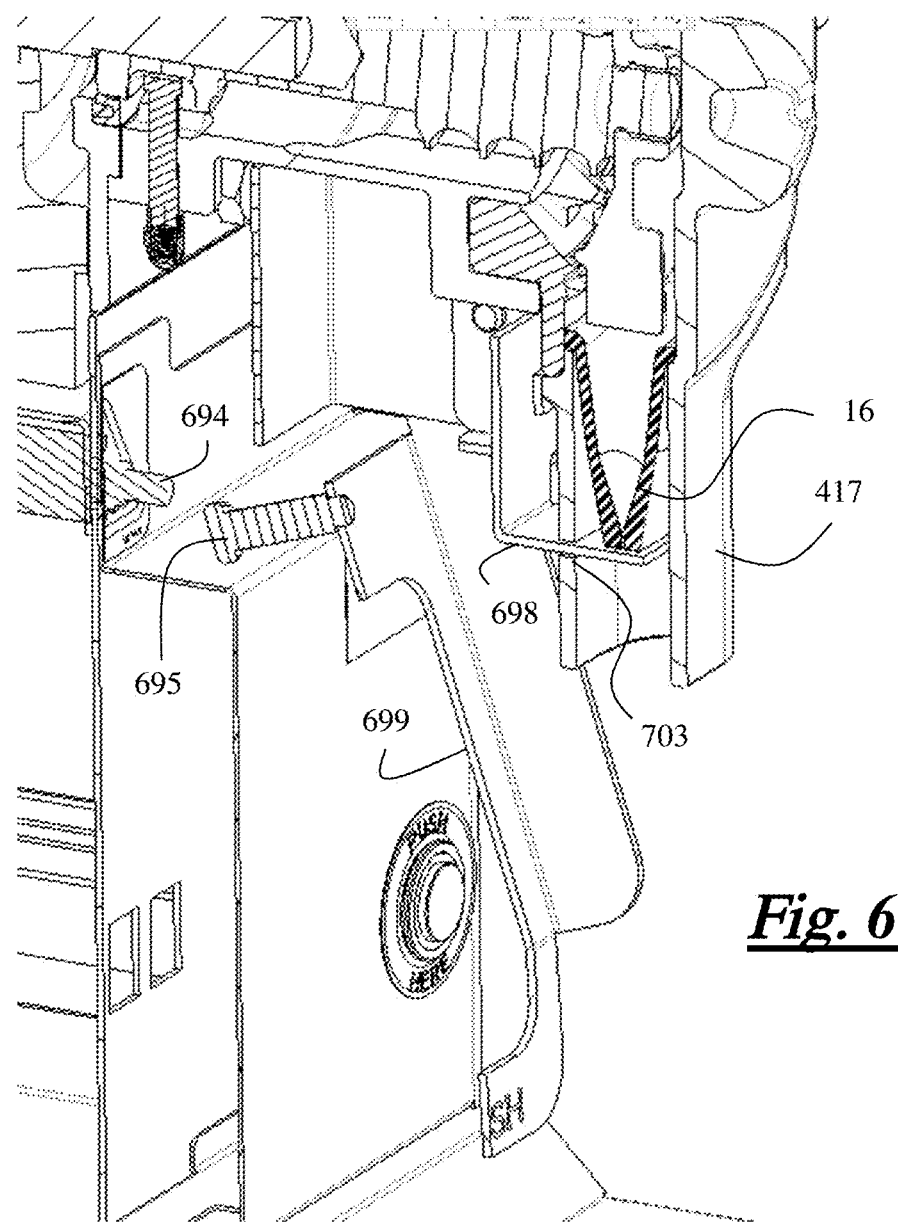
FIG. 61 is a left side perspective view in section of the dispensing system of FIG. 60.

As shown in FIG. 61, a first grinding plate 653 in one aspect has three groups of circumferentially oriented teeth 620, the groups being concentrically arranged, and disposed radially outside of four linear rows of teeth, each row having two teeth aligned radially outwardly from a center of the respective grinding plate, the four rows being circumferentially spaced apart.

Figure 62:
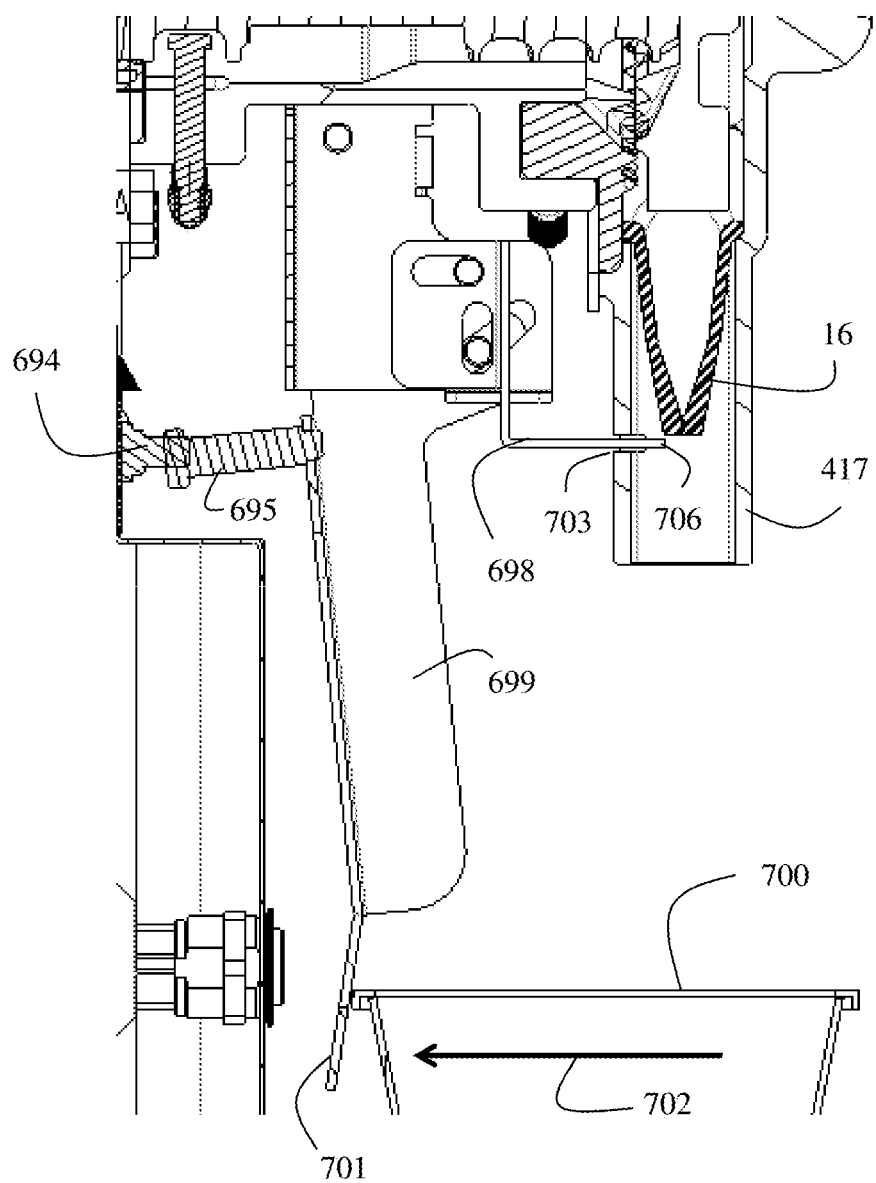
FIG. 62 is a partial left side view in section of the dispensing system of FIG. 60.

As shown in FIG. 62, a second grinding plate 654 in one aspect has one group of circumferentially oriented teeth 620 being disposed radially outside of four linear rows of teeth, each row having two teeth aligned radially outwardly from a center of the respective grinding plate, the four rows being circumferentially spaced apart.

It should be noted that first and second grinding plates 653, 654 are interchangeable with front and rear grinding plates 619, 621 & 419, 421 and that grinding teeth 620 are intended for use in all of the foregoing, in the various aspects of the subject technology as described herein. Grinding plate 654 is designed to tune the amount of work introduced to the product to yield desired viscosity of end product.

In one aspect, front grinding plate 619 is threadedly connected to proximal end 687 of transport device 32, such that the front grinding plate is removed from the transport device in a removal direction. In one aspect, the threaded connection of front grinding plate 619 to proximal end 687 of transport device 32 comprises a direct connection whereas in other aspects an intermediate connector can be used to accomplish the same functionality. It should also be noted that the subject technology can be configured such that the "removal direction" can be either clockwise or counterclockwise. In one aspect, transport device 32 and front grinding plate 619 rotate in a counterclockwise direction to grind food product, and the threaded connection between front grinding plate 619 and transport device 32 is such that the removal direction is also counterclockwise; i.e. front grinding plate 619 is tightened in a clockwise direction.

Figure 58A:
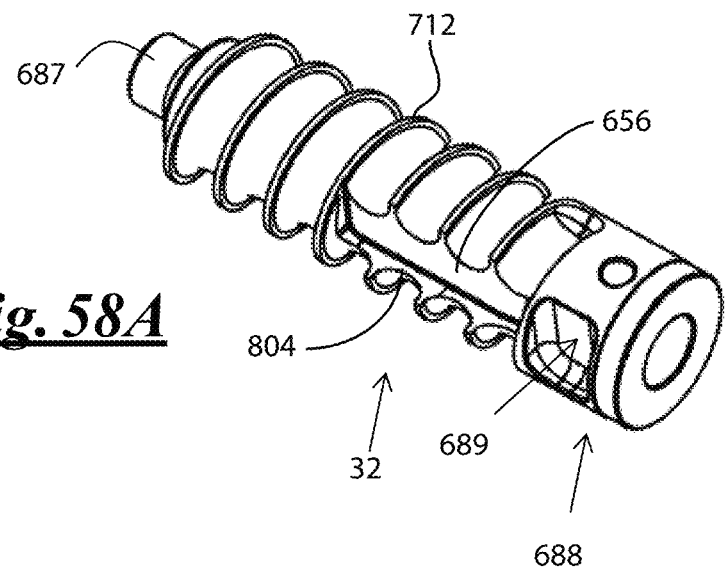
FIG. 58A is a rear perspective view of a transport device with restraining receptacle in one aspect of the subject technology.
Figure 58B:
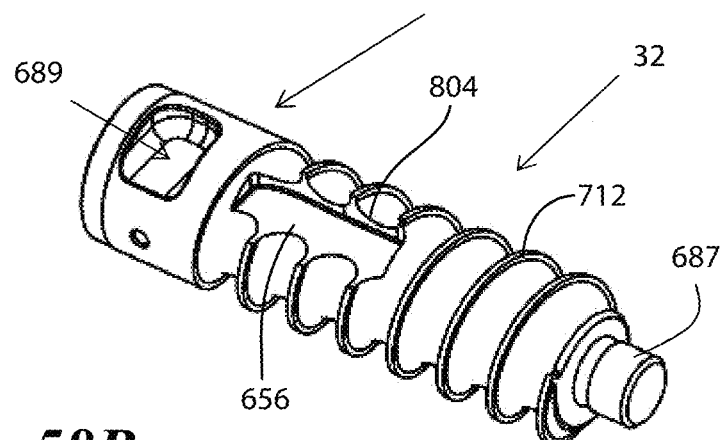
FIG. 58B is a front perspective view of the transport device.
Figure 59A:
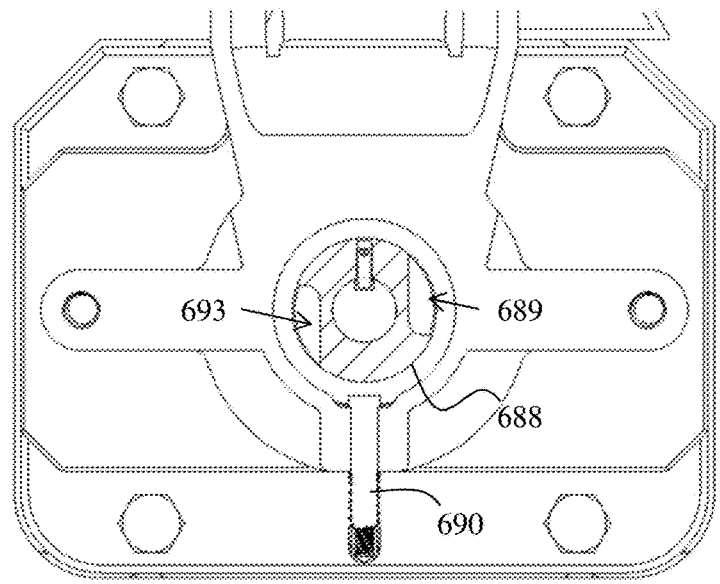
FIG. 59A is a front view in section of a front housing with the transport device of FIG. 58A and showing the lock bolt in the free position.
Figure 59B:
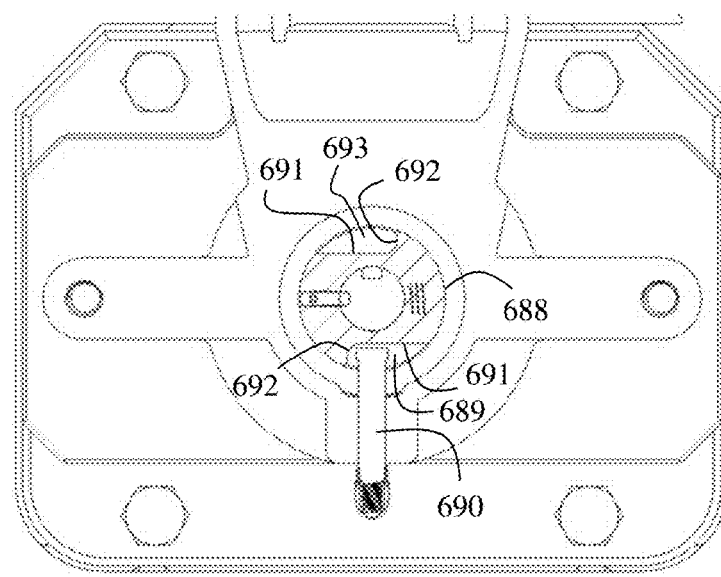
FIG. 59B is the front view in section of FIG. 59A showing the lock bolt in the locked position.

FIGS. 58A and 58B depict left and right perspective views of an example of a transport device 32, including the flights 712 and the over-center cutout 656. In one aspect, distal end 688 of transport device 32 has a receptacle 689 for operatively engaging a lock pin 690. The distal end 688 of transport device 32 may be relatively smooth (exclusive of receptacle 689) and does not include structure to realize auger functionality. Receptacle 689 is adapted to restrain (aka in a locked position) transport device 32 from rotating in the removal direction when lock pin 690 is inserted within the receptacle 689 (e.g. FIG. 59B), and the receptacle 689 is adapted to allow the transport device 32 to rotate in a counter-removal direction when the lock pin 690 is inserted within the receptacle 689. It should be noted that the insertion of lock pin 690 into receptacle 689 can be manual (e.g. a user engagement), or automatic (e.g. in response to a predetermined event, or series of events).

In one aspect, receptacle 689 is adapted to eject the lock pin 690 when the transport device 32 is rotated in the counter-removal direction. In one aspect (e.g. FIG. 59B), receptacle 689 has a lower surface 691 adjacent to a restraining wall 692. Lock pin 690 engages restraining wall 692 when lock pin 690 is inserted within the receptacle 689 and the transport device 32 is rotated in the removal direction, and lower surface 691 ejects lock pin 690 when the transport device 32 is rotated in the counter-removal direction.

In one aspect (e.g. FIG. 59B), distal end 688 of transport device 32 has a second receptacle 693 for operatively engaging a lock pin 690. In one aspect (e.g. FIG. 59B), the second receptacle 693 is disposed one hundred and eighty degrees relative to the first receptacle 689, but is otherwise substantially identically shaped. It should be noted that, in the configuration depicted in FIG. 64B, only one lock pin 690 is used and thus will only engage one of the two receptacles 689 or 693.

From the perspective of a user standing in front of the milling device, front grinding plate 619 rotates in counterclockwise direction to grind a food product. In this aspect, the threaded connection between the auger (aka transport device 32) and grinding plate is such that the plate is unscrewed in a counterclockwise direction, so that the plate is not unscrewed during operation. i.e. when the auger rotates in counterclockwise direction, the force is in a direction that would cause the plate to be tightened. To remove the plate, lock pin 690 (aka "locking pin", "anti-rotation pin") is moved into a locked position and engaged (manually in one aspect) into receptacle 689. As shown in FIGS. 64A&B, counterclockwise rotation is restrained or locked, while clockwise rotation ejects lock pin 690, moving the lock pin 690 into an unlocked position. An important advantage is thereby achieved because a user cannot accidentally damage lock pin 690 by applying excessive force in a counter-removal direction when screwing the front grinding plate 619 onto the transport device 32.

Figure 60:
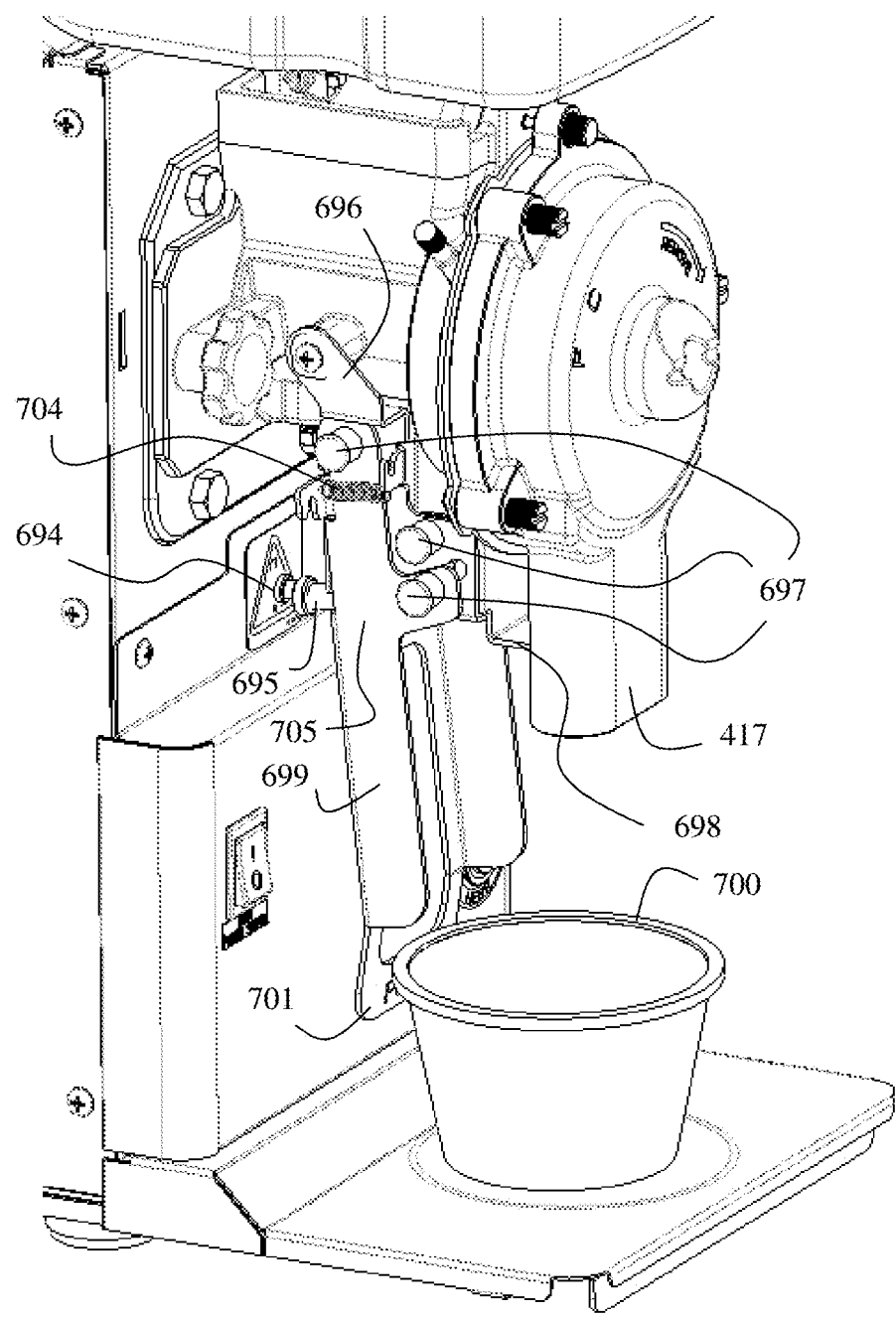
FIG. 60 is a partial front perspective view of a viscous food product dispensing system showing an actuating lever and chopping bracket in one aspect of the subject technology.

As shown in FIGS. 60-62, a viscous food product dispensing system in one aspect includes a transport section 28 having a chute inlet 632 for receiving a particulate food product. A transport device 32 moves the received particulate food product from the transport section into an outlet adapter 610. The outlet adapter 610 includes a discharge cover 614 enclosing a milling device 618. The milling device being adapted to process the particulate food product into a pressurized flow of viscous food paste that is discharged through a nozzle 16, the nozzle being disposed through the discharge cover 614. The nozzle 16 is partially covered by a spout 417. A proximal end 704 of an actuating lever 699 is operatively connected to the transport section, the actuating lever 699 is movable between engaged and disengaged positions. In one aspect, a medial portion 705 of the actuating lever 699 is adapted to activate (e.g. turn on, engage) a push button 694 when the actuating lever 699 is in the engaged position.

In one aspect, a chopping bracket 698 is operatively connected to the medial portion 705 of the actuating lever 699, and a distal end 706 of the chopping bracket 698 protrudes through a slot 703 disposed in the spout 417. In the disengaged position, the distal end 706 of the chopping bracket 698 cuts off the pressurized flow of viscous food paste that is discharged through the nozzle 16. An important aspect is thereby achieved because undesirable "dangle" of food product that would otherwise remain upon cessation of flow, is prevented.

In one aspect, the chopping bracket 698 is pivotably connected to the medial portion 705 of the actuating lever 699 by one or more pull out pins 697 so that the distal end 706 of the chopping bracket 698 protrudes through a slot 703 in a reciprocating manner as the actuating lever 699 is moved between engaged and disengaged positions. Those of skill in the art will appreciate that various linkages and brackets can be used to achieve this functionality.

In one aspect, the proximal end 704 of the actuating lever 699 is pivotably connected to the transport section 28. In another aspect, the proximal end 704 of the actuating lever 699 is connected to an actuator base frame 696, and the actuator base frame 696 is pivotably connected to the transport section. It should be noted that the operative connection as herein described is intended to allow actuating lever 699 to cause the distal end 706 of the chopping bracket 698 to cut off the pressurized flow of viscous food paste that is discharged through the nozzle 16, and additionally in one aspect, to activate push button 694 as the actuating lever 699 moves between engaged and disengaged positions.

In one aspect, a push button actuating pin 695 is disposed proximate the medial portion 705 of the actuating lever 699 so as to operatively engage and activate the push button 694 when the actuating lever 699 is in the engaged position.

In one operational aspect, a cup 700 is forcibly held under the nozzle 16 so as to move the distal end 701 of the actuating lever 699 (typically biased in the disengaged position) in the direction of arrow 702 (FIG. 67), which causes the actuating lever 699 to be moved to the engaged position. In the engaged position, the distal end 706 of the chopping bracket 698 is positioned to allow flow through nozzle 16, and push button 694 is activated thereby causing the flow of food product from the nozzle 16. Upon removal of the cup 700, the actuating lever 699 is moved to the disengaged position and the distal end 706 of the chopping bracket 698 is moved so as to cut off the pressurized flow of viscous food paste that is discharged through the nozzle 16, thereby pinching off, or severing the product flow.

Some embodiments can include a combination of features that work in unison to provide an adaptable viscous food dispensing system that may be used with a variety of different food products. By combining a transport section with a sleeve having an asymmetrical cross section (see, for example, FIG. 51) with an outlet adaptor that can use grinding plates with different grinding tooth configurations, a viscous food dispensing system can be used to process and grind whole nuts into a viscous food product with a high or low viscosity.

For example, as illustrated in FIGS. 53-57, a viscous food dispensing system 12 can be configured to process particulate food product that is captured in a processing zone 708 between the transport device 32 and a processing surface 802. The processing surface 802 can extend downward from the tapered upper portion 631 of the chute inlet 632 towards the curved lower portion 709 of the sleeve 626, and may run longitudinally along at least a portion of the length of the sleeve 626 and the transport device 32. The processing surface 802 is formed in the inner sleeve wall 627 so that the width of the processing zone 708 is larger than the distance between the transport device 32 and the side wall 629 of the sleeve 626 opposite the processing surface 802. The large width of the processing zone 708 may be useful, for example, in order to capture and process whole nuts (e.g., almonds). As the transport device 32 rotates in a counterclockwise direction, the particulate food product within the processing zone 708 can be captured between the flights 712 and a leading edge 804 of the over-center cutout 656 and the processing surface 802, causing the captured particulate food product to be broken up into smaller pieces. Those smaller pieces can then be conveyed from the sleeve 626 to the outlet adaptor 610 for grinding.

Use of a transport device 32 that includes a pin receptacle 689 and a lock pin 690 that is slidably revived in the sleeve 626 (see, for example, FIGS. 63A-64B) can be useful, for example, to allow a user to remove and attach various different grinding plates to the transport device 32 without the use of specialized tools. This may allow a user of the system 12 to quickly adjust for different types of particulate food product, or to increase or decrease the viscosity of the viscous food product produced by the system 12. When implemented in a system 12 with a transport device 32 and sleeve 626 that provide a wide processing zone 708, a single viscous food dispensing system 12 can be used with a wide variety of different particulate food products, both large and small, to produce viscous food products having a variety of different consistencies and viscosities.

While this invention has been shown and described with respect to detailed embodiments thereof, it will be understood by those skilled in the art that changes in form and detail thereof may be made without departing from the scope of the claims of the invention.

What is claimed is:

1. A method for tuning a viscous food dispensing system configured to grind particulate food product into viscous food product between a stationary grinding plate and a movable grinding plate, the movable grinding plate coupled to a drive device, the method comprising:
   determining a desired viscosity of the viscous food product;
   moving a lock pin from an unlocked position to a locked position to restrict rotation of the drive device in a first direction;
   rotating the drive device in the first direction until the lock pin engages a pin receptacle formed in the drive device;
   uncoupling the movable grinding plate from the drive device to remove the movable grinding plate from the viscous food dispensing system;
   selecting a replacement movable grinding plate based on the desired viscosity of the viscous food product;
   securing the replacement movable grinding plate to the drive device to tune the viscous food dispensing system based on the desired viscosity; and
   moving the locking pin from the locked position to the unlocked position.

2. The method of claim 1, wherein the drive device comprises an auger, the auger having an over-center cutout, and wherein the viscous food dispensing system comprises:
   a chute inlet configured to funnel whole food product into a sleeve, wherein the auger is configured to rotate within the sleeve;
   a processing surface extending downward from the chute inlet towards a curved base of the sleeve along a portion of the auger, the processing surface being spaced laterally apart from the auger to define a processing zone between the processing surface and the auger;
   wherein the whole food product is broken into particulate food product as the whole food product is captured between a leading edge of the over-center cutout and the processing surface while the auger is rotating, the auger configured to move the particulate food product away from the chute inlet.

3. The method of claim 2, wherein the outlet adaptor includes the stationary grinding plate and the movable grinding plate, the movable grinding plate configured to rotate relative to the stationary grinding plate; and
   wherein the stationary grinding plate and the movable grinding plate each include at least one set of grinding teeth, and the set of finding teeth on the movable grinding plate move relative to the set of finding teeth on the stationary grinding plate to grind the particulate food product into a viscous food product while the movable grinding plate is rotating.

4. The method of claim 3, wherein the movable grinding plate is coupled to a first end of the auger and the drive device so that the movable grinding plate rotates with the auger.

5. The method of claim 4, wherein the pin receptacle comprises a restraining wall extending into the drive device and an outward facing surface extending through a portion of the drive device in the first direction away from the restraining wall, wherein the restraining wall is configured to engage the locking pin when the locking pin is in the locked position.

6. The method of claim 5, wherein the drive device comprises a second end opposite the first end and the pin receptacle is located at the second end of the drive device.

7. The method of claim 3, wherein the movable grinding plate comprises at least one set of grinding teeth arranged circumferentially and at least four sets of grinding teeth arranged radially and interior of the at least one set of grinding teeth arranged circumferentially.

8. The method of claim 3, wherein the teeth in each of the sets of grinding teeth are arranged in a circular pattern so that each set of grinding teeth on the stationary grinding plate forms a circle that is concentric with each set of grinding teeth on the movable grinding plate.

9. The method of claim 2, further comprising:
   a nozzle arranged relative to the fixed grinding plate and the movable grinding plate, the nozzle configured to dispense the viscous food product therethrough;
   an actuating lever pivotably connected relative to the nozzle, the actuating lever movable between an engaged position wherein movement of the auger and the movable grinding plate is actuated and a disengaged position;
   a chopping bracket connected to the actuating lever and movable in a reciprocating manner with the actuating lever such that the chopping bracket extends across a portion of the nozzle, at least partially occluding the viscous food product when the actuating lever is in the disengaged position.

10. The method of claim 2, wherein a width of the processing zone is larger than a distance between the transport device and a sleeve side wall opposite the processing surface.

11. The viscous food dispensing system of claim 10, wherein the food processing zone further comprises at least one flute that extends into the sleeve from the curved base.

12. The method of claim 11, wherein the processing surface is exterior the flute from the transport device.

13. The method of claim 1, wherein the step of selecting a replacement movable grinding plate includes selecting a replacement movable grind plate based on at least one of a desired number of grinding teeth on the replacement movable grinding plate and a desired spacing of grinding teeth on the replacement movable grinding plate.

14. The method of claim 1, wherein the pin receptacle comprises a restraining wall extending into the drive device and an outward facing surface extending through a portion of the drive device in the first direction away from the restraining wall, wherein the restraining wall is configured to engage the locking pin when the locking pin is in the locked position.

15. The method of claim 14, wherein the drive device is generally cylindrical and extends from a first end to a second end and the movable grinding plate is coupled to the second end of the drive device and the pin receptacle is located at the first end of the drive device.

16. The method of claim 15, wherein the movable grinding plate is coupled to the drive device by a threaded connection so that the step of uncoupling the movable grinding plate includes rotating the movable grinding plate in the first direction to unscrew the movable grinding plate from the drive device; and wherein the engagement between the lock pin and the pin receptacle inhibits rotation of the drive device in the first direction.

17. The method of claim 16, wherein the step of securing the replacement movable grinding plate to the drive device includes rotating the replacement movable grinding plate in a second direction to screw the replacement movable grinding plate onto the drive device; and wherein engagement between the lock pin and the pin receptacle allows the drive device to rotate in the second direction to prevent overtightening of the replacement movable grinding plate.

18. The method of claim 1, wherein the drive device includes an auger configured to convey the particulate food product to the fixed grinding plate and the movable grinding plate as the auger rotates; and wherein the movable grinding plate is coupled to a proximal end of the auger by a threaded connection.

19. The method of claim 18, wherein the auger incudes an over-center cutout and is configured to rotate within a sleeve to process the particulate food product as the particulate food product is captured between a leading edge of the over-center cutout and a processing surface;

wherein the processing surface is spaced laterally apart from the transport device to define a processing zone between the processing surface and the auger; and wherein a width of the processing zone is larger than a distance between the auger and a sleeve side wall opposite the processing surface.

* * * * *